(12) United States Patent
Yamashita et al.

(10) Patent No.: US 9,964,351 B2
(45) Date of Patent: May 8, 2018

(54) COOLING EQUIPMENT, TEMPERATURE CONTROL SYSTEM, AIR CONDITIONING SYSTEM, AND HOT WATER SUPPLY SYSTEM FOR THE SAME

(75) Inventors: Takashi Yamashita, Osaka (JP); Tetsuya Ide, Osaka (JP); Yasuyuki Umenaka, Osaka (JP); Yuka Utsumi, Osaka (JP); Kazuhiro Deguchi, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 862 days.

(21) Appl. No.: 14/131,074

(22) PCT Filed: Jul. 6, 2012

(86) PCT No.: PCT/JP2012/067363
§ 371 (c)(1),
(2), (4) Date: Jan. 6, 2014

(87) PCT Pub. No.: WO2013/008755
PCT Pub. Date: Jan. 17, 2013

(65) Prior Publication Data
US 2014/0124158 A1    May 8, 2014

(30) Foreign Application Priority Data

Jul. 12, 2011 (JP) .................. 2011-153820
Nov. 22, 2011 (JP) .................. 2011-255205

(51) Int. Cl.
*F25B 29/00* (2006.01)
*F25D 31/00* (2006.01)
(Continued)

(52) U.S. Cl.
CPC ............ *F25D 31/00* (2013.01); *F25D 11/006* (2013.01); *F28D 20/02* (2013.01);
(Continued)

(58) Field of Classification Search
CPC .... F25D 31/00; F25D 11/006; F25D 2700/12; F28D 20/02; Y02B 40/32; Y02E 60/145
(Continued)

(56) References Cited

U.S. PATENT DOCUMENTS 1,457,950 A * 6/1923 Uberto .................. F25B 41/067
200/81 R
4,421,661 A * 12/1983 Claar ..................... C09K 5/063
165/10
(Continued)

FOREIGN PATENT DOCUMENTS

CN 101107340 A 1/2008
JP 58-219379 A 12/1983
(Continued)

OTHER PUBLICATIONS

Official Communication issued in International Patent Application No. PCT/JP2012/067363, dated Oct. 2, 2012.

*Primary Examiner* — Claire Rojohn, III
(74) *Attorney, Agent, or Firm* — Keating & Bennett, LLP

(57) ABSTRACT

The present invention aims to provide cooling equipment which can reduce power consumption. Cooling equipment 1 includes a storage chamber 30 that stores storage goods; latent heat storage materials 101 to 106 disposed inside the storage chamber 30; a compressor 40 that configures a refrigerating cycle for cooling the inside of the storage chamber 30; a temperature sensor 60 that detects a temperature of the latent heat storage materials 101 to 106; and a control unit 100 that controls the compressor 40, based on a state of the latent heat storage materials 101 to 106.

12 Claims, 47 Drawing Sheets

(51) Int. Cl.
*F25D 11/00* (2006.01)
*F28D 20/02* (2006.01)

(52) U.S. Cl.
CPC .......... *F25B 2600/0251* (2013.01); *F25B 2700/2111* (2013.01); *F25D 2700/12* (2013.01); *Y02B 40/32* (2013.01); *Y02E 60/145* (2013.01)

(58) Field of Classification Search
USPC ............. 165/133, 201; 220/592.09, 592.26, 220/592.27
See application file for complete search history.

(56) References Cited

U.S. PATENT DOCUMENTS

| | | | | |
|---|---|---|---|---|
| 5,085,790 | A * | 2/1992 | Hormansdorfer | C09K 5/063 165/10 |
| 5,885,475 | A * | 3/1999 | Salyer | C09K 5/063 165/10 |
| 6,128,914 | A * | 10/2000 | Tamaoki | F25B 9/006 312/401 |
| 6,209,343 | B1 * | 4/2001 | Owen | A01N 1/02 252/67 |
| 8,091,613 | B2 * | 1/2012 | Bank | C09K 5/063 165/10 |
| 8,587,945 | B1 * | 11/2013 | Hartmann | H05K 7/20454 361/679.53 |
| 9,523,539 | B2 * | 12/2016 | Ide | F28D 20/023 |
| 2005/0247906 | A1 * | 11/2005 | Neuschutz | C04B 22/085 252/70 |
| 2008/0014482 | A1 * | 1/2008 | Yamamiya | H01M 8/04007 429/421 |
| 2008/0289793 | A1 * | 11/2008 | Geiken | F24J 2/4649 165/10 |
| 2009/0035557 | A1 * | 2/2009 | Hartmann | D02G 3/404 428/331 |
| 2009/0199994 | A1 * | 8/2009 | Amano | C09K 5/063 165/10 |
| 2009/0250189 | A1 * | 10/2009 | Soukhojak | C09K 5/063 165/10 |
| 2009/0256107 | A1 * | 10/2009 | Hentze | B01J 13/14 252/73 |
| 2012/0096716 | A1 * | 4/2012 | Tran | F28D 20/023 29/897.3 |
| 2012/0225290 | A1 * | 9/2012 | Hartmann | C08F 20/32 428/364 |
| 2014/0124158 | A1 * | 5/2014 | Yamashita | F25D 11/006 165/10 |
| 2015/0013178 | A1 * | 1/2015 | Stolze | D06F 58/20 34/282 |
| 2015/0017422 | A1 * | 1/2015 | Lee | C04B 20/1018 428/323 |
| 2015/0323237 | A1 * | 11/2015 | Kim | F25D 17/062 62/66 |
| 2016/0370084 | A1 * | 12/2016 | Bessho | C09K 5/063 |

FOREIGN PATENT DOCUMENTS

| | | | |
|---|---|---|---|
| JP | 59-69693 A | 4/1984 | |
| JP | 59069693 A * | 4/1984 | .......... F28D 20/02 |
| JP | 62-19162 A | 1/1987 | |
| JP | 09-318242 A | 12/1997 | |
| JP | 10-30871 A | 2/1998 | |
| JP | 2000-111232 A | 4/2000 | |
| JP | 2002-90028 A | 3/2002 | |
| JP | 2004-101031 A | 4/2004 | |
| JP | 2008-247198 A | 10/2008 | |
| WO | 97/45685 A1 | 12/1997 | |

* cited by examiner (a) (b)

FIG. 31
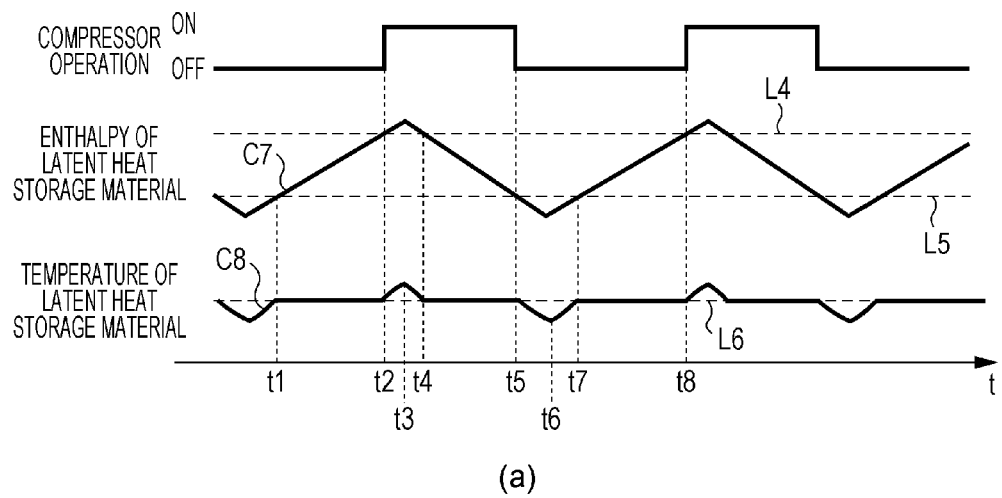
(a)
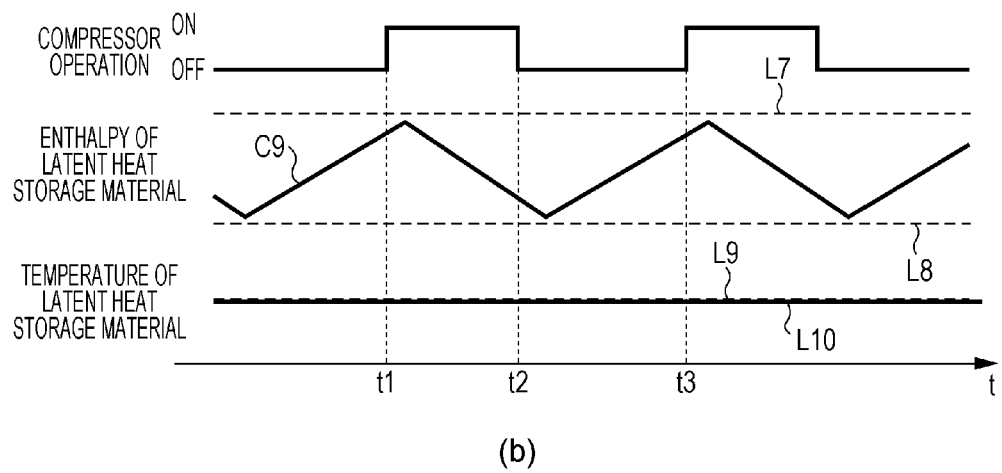
(b)

FIG. 40
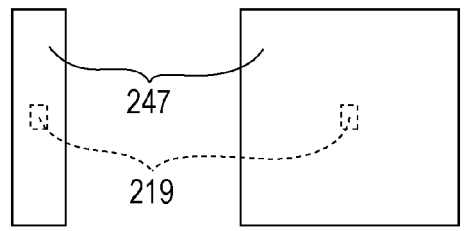
(a)
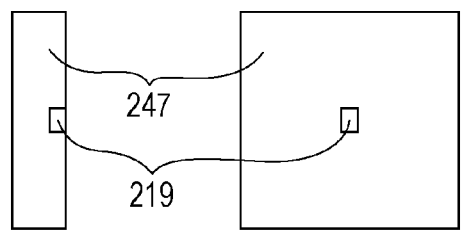
(b)
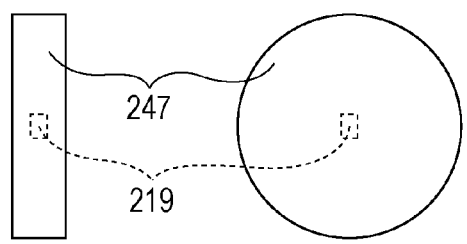
(c)
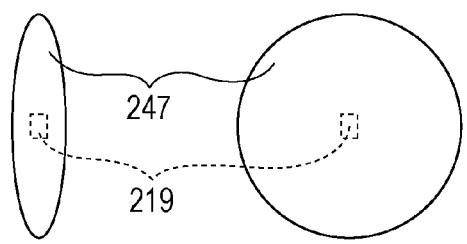
(d)

FIG. 47
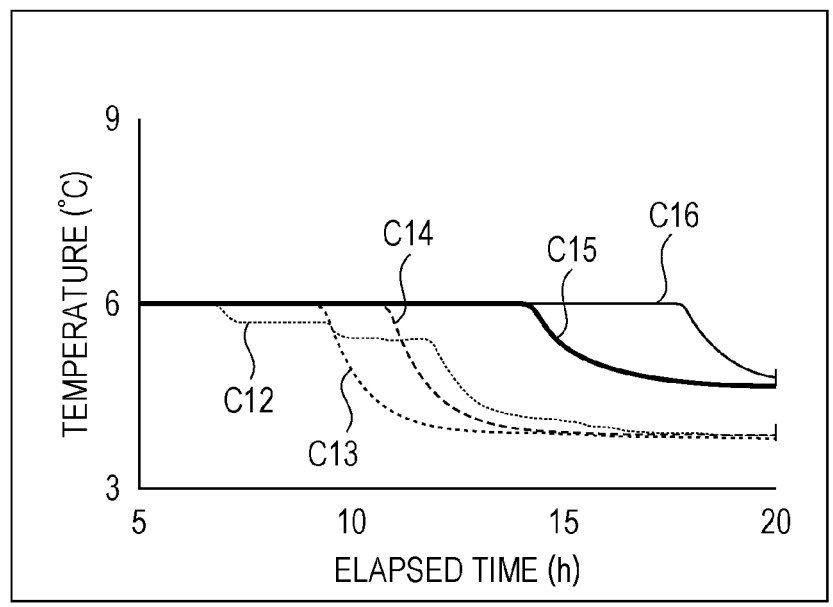
(a)
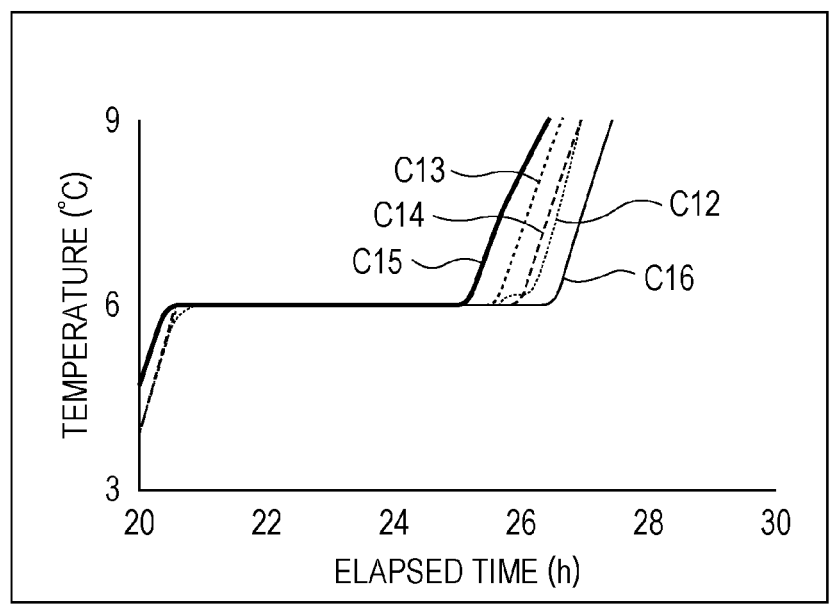
(b)

FIG. 58
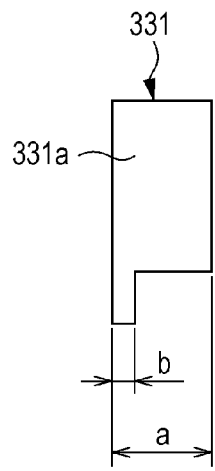
(a)
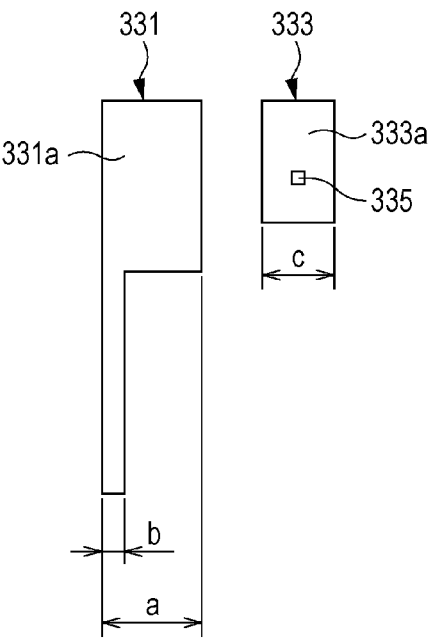
(b)
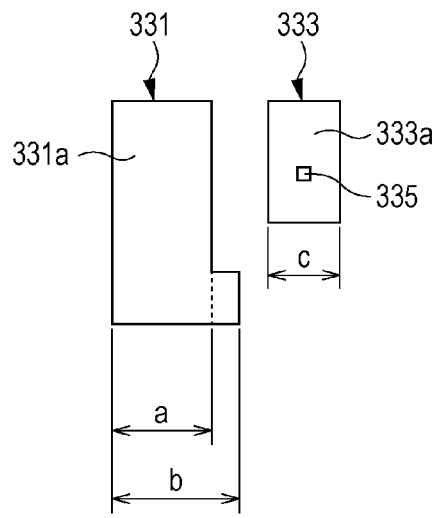
(c)
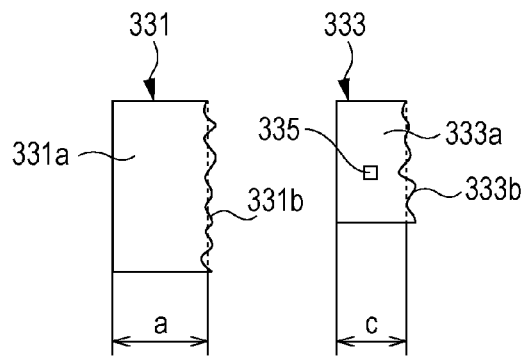
(d)

FIG. 59
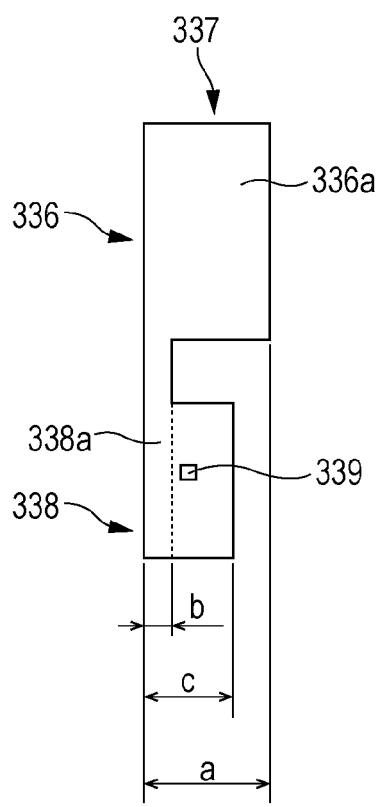 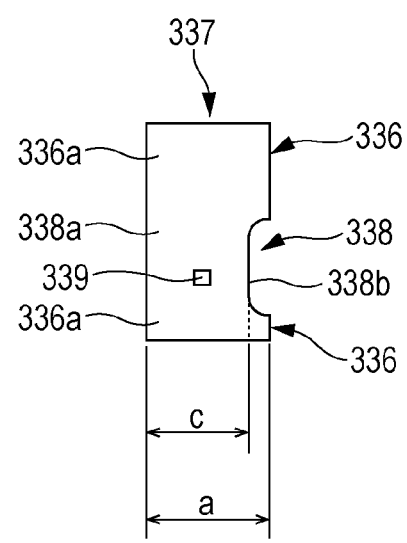
(a)  (b)

COOLING EQUIPMENT, TEMPERATURE CONTROL SYSTEM, AIR CONDITIONING SYSTEM, AND HOT WATER SUPPLY SYSTEM FOR THE SAME

TECHNICAL FIELD

The present invention relates to cooling equipment that cools storage goods.

BACKGROUND ART

In the related art, cooling equipment has been known which includes a refrigeration cycle for cooling storage goods. The refrigeration cycle is configured to have a compressor which compresses refrigerant, a condenser which condenses the compressed refrigerant and radiates condensed heat outward, an expansion unit which expands the condensed refrigerant, and an evaporator which vaporizes the expanded refrigerant and cools the inside of the cooling equipment using heat of vaporization. The cooling equipment has a control unit which controls the compressor. For example, the control unit starts the compressor to operate the refrigerating cycle when a temperature inside the cooling equipment is equal to or higher than a predetermined on-temperature, and stops the compressor when the temperature inside the cooling equipment is equal to or lower than a predetermined off-temperature which is lower than the on-temperature. Since the compressor is periodically operated in this way, the temperature inside the cooling equipment is maintained to have a predetermined temperature range.

CITATION LIST

Patent Literature

PTL 1: Japanese Unexamined Patent Application Publication No. 58-219379

SUMMARY OF INVENTION

Technical Problem

A compressor consumes a lot of power particularly in starting. In addition, the power is wastefully consumed since compressed refrigerant is diffused to cause a cooling loss when the compressor is stopped. Therefore, there has been a problem in that if the number of starts per unit time is increased in the compressor, power consumption of cooling equipment is increased.

An object of the present invention is to provide cooling equipment which can reduce power consumption.

Solution to Problem

The above-described object is achieved by providing cooling equipment including a storage chamber that stores storage goods; a latent heat storage material that is disposed inside the storage chamber; a compressor that configures a refrigerating cycle for cooling the inside of the storage chamber; a sensor that detects a state of the latent heat storage material; and a control unit that controls the compressor based on the state of the latent heat storage material.

In the cooling equipment of the present invention, the state includes any one of a temperature, a volumetric change, a mechanical strength, and optical characteristics.

In the cooling equipment of the present invention, the latent heat storage material is formed to have a different thickness depending on regions, and the sensor detects a state of a thin portion in the latent heat storage material.

In the cooling equipment of the present invention, the sensor is arranged in contact with the latent heat storage material.

In the cooling equipment of the present invention, the sensor detects a state of the latent heat storage material arranged in an upper portion inside the storage chamber.

In the cooling equipment of the present invention, the latent heat storage material is hermetically sealed inside a predetermined container.

The cooling equipment of the present invention further includes a hollow plate-shaped shelf that is disposed inside the storage chamber. The latent heat storage material is hermetically sealed inside the shelf.

The cooling equipment of the present invention further includes a cold air passage that circulates a cold air introduced to the storage chamber; and a hollow plate-shaped separator that separates the storage chamber and the cold air passage from each other. The latent heat storage material is hermetically sealed inside the separator.

Advantageous Effects of Invention

According to the present invention, it is possible to realize cooling equipment which can reduce power consumption.

BRIEF DESCRIPTION OF DRAWINGS

FIG. 31 illustrates the principle of the temperature control used in the cooling equipment, the air conditioner, and the hot water supply system according to the tenth embodiment of the present invention, and illustrates an example of a time variation or the like in a temperature of latent heat storage materials having a thickness different from each other.

FIG. 40 illustrates various shapes of a plate-shaped member 47 used in the cooling equipment 220 according to Example 3 of the tenth embodiment of the present invention.

FIG. 47 is a graph illustrating a simulation result of a time variation in a temperature at measuring points P1 to P5 in the cooling equipment 250 according to Example 6 of the tenth embodiment of the present invention.

FIG. 58 illustrates a schematic configuration of a temperature-maintaining heat storage member 331 and a temperature-control heat storage member 333 which are used in cooling equipment or the like according to the tenth embodiment of the present invention.

FIG. 59 illustrates a schematic configuration of another example of a heat storage member according to the tenth embodiment of the present invention.

DESCRIPTION OF EMBODIMENTS

First Embodiment

Figure 1:
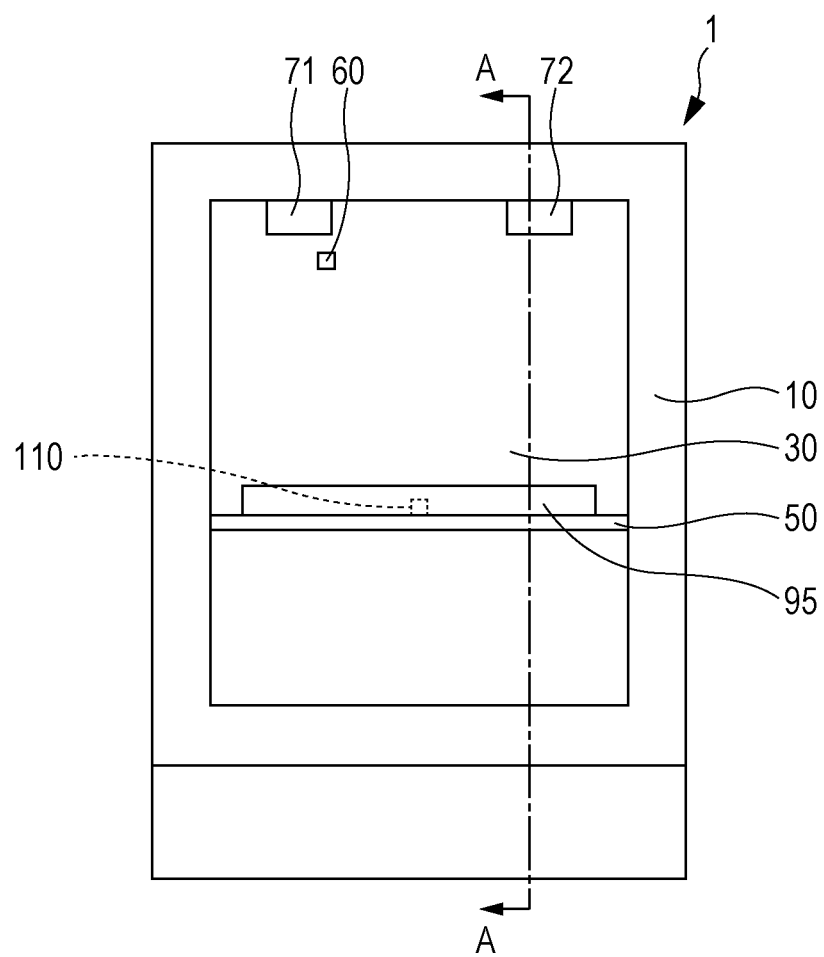
FIG. 1 is a front view illustrating a schematic configuration of cooling equipment 1 according to a first embodiment of the present invention.
Figure 2:
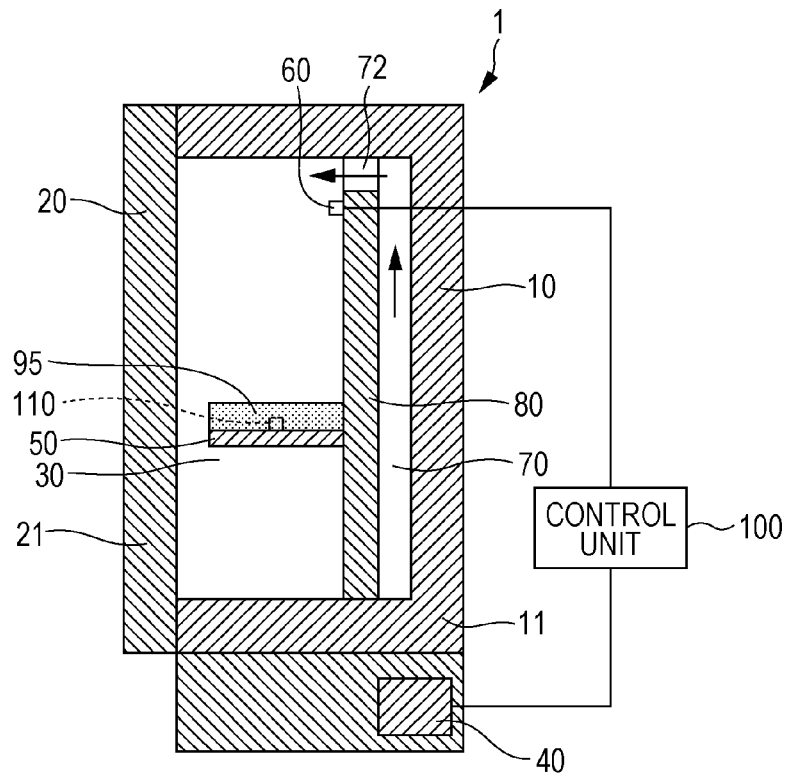
FIG. 2 is a cross-sectional view illustrating the schematic configuration of the cooling equipment 1 according to the first embodiment.

Cooling equipment according to a first embodiment of the present invention will be described with reference to FIGS. 1 to 6. The cooling equipment according to the present embodiment is used as a household refrigerator. FIG. 1 is a front view illustrating a schematic configuration of cooling equipment 1 according to the present embodiment. FIG. 2 is a cross-sectional view illustrating the schematic configuration of the cooling equipment 1 cut away along line A-A. As illustrated in FIGS. 1 and 2, the cooling equipment 1 according to the present embodiment has a cooling equipment main body 10 having a rectangular parallelepiped shape in which an opening is formed on one surface, and a door member 20 (not illustrated in FIG. 1) which is pivotally attached to the cooling equipment main body 10 via a hinge portion (not illustrated) and can open and close the opening of the cooling equipment main body 10. A storage chamber 30 which stores storage goods is formed inside the cooling equipment main body 10.

The cooling equipment main body 10 has an insulator 11 which insulates the inside of the storage chamber 30 against heat transmitted from outside. The insulator 11 fills a space between an outer wall (not illustrated) formed of a thin metal plate for example and an inner wall (not illustrated) formed of ABS resins for example. That is, the cooling equipment main body 10 has a layered structure formed from the outer wall, the insulator 11, and the inner wall. The insulator 11 is formed of fibrous insulation materials such as glass wool, foaming resin-based insulation materials such as polyurethane foam, and natural fiber-based insulation materials such as cellulose fiber.

The door member 20 has an insulator 21 which insulates the storage chamber 30 against the heat from outside. The insulator 21 fills a space between an outer wall (not illustrated) formed of a thin metal plate for example and an inner wall (not illustrated) formed of ABS resins for example. Similarly to the cooling equipment main body 10, the door member 20 has a layered structure formed from the outer wall, the insulator 21, and the inner wall. The insulator 21 is formed of the same materials as those of the insulator 11. In a state where the door member 20 is closed, a space surrounded with the insulator 11 of the cooling equipment main body 10 and the insulator 21 of the door member 20 serves as an insulation space insulated from outside.

In addition, the cooling equipment 1 has a compressor 40 which configures a part of a vapor compression type refrigerating cycle for cooling the inside of the storage chamber 30 and compresses refrigerant. Although not illustrated, in addition to the compressor 40, the refrigerating cycle is configured to have at least a condenser which condenses the refrigerant compressed in the compressor 40 and radiates heat outward, an expansion unit which expands the condensed refrigerant (for example, a capillary tube), and an evaporator which vaporizes the expanded refrigerant and cools the inside of the storage chamber 30 by using vaporization heat. The compressor 40 and the condenser are disposed outside the insulation space surrounded with the insulators 11 and 21. The evaporator is disposed in a cold air passage 70 to be described later within the insulation space. For example, the compressor 40 is disposed in a lower portion of the cooling equipment main body 10.

The storage chamber 30 has a flat plate-shaped shelf 50 which divides a space inside the storage chamber 30 into an upper space and a lower space. The shelf 50 is horizontally supported by a shelf support or the like disposed on left and right inner walls inside the storage chamber 30 in a front view.

A temperature sensor 60 is disposed in an upper left portion within a rear side inner wall (for example, a separator 80 to be described later) of the storage chamber 30 in a front view. The temperature sensor 60 detects a temperature around the temperature sensor 60 inside the storage chamber 30 and outputs a temperature signal.

In addition, the cooling equipment 1 has a control unit 100 which includes a CPU, a ROM, a RAM, and input and output ports and controls the entire cooling equipment 1. The temperature sensor 60 is connected to the input port of the control unit 100. The control unit 100 controls the compressor 40 based on the temperature signal input from the temperature sensor 60. For example, based on the input temperature signal, the control unit 100 starts the compressor 40 when determining that a temperature inside the storage chamber 30 is equal to or higher than a first threshold temperature. This operates the refrigerating cycle to lower the temperature inside the storage chamber 30. In addition, based on the input temperature signal, the control unit 100 stops the compressor 40 when determining that a temperature inside the storage chamber 30 is equal to or lower than a second threshold temperature which is lower than the first threshold temperature. This stops the refrigerating cycle to raise the temperature inside the storage chamber 30. After the compressor 40 is stopped and when determining that the temperature inside the storage chamber 30 is raised to be equal to or higher than the first threshold temperature, the control unit 100 restarts the compressor 40. The temperature inside the storage chamber 30 is maintained to have a predetermined temperature range since the control unit 100 controls the compressor 40 to periodically repeat the start and the stop. In the present embodiment, the temperature range between the first threshold temperature and the second threshold temperature is approximately 2° C. to 5° C.

The cold air passage 70 that is for example vertically extending is disposed inside the insulator 11, which is a further rear side from the storage chamber 30. The cold air passage 70 circulates cold air which is supplied by a blower (not illustrated) and cooled by heat exchange with the evaporator. An arrow in FIG. 2 indicates a flowing direction of the cold air. The cold air circulating in the cold air passage 70 is caused to blow out into the storage chamber 30 from a plurality of cold air ports (only two cold air ports 71 and 72 are illustrated in FIG. 1) disposed in an upper portion for example within the rear side inner wall of the storage chamber 30. In the cooling equipment 1 of the present embodiment, the inside of the storage chamber 30 is cooled by the cold air which circulates in the cold air passage 70 and blows out from the cold air ports 71 and 72. The storage chamber 30 and the cold air passage 70 are separated from each other by a plate-shaped separator 80. The cold air blowing out into the storage chamber 30 returns to the cold air passage 70 via a suction port (not illustrated) disposed in a lower portion inside the storage chamber 30 for example.

A heat storage member 95 is disposed on an upper surface of the shelf 50. The heat storage member 95 has a rectangular flat plate shape as a whole. The heat storage member 95 has a configuration in which the inside of a hollow container body filled with a latent heat storage material is hermetically sealed. The latent heat storage material stores or radiates heat energy by using a phase change between a solid phase and a liquid phase. In the present embodiment, the container body is made of a resin and has a predetermined rigidity. If the latent heat storage material is flammable, it is desirable to form the container body by using a flame retardant material. When using paraffin as the latent heat storage material, it is desirable that the container body have a gas barrier property since paraffin is a volatile organic compound (VOC) depending on types. Alternatively, a sheet or a film which adsorbs gas of paraffin may be used.

The heat storage member 95 is generally used in a predetermined working temperature range and working pressure range. The heat storage member 95 of the present embodiment is cooled inside the storage chamber 30 so as to store coldness when the compressor 40 of the cooling equipment 1 is operated, and radiates the coldness so as to suppress the temperature rising inside the storage chamber 30 when the compressor 40 is stopped. In this case, the working temperature range of the heat storage member 95 includes a temperature inside the storage chamber 30 during a normal operation. In addition, the working pressure of the heat storage member 95 is an atmospheric pressure, for example.

The latent heat storage material inside the heat storage member 95 has a phase change temperature (melting point) which reversibly causes a phase change between the solid phase and the liquid phase within the working temperature range of the heat storage member 95. The latent heat storage material has the liquid phase at a temperature higher than the phase change temperature and the solid phase at a temperature lower than the phase change temperature. The heat storage material in the phase change temperature becomes a solid and liquid two-phase state. The latent heat storage material at the phase change temperature is in a two-phase, solid and liquid phases, state where the solid phase and the liquid phase are mixed together. The phase change temperature of the latent heat storage material used in the present embodiment is equal to or higher than a temperature of the heat storage member 95 when the compressor 40 is stopped by the control of the control unit 100 (that is, when the detected temperature of the temperature sensor 60 is the second threshold temperature), and is equal to or lower than a temperature of the heat storage member 95 when the compressor 40 is started by the control of the control unit 100 (that is, when the detected temperature of the temperature sensor 60 is the first threshold temperature). As illustrated by a graph in FIG. 3 to be described later, in the present embodiment, the temperature of the heat storage material (temperature of the heat storage material surface) is transited across the phase change temperature, thereby achieving the above-described temperature control.

Here, temperature distribution inside the storage chamber 30 is not uniform. In general, due to influence of the heat from the outside, the temperature near the left and right inner walls of the storage chamber 30 having the heat storage member 95 and the temperature in the upper portion inside the equipment are higher than a temperature in the lower portion inside the equipment. In the present embodiment also, it can be understood that the temperature of the upper portion inside the equipment is higher than the temperature of the lower portion by comparing FIGS. 3 and 9 to be described later. Therefore, the temperature detected by the temperature sensor 60 is not necessarily the same as the temperature of the heat storage member.

The latent heat storage material of the present embodiment contains paraffin. As the latent heat storage material, single normal (a straight-chain type structure) paraffin (general formula is $C_nH_{2n+2}$) or a mixture is used.

In a case of using the single paraffin, a melting point of the latent heat storage material varies depending on the carbon number n of paraffin. In a case of using the mixture of two types or more of paraffin, it is possible to adjust the melting point of the latent heat storage material by changing a mixing ratio. In the present embodiment, as the latent heat storage material, for example, single n-tetradecane (molecular formula: $C_{14}H_{30}$) is used. The melting point of the n-tetradecane is approximately 4° C. to 6° C. A boiling point of the n-tetradecane is approximately 250° C. As the latent heat storage material, it is possible to use various materials such as ice (water) and inorganic salt without being limited to paraffin.

For example, the latent heat storage material contains a gelling agent for gelling (solidifying) paraffin. A gel (chemical gel) means that molecules are cross-linked to form a three-dimensional network structure and the inside thereof absorbs solvent to swell. The gel is chemically stable without being dissolved as long as a structure thereof is broken. The gelling agent leads to a gelling effect only by allowing paraffin to contain a few mass % of the gelling agent.

The gelling agent used in the present embodiment contains a polymeric material. In addition, as the polymeric material, polyethylene is used. That is, the latent heat storage material of the present embodiment is polyethylene-containing paraffin gelled with polyethylene. It is possible to change viscosity of the latent heat storage material by adjusting the mixing ratio of polyethylene. The melting point of polyethylene used in the present embodiment is 130° C. Polyethylene-containing paraffin is not fluidized in a temperature up to 70° C. to 80° C. by using a suitable amount of polyethylene, and has no liquidity since the polyethylene-containing paraffin maintains the solid state as a whole even if paraffin is phase-changed between the solid phase and the liquid phase. In this manner, the latent heat storage material in the gel state can maintain the solid state as a whole before and after the phase change, thereby being handled with ease. Therefore, when using the latent heat storage material in the gel state, the latent heat storage material itself maintains a stable shape. Accordingly, it is possible to use a film-shaped container body as the container body containing the latent heat storage material.

In general, as the heat energy, the latent heat storage material stores latent heat which is exchanged with the outside during the phase change of materials. For example, in the heat storage using the phase change between the solid phase and the liquid phase, the heat of fusion at the melting point of the latent heat storage material is used. As long as two phases are mixed together between the solid phase and the liquid phase during the phase change, the latent heat storage material continues to take the heat from the outside at a constant phase change temperature. Accordingly, it is possible to suppress the temperature from rising to the melting point or higher for a relatively long period of time.

Figure 3:
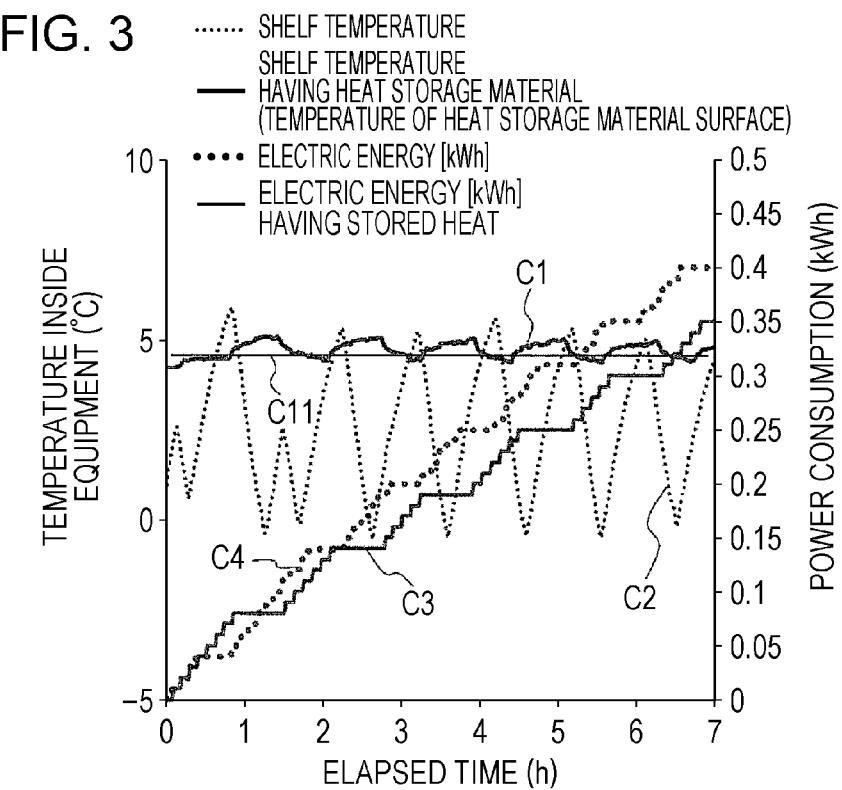
FIG. 3 is a graph illustrating a time variation in a temperature inside equipment and power consumption in the cooling equipment 1 according to the first embodiment of the present invention and cooling equipment in a comparative example.

FIG. 3 is a graph illustrating a time variation in the temperature inside the equipment (shelf temperature) and power consumption (electric energy) in the cooling equipment 1 according to the present embodiment and cooling equipment in a comparative example, which has a configuration the same as that of the cooling equipment 1 except that the heat storage member 95 is not provided, respectively. A horizontal axis represents an elapsed time (h) from a time when the temperature is stabilized after the lapse of three hours from power supply. A vertical axis represents a temperature inside the equipment (° C.) or power consumption (kWh). A curve C1 of a solid line represents the time variation in the temperature inside the cooling equipment 1 in the present embodiment, and a curve C2 of a dashed line represents the time variation in the temperature inside the cooling equipment of the comparative example. In addition, a curve C3 of the solid line represents the time variation in the power consumption in the cooling equipment 1 of the present embodiment, and a curve C4 of the dashed line represents the time variation in the power consumption in the cooling equipment of the comparative example. A solid straight line C11 represents the phase change temperature (approximately 4.5° C.) of the latent heat storage material. The temperature inside each cooling equipment was measured by using a temperature measurement sensor 110 (refer to FIGS. 1 and 2) arranged in substantially a center portion on an upper surface of the shelf 50 which is provided in substantially a center portion of the storage chamber 30. In the cooling equipment 1 of the present embodiment, the temperature measurement sensor 110 is in contact with a lower surface of the container body of the heat storage member 95. The center portion of the storage chamber 30 is unlikely to be affected by the heat from outside, and the temperature in the center portion is relatively low in the storage chamber 30. A volume of the storage chamber 30 of each cooling equipment is approximately 170 liters, and total mass of the latent heat storage material used in the cooling equipment 1 of the present embodiment is approximately 2 kg. Although not illustrated in FIGS. 1 and 2, the latent heat storage material is also arranged in a portion on the rear side inner wall of the storage chamber 30 and inside a door pocket inside the door member 20. A room temperature is 20° C.

In a state where the compressor 40 is operated, the temperature inside the equipment is lowered, and in a state where the compressor 40 is stopped, the temperature inside the equipment is raised. Therefore, in the curves C1 and C2 of FIG. 3, the time when the temperature inside the equipment is the relative maximum is generally the time when the compressor 40 is started, and the time when the temperature inside the equipment is the relative minimum is generally the time when the compressor 40 is stopped. As illustrated by the curve C2, in the cooling equipment of the comparative example, the compressor 40 is started approximately six times during the elapsed time of seven hours. On the other hand, as illustrated by the curve C1, in the cooling equipment 1 of the present embodiment, the compressor 40 is started five times during the same elapsed time of seven hours. Therefore, it is understood that in the cooling equipment 1 of the present embodiment, the number of starts of the compressor 40 per unit time is decreased. This is because the heat storage member 95 disposed inside the storage chamber 30 suppresses the temperature rising inside the equipment when the compressor 40 is stopped and thus it is possible to prolong the time from the stop of the compressor 40 to the next start. In addition, as illustrated by the curves C3 and C4, it is understood that the power consumption of the cooling equipment 1 of the present embodiment is smaller than the power consumption of the cooling equipment of the comparative example. The power is turned on in a state where the temperature inside each cooling equipment is equal to the room temperature and operation was performed for ten hours. At this time, total power consumption is 0.71 kWh in the cooling equipment of the comparative example and in contrast, total power consumption was 0.61 kWh in the cooling equipment 1 of the present embodiment.

Figure 4:
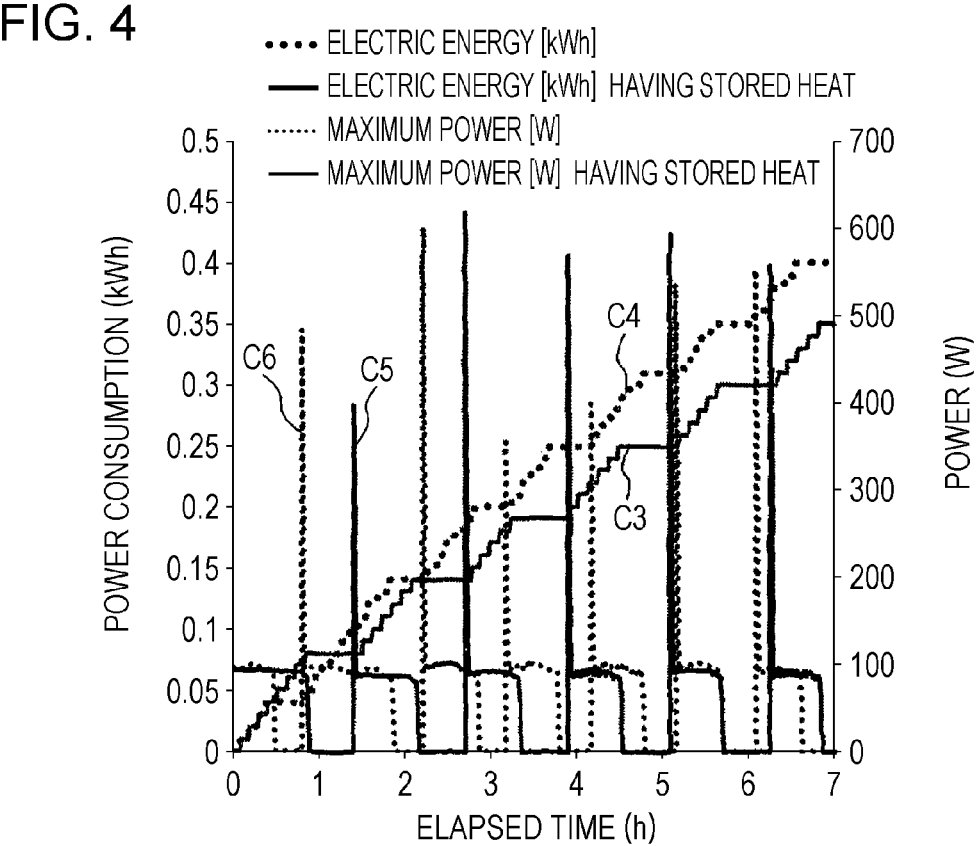
FIG. 4 is a graph illustrating a time variation in power consumption and the maximum power in the cooling equipment 1 according to the first embodiment of the present invention and cooling equipment in a comparative example.
Figure 5:
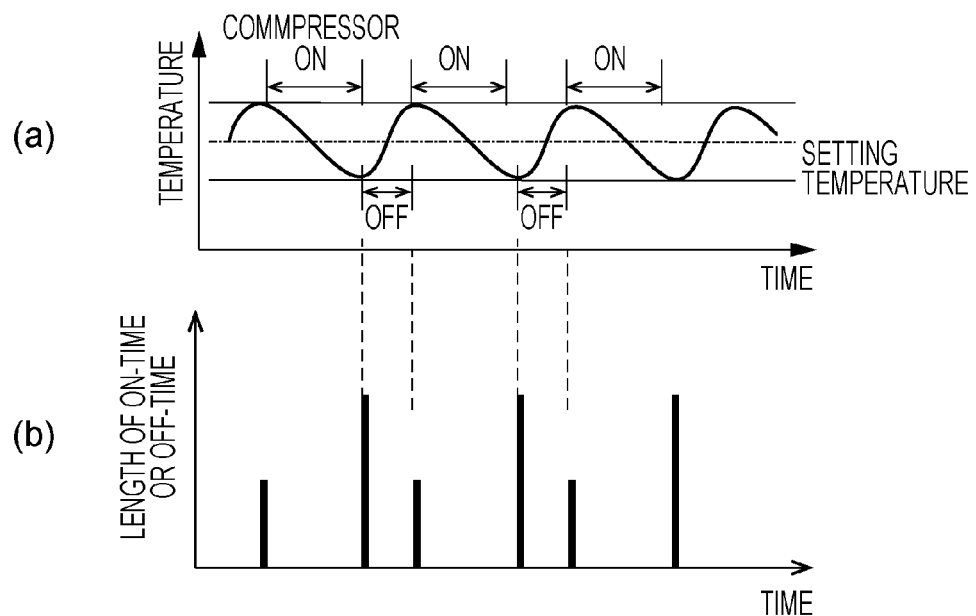
FIG. 5 is a graph illustrating on-time and off-time of a compressor in the cooling equipment 1 according to the first embodiment of the present invention and cooling equipment in a comparative example.

FIG. 4 is a graph illustrating a time variation in the power consumption (electric energy) and the maximum power in the cooling equipment 1 according to the present embodiment and the cooling equipment of the comparative example, respectively. The horizontal axis represents the elapsed time (h) corresponding to the horizontal axis in FIG. 3. The vertical axis represents the power consumption (kWh) or the power (W). The curves C3 and C4 are the same as the curves C3 and C4 in FIG. 3. A curve C5 of the solid line represents the time variation in the maximum power of the cooling equipment 1 of the present embodiment, and a curve C6 of the dashed line represents the time variation in the maximum power of the cooling equipment of the comparative example.

As illustrated by the curves C5 and C6, the power supplied to the compressor 40 has a sharp peak when being started. This is due to the fact that inrush current when the compressor 40 is started (instantaneous current temporarily flowing when the compressor 40 is started) is very high. Therefore, in order to reduce the power consumption of the cooling equipment, it is effective to reduce the number of starts of the compressor 40 per unit time. In the cooling equipment 1 of the present embodiment, it is possible to reduce the number of starts of the compressor 40 per unit time as compared to the cooling equipment of the comparative example. Therefore, it is possible to reduce the power consumption.

Figure 6:
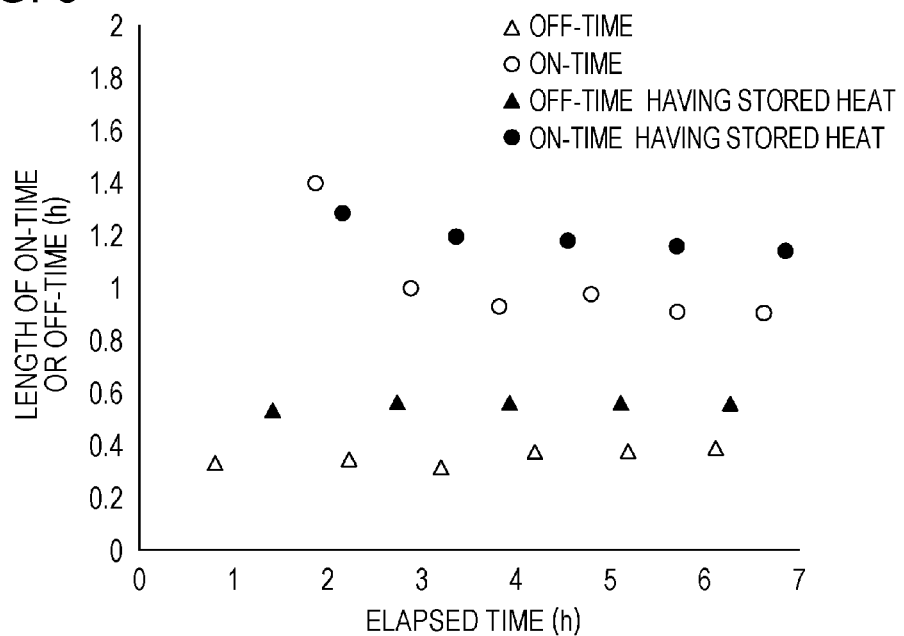
FIG. 6 is a graph illustrating on-time and off-time of the compressor in the cooling equipment 1 according to the first embodiment of the present invention and cooling equipment in a comparative example.

FIG. 5(a) is a graph illustrating a concept of the time variation in the temperature inside the cooling equipment, and FIG. 5(b) is a graph illustrating a length of time for which the previous state is continued until the time (on-time or off-time) when the compressor 40 is switched over between an on-state and an off-state. FIG. 6 is a graph plotting the length of the on-time or the off-time of the compressor 40 in the cooling equipment 1 of the present embodiment and the cooling equipment of the comparative example respectively by using the concept of the graph illustrated in FIGS. 5(a) and 5(b). A white circle in FIG. 6 represents the on-time of the cooling equipment of the comparative example and a white triangle represents the off-time of the cooling equipment of the comparative example. A black circle represents the on-time of the cooling equipment 1 of the present embodiment and a black triangle represents the off-time of the cooling equipment 1 of the present embodiment.

As illustrated in FIG. 6, in the cooling equipment 1 of the present embodiment, as compared to the cooling equipment of the comparative example, not only the off-time is prolonged but also the on-time is prolonged since the heat storage member 95 is disposed inside the equipment. Therefore, when comparing a period of one cycle from the start to the next start of the compressor 40, the power consumption of the cooling equipment 1 of the present embodiment is not necessarily decreased compared to the cooling equipment of the comparative example. However, in the cooling equipment 1 of the present embodiment, the number of starts of the compressor 40 per unit time is less than that of the cooling equipment of the comparative example. Therefore, it is possible to reduce the power consumption as a whole.

As described above, the cooling equipment 1 of the present embodiment has the storage chamber 30 which stores storage goods; the compressor 40 which configures the refrigerating cycle for cooling the inside of the storage chamber 30; the temperature sensor 60 which is arranged in a predetermined section in the storage chamber 30 and detects the temperature inside the storage chamber 30; the control unit 100 which starts the compressor 40 when the temperature inside the chamber is equal to or higher than the first threshold temperature and stops the compressor 40 when the temperature inside the chamber is equal to or lower than the second threshold temperature which is lower than the first threshold temperature; and the latent heat storage material (heat storage member 95) which is disposed inside the storage chamber 30 in order to decrease the number of starts of the compressor 40 per unit time.

According to this configuration, the heat storage member 95 suppresses the temperature rising inside the storage chamber 30 when the compressor 40 is stopped. Therefore, it is possible to decrease the number of starts of the compressor 40 per unit time. Accordingly, it is possible to reduce the power consumption of the cooling equipment 1. In addition, it is possible to cool the inside of the equipment during a power failure by using the latent heat storage material.

In addition, in the cooling equipment 1 of the present embodiment, when the temperature inside the chamber is the first threshold temperature (when the compressor 40 is started), the temperature of the latent heat storage material is equal to or higher than the phase change temperature, and when the temperature inside the chamber is the second threshold temperature (when the compressor 40 is stopped), the temperature of the latent heat storage material is equal to or lower than the phase change temperature.

According to this configuration, by utilizing the latent heat generated by the phase change in the latent heat storage material, it is possible to suppress the temperature rising inside the storage chamber 30 when the compressor 40 is stopped. Therefore, it is possible to decrease the number of starts of the compressor 40 per unit time.

In addition, in the cooling equipment 1 of the present embodiment, the latent heat storage material is hermetically sealed inside the predetermined container body. According to this configuration, the latent heat storage material is handled with ease and thus the latent heat storage material is easily arranged inside the storage chamber 30.

In addition, according to the present embodiment, it is possible to reduce the power consumption of cooling equipment without using an inverter system. Therefore, it is not necessary to design an inverter circuit or to use an inverter type compressor. Accordingly, it is possible to realize the cooling equipment which can reduce the power consumption with a simple mechanism and low cost.

Second Embodiment

Figure 7:
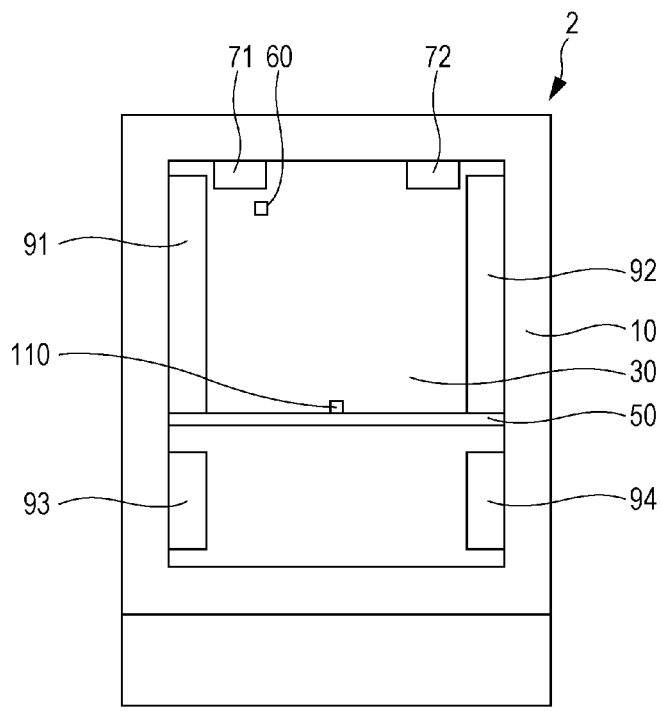
FIG. 7 is a front view illustrating a schematic configuration of cooling equipment 2 according to a second embodiment of the present invention.
Figure 8:
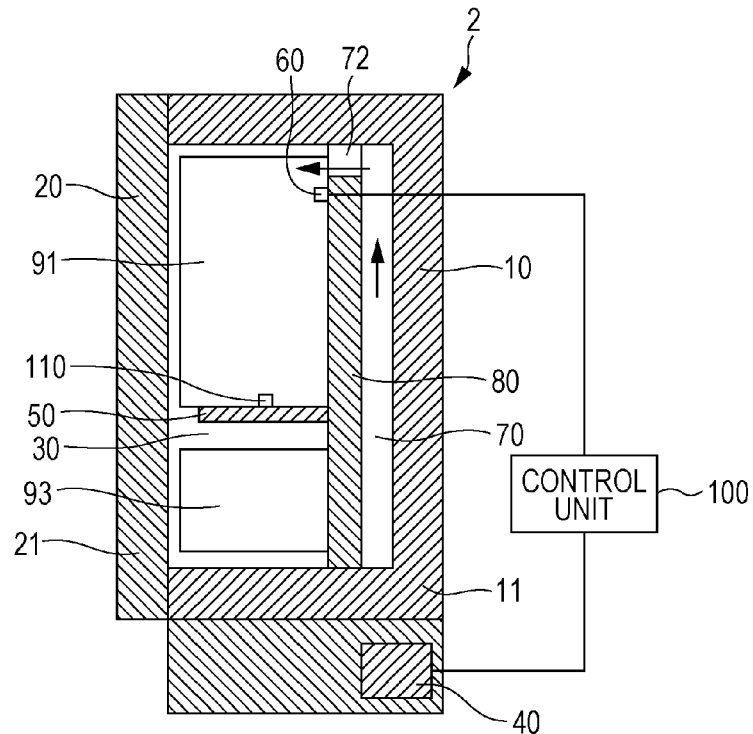
FIG. 8 is a cross-sectional view illustrating the schematic configuration of the cooling equipment 2 according to the second embodiment of the present invention.

Next, cooling equipment according to a second embodiment of the present invention will be described with reference to FIGS. 7 to 9. FIG. 7 is a front view illustrating a schematic configuration of cooling equipment 2 according to the present embodiment. FIG. 8 is a cross-sectional view illustrating the schematic configuration of the cooling equipment 2 so as to correspond to FIG. 2. The same reference numerals are given to the same configuring elements having functions and operations which are the same as those of the cooling equipment 1 according to the first embodiment, and the description thereof will be omitted.

As illustrated in FIGS. 7 and 8, the cooling equipment 2 of the present embodiment is different from the cooling equipment 1 of the first embodiment in that heat storage members 91 to 94 disposed on left and right inner walls (side walls) of the storage chamber 30 are provided instead of the heat storage member 95 disposed on the upper surface of the shelf 50. Each of the heat storage members 91 to 94 has a rectangular flat plate shape as a whole. The heat storage members 91 to 94 have a configuration where the inside of a hollow container body which is hermetically sealed is filled with a latent heat storage material. The heat storage member 91 is attached to the left side inner wall of an upper space which is above the shelf 50 within the storage chamber 30, and the heat storage member 92 is attached to the right side inner wall of the upper space. The heat storage member 93 is attached to the left side inner wall of a lower space which is below the shelf 50 within the storage chamber 30, and the heat storage member 94 is attached to the right side inner wall of the lower space.

Figure 9:
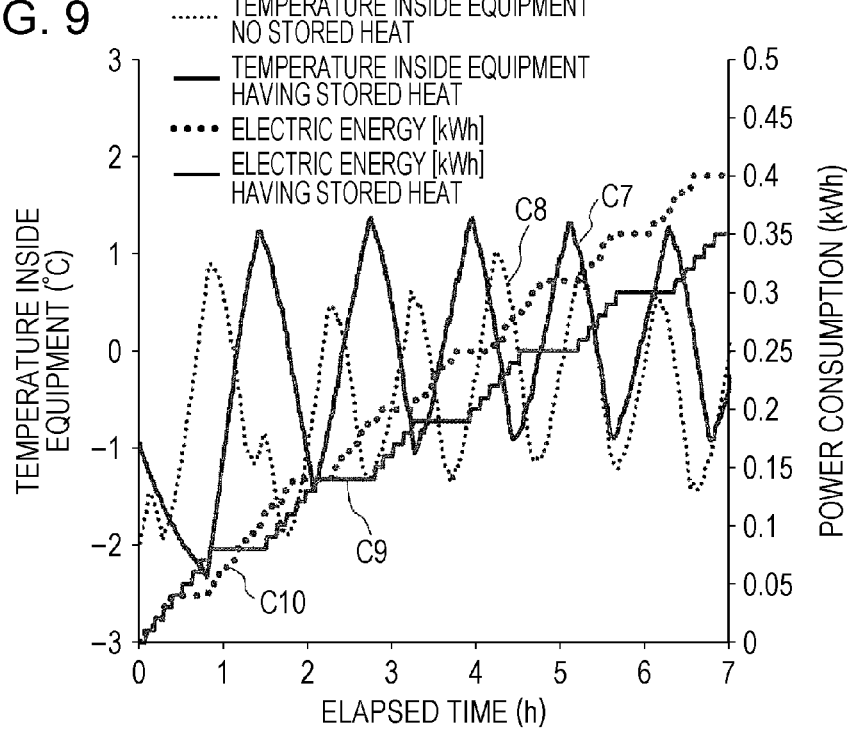
FIG. 9 is a graph illustrating a time variation in a temperature inside equipment and power consumption in the cooling equipment 2 according to the second embodiment of the present invention and cooling equipment in a comparative example.

FIG. 9 is a graph illustrating a time variation in the temperature inside the equipment and the power consumption (electric energy) respectively in the cooling equipment 2 according to the present embodiment and cooling equipment in a comparative example which has a configuration the same as that of the cooling equipment 2 except that the heat storage members 91 to 94 are not disposed. A horizontal axis represents an elapsed time (h) from a time when the temperature is stabilized after the lapse of three hours from power supply. A vertical axis represents a temperature inside the equipment (° C.) or power consumption (kWh). A curve C7 of a solid line represents the time variation in the temperature inside the cooling equipment 2 in the present embodiment, and a curve C8 of a dashed line represents the time variation in the temperature inside the cooling equipment of the comparative example. In addition, a curve C9 of the solid line represents the time variation in the power consumption in the cooling equipment 2 of the present embodiment, and a curve C10 of the dashed line represents the time variation in the power consumption in the cooling equipment of the comparative example. The temperature inside each cooling equipment was measured by using the temperature measurement sensor 110 (refer to FIGS. 7 and 8) arranged in substantially a center portion on an upper surface of the shelf 50 which is substantially a center portion of the storage chamber 30.

In the curves C7 and C8 of FIG. 9, the time when the temperature inside the equipment is the relative maximum is generally the time when the compressor 40 is started, and the time when the temperature inside the equipment is the relative minimum is generally the time when the compressor 40 is stopped. As illustrated by the curve C8, in the cooling equipment of the comparative example, the compressor 40 is started approximately six times during the elapsed time of seven hours. On the other hand, as illustrated by the curve C7, in the cooling equipment 2 of the present embodiment, the compressor 40 is started five times during the same elapsed time of seven hours. Therefore, it is understood that in the cooling equipment 2 of the present embodiment, the number of starts of the compressor 40 per unit time is decreased. This is because the heat storage members 91 to 94 disposed inside the storage chamber 30 suppress the temperature rising inside the equipment when the compressor 40 is stopped and thus it is possible to prolong the time from the stop of the compressor 40 to the next start. In addition, as illustrated by the curves C9 and C10, it is understood that the power consumption of the cooling equipment 2 of the present embodiment is smaller than the power consumption of the cooling equipment of the comparative example.

Third Embodiment

Figure 10A:
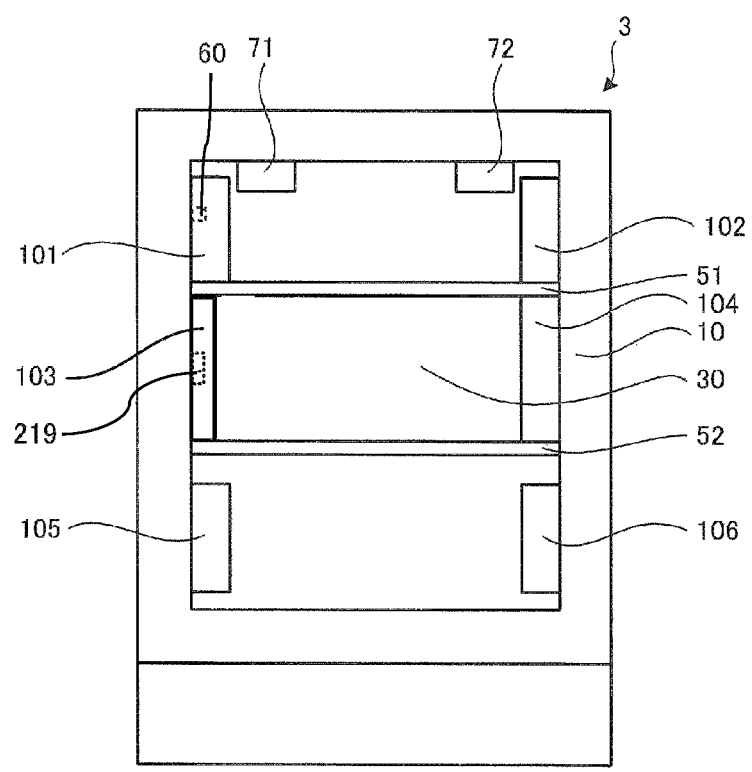
FIG. 10(a) and FIG. 10(b) are front views illustrating a schematic configuration of cooling equipment 3 according to a third embodiment of the present invention.
Figure 10B:
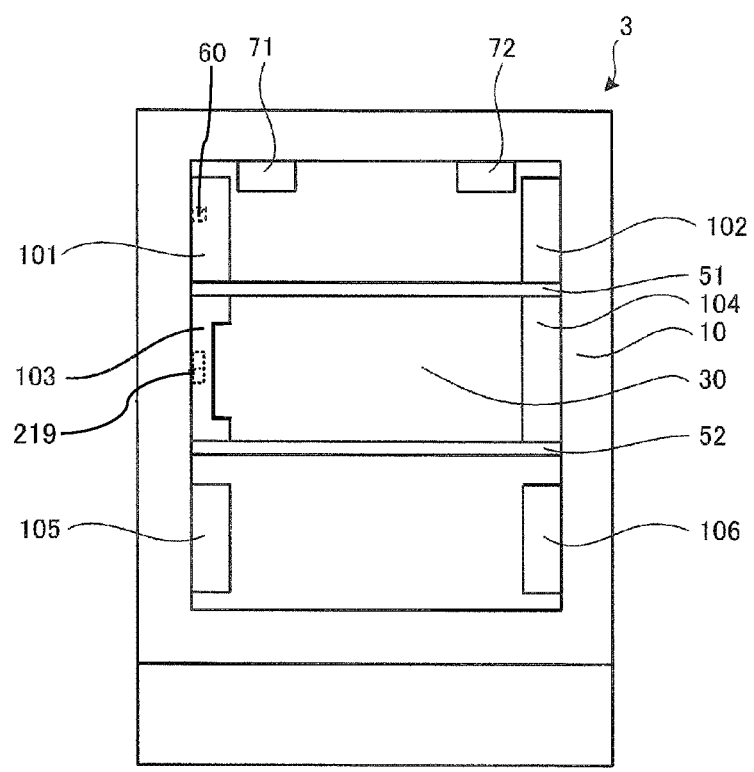
Figure 11:
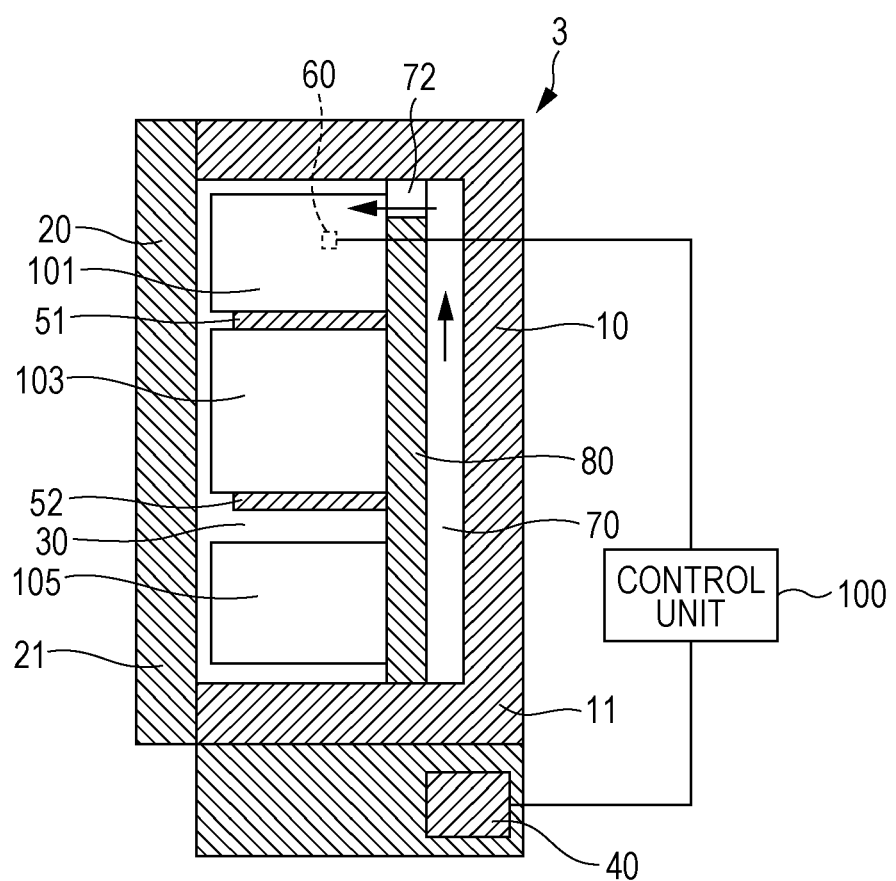
FIG. 11 is a cross-sectional view illustrating the schematic configuration of the cooling equipment 3 according to the third embodiment.

Next, cooling equipment according to a third embodiment of the present invention will be described with reference to FIGS. 10 to 13. FIG. 10 is a front view illustrating a schematic configuration of cooling equipment 3 according to the present embodiment. FIG. 11 is a cross-sectional view illustrating the schematic configuration of the cooling equipment 3 so as to correspond to FIG. 2. The same reference numerals are given to the same configuring elements having functions and operations which are the same as those of the cooling equipment 1 according to the first embodiment, and the description thereof will be omitted.

As illustrated in FIGS. 10 and 11, the storage chamber 30 has an upper shelf 51 which defines an upper space of the storage chamber 30 and a lower shelf 52 which is arranged below the upper shelf 51 and defines a middle space of the storage chamber 30 between the lower shelf 52 and the upper shelf 51. The upper shelf 51 and the lower shelf 52 are respectively and horizontally supported by shelf supports or the like disposed on left and right inner walls inside the storage chamber 30 in a front view. A lower space of the storage chamber 30 is formed below the lower shelf 52.

Heat storage members 101 to 106 are disposed on the left and right inner walls of the storage chamber 30. The heat storage member 101 is attached to the left side inner wall of the upper space which is above the upper shelf 51 within the storage chamber 30. The heat storage member 102 is attached to the right side inner wall of the upper space. The heat storage member 103 is attached to the left side inner wall of the middle space between the upper shelf 51 and the lower shelf 52 within the storage chamber 30. The heat storage member 104 is attached to the right side inner wall of the middle space. The heat storage member 105 is attached to the left side inner wall of the lower space which is below the lower shelf 52 within the storage chamber 30. The heat storage member 106 is attached to the right side inner wall of the lower space.

The temperature sensor 60 used for controlling the compressor 40 is disposed near the heat storage member 101 whose thickness can be thinner than that of the heat storage members 102 to 106, as shown in (a) of FIG. 10, in the upper space of the storage chamber 30 where the temperature is relatively high inside the storage chamber 30. Alternatively, the temperature sensor 60 can be disposed in a recess 109 disposed to be partially thinner than the average thickness of the storage member having the recess 109. As shown in (b) of FIG. 10 the recess 109 is thinner than the thickness of the remaining portion of the storage member 101. Specifically, the temperature sensor 60 is disposed on the left side inner wall of the upper space of the storage chamber 30 so as to be interposed between the inner wall and the heat storage member 101. Therefore, the temperature sensor 60 for control of the present embodiment is in contact with a container body of the heat storage member 101. The temperature sensor 60 may be disposed inside the container body of the heat storage member 101 so as to be in direct contact with the latent heat storage material.

Figure 12:
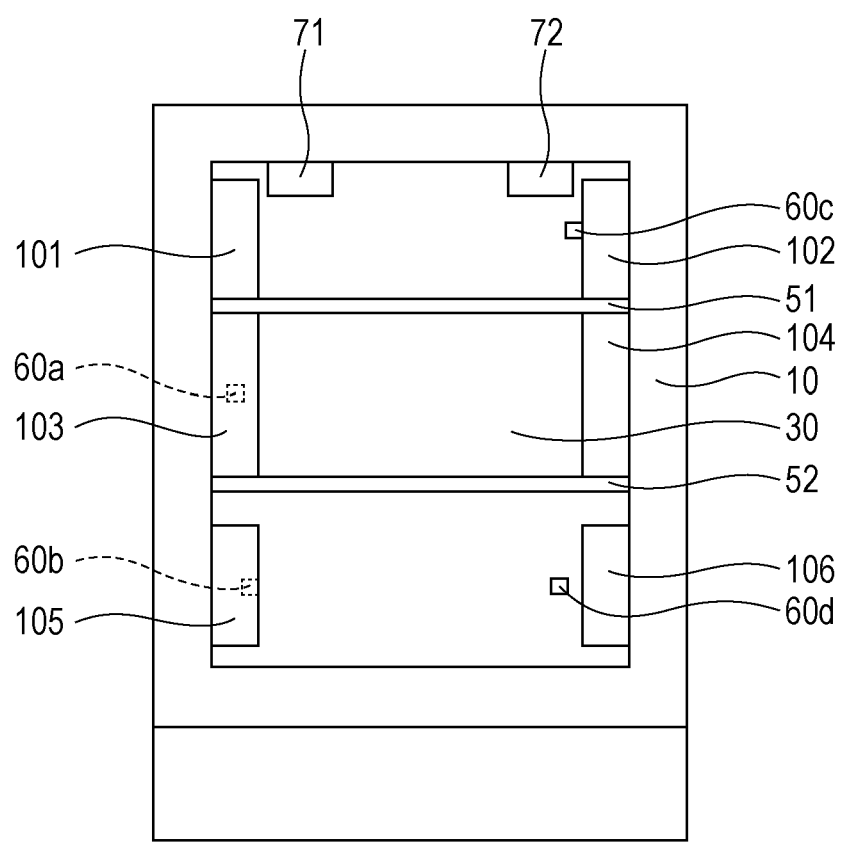
FIG. 12 illustrates a modification example of an installation position of a temperature sensor 60 in the cooling equipment 3 according to the third embodiment of the present invention.
Figure 13:
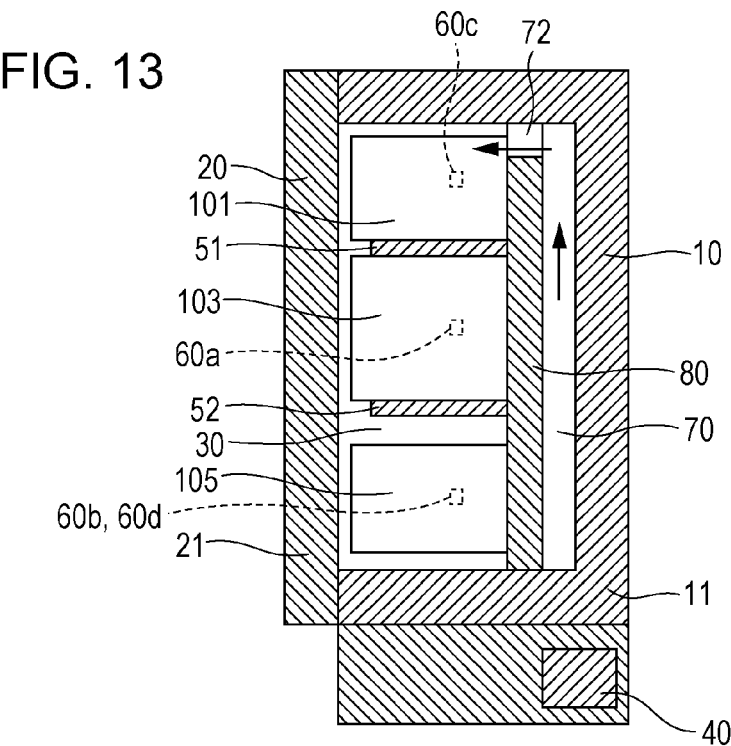
FIG. 13 illustrates a modification example of the installation position of the temperature sensor 60 in the cooling equipment 3 according to the third embodiment of the present invention.

FIGS. 12 and 13 respectively correspond to FIGS. 10 and 11 and illustrate a modification example of an installation position of the temperature sensor 60. As illustrated in FIGS. 12 and 13, the temperature sensor 60 (60a) may be disposed inside the heat storage member 103 (center portion of the latent heat storage material inside the container body and the like). In addition, the temperature sensor 60 (60b) may be disposed on a surface inside the equipment, which is inside the heat storage member 105. In addition, the temperature sensor 60 (60c) may be disposed on a surface of the heat storage member 102 (surface of the container body). In addition, the temperature sensor 60 (60d) may be disposed near the heat storage member 106 without being in contact with the heat storage member 106. The temperature sensor 60 is arranged in view of temperature rising of the heat storage member and temperature rising inside the equipment. That is, when controlling the heat storage member and the inside of the equipment to have a low temperature, the temperature sensor 60 may be arranged in the upper space inside the equipment where the temperature rises early. In addition, when controlling the heat storage member and the inside of the equipment to have an average temperature, the temperature sensor 60 may be arranged near the heat storage member in a middle stage (middle space) inside the equipment.

As described above, the cooling equipment 3 of the present embodiment has the storage chamber 30 which stores storage goods; the latent heat storage material (heat storage member 101) disposed inside the storage chamber 30; the compressor 40 which configures the refrigerating cycle for cooling the inside of the storage chamber 30; the temperature sensor 60 which detects the temperature of the latent heat storage materials; and the control unit 100 which controls the compressor 40 based on the temperature of the latent heat storage material.

According to this configuration, by allowing the temperature sensor 60 to detect the temperature of the latent heat storage material, it is possible to accurately detect a state of the phase change of the latent heat storage material and to effectively control the compressor 40. In addition, it is possible to cool the inside of the equipment during the power failure by using the latent heat storage material. For example, the compressor 40 is started before the latent heat storage material is completely in the liquid phase, and the compressor 40 is stopped after the latent heat storage material is completely in the solid phase due to the lowered temperature inside the equipment. This can prevent the latent heat storage material from being in a completely melted state due to the temperature rising inside the equipment. Therefore, a load required for cooling the inside of the equipment is decreased and thus it is possible to reduce the power consumption of the cooling equipment. Furthermore, at least portion of the latent heat storage material can always be maintained to remain in the solid phase during a normal operation. Therefore, it is possible to cool the inside of the equipment during the power failure by using the latent heat of the latent heat storage material. In addition, according to the present embodiment, it is possible to effectively control the compressor 40 in response to the state of the phase change of the latent heat storage material. Therefore, it is possible to reduce excessive power consumption caused by the following two reasons. (1) If the temperature inside the equipment rises, a load during the cooling is increased in response to the rising temperature. (2) When starting the cooling, warm air remains inside the equipment, thereby causing a time lag until the inside of the equipment is filled with cold air.

In addition, in the cooling equipment 3 of the present embodiment, the temperature sensor 60 is arranged to be in contact with the latent heat storage material (heat storage member 101). According to this configuration, it is possible to detect the temperature of the latent heat storage material itself by using the temperature sensor 60. Therefore, it is possible to more effectively control the compressor 40 in response to the state of the phase change of the latent heat storage material.

In addition, in the cooling equipment 3 of the present embodiment, the temperature sensor 60 detects the temperature of the latent heat storage material arranged on the upper space inside the storage chamber 30. The upper space of the storage chamber 30 is likely to have a relatively high temperature inside the storage chamber 30. Therefore, according to this configuration, it is possible to detect the temperature of a portion which is likely to be melted within the latent heat storage material inside the storage chamber 30. Consequently, it is possible to more effectively control the compressor 40 in response to the state of the phase change of the latent heat storage material.

Fourth Embodiment

Figure 14:
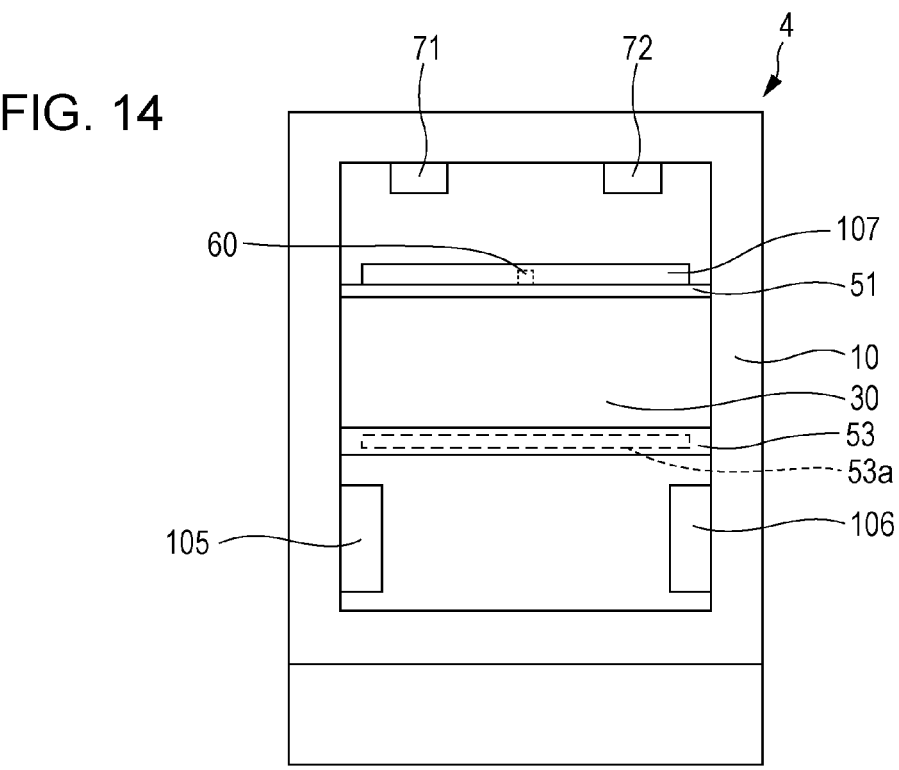
FIG. 14 is a front view illustrating a schematic configuration of cooling equipment 4 according to a fourth embodiment of the present invention.
Figure 15:
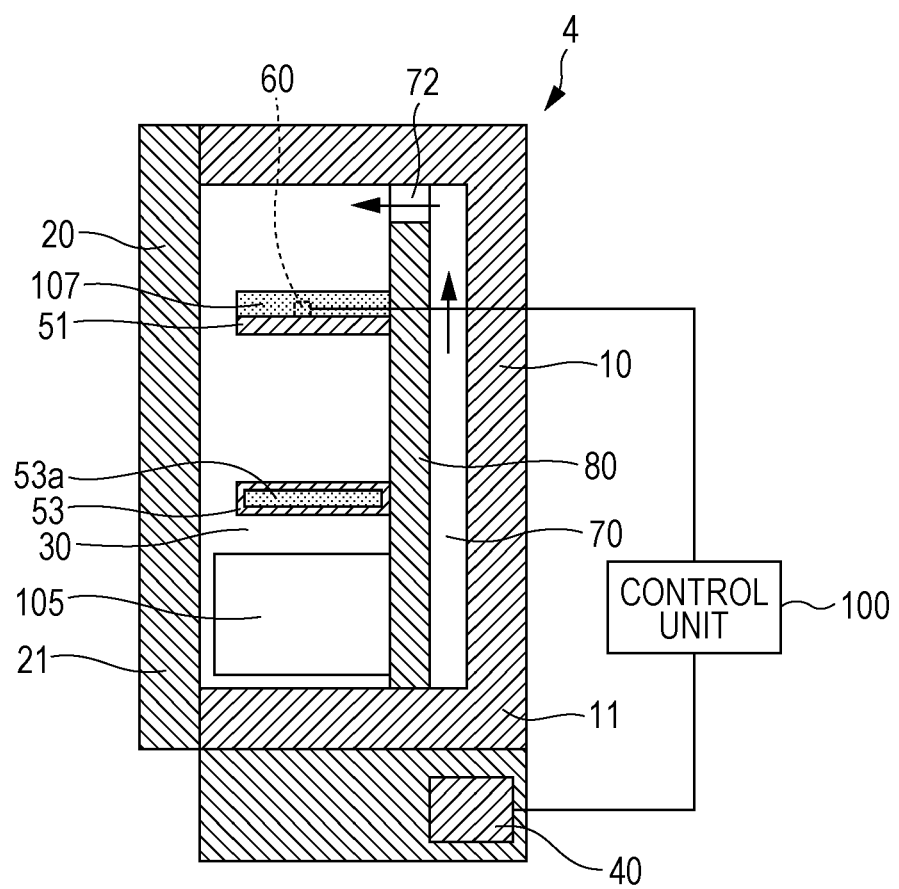
FIG. 15 is a cross-sectional view illustrating the schematic configuration of the cooling equipment 4 according to the fourth embodiment.

Next, cooling equipment according to a fourth embodiment of the present invention will be described with reference to FIGS. 14 to 17. FIG. 14 is a front view illustrating a schematic configuration of cooling equipment 4 according to the present embodiment. FIG. 15 is a cross-sectional view illustrating the schematic configuration of the cooling equipment 4 so as to correspond to FIG. 2. The same reference numerals are given to the same configuring elements having functions and operations which are the same as those of the cooling equipment 1 according to the first embodiment, and the description thereof will be omitted.

As illustrated in FIGS. 14 and 15, the storage chamber 30 of the cooling equipment 4 has the upper shelf 51 which defines the upper space of the storage chamber 30 and a lower shelf 53 which is arranged below the upper shelf 51 and defines the middle space of the storage chamber 30 between the lower shelf 53 and the upper shelf 51. The upper shelf 51 and the lower shelf 53 are respectively and horizontally supported by the shelf supports or the like disposed on left and right inner walls inside the storage chamber 30 in a front view. The lower space of the storage chamber 30 is formed below the lower shelf 53.

The heat storage member 107 is disposed on the upper surface of the upper shelf 51. The heat storage member 107 has a rectangular flat plate shape as a whole. The heat storage member 107 has a configuration where the inside of the hollow container body which is hermetically sealed is filled with the latent heat storage material. The temperature sensor 60 for controlling the compressor 40 is arranged in substantially the center portion on the upper surface of the upper shelf 51. The temperature sensor 60 is in contact with the lower surface of the container body of the heat storage member 107. The temperature sensor 60 may be disposed inside the container body of the heat storage member 107 so as to be in direct contact with the latent heat storage material.

The lower shelf 53 has a shape of a hollow plate. A latent heat storage material 53a is hermetically sealed inside the lower shelf 53. In the present embodiment, the lower shelf 53 and the latent heat storage material 53a are integrated with each other in this way.

Figure 16:
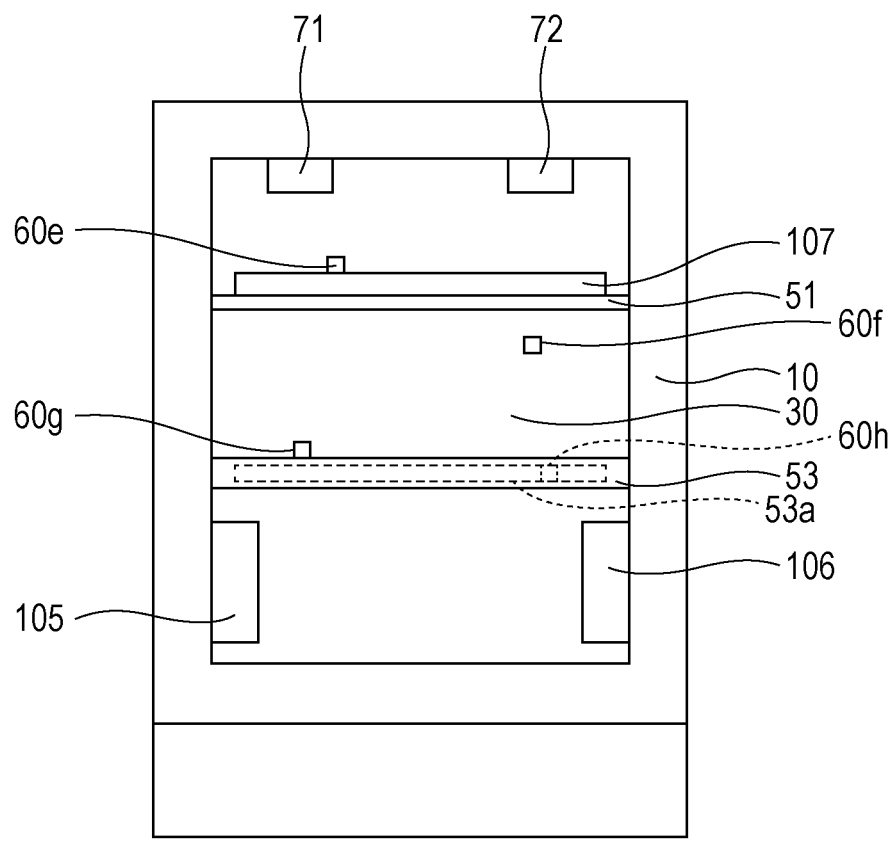
FIG. 16 illustrates a modification example of an installation position of a temperature sensor 60 in the cooling equipment 4 according to the fourth embodiment of the present invention.
Figure 17:
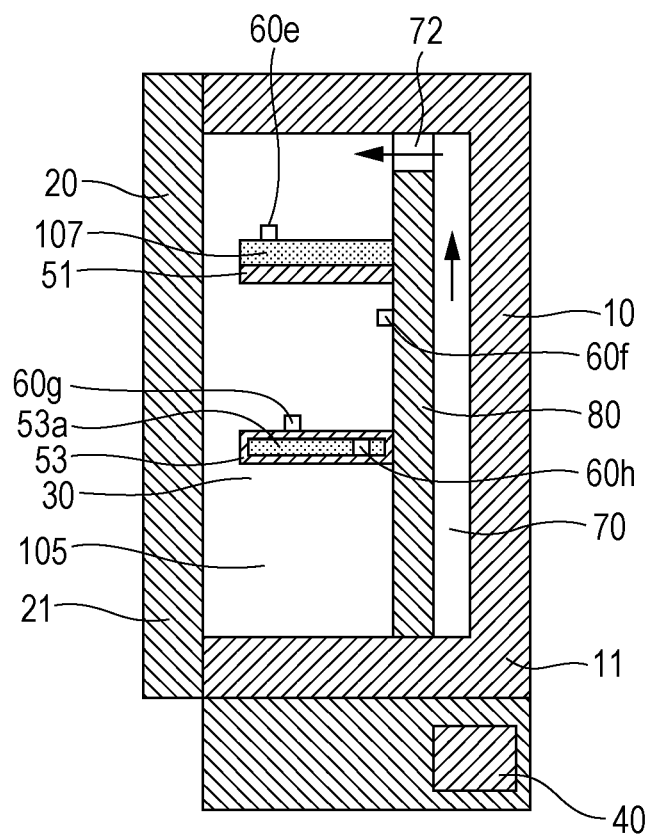
FIG. 17 illustrates a modification example of the installation position of the temperature sensor 60 in the cooling equipment 4 according to the fourth embodiment of the present invention.

FIGS. 16 and 17 respectively correspond to FIGS. 14 and 15 and illustrate a modification example of the installation position of the temperature sensor 60. As illustrated in FIGS. 16 and 17, the temperature sensor 60 (60e) may be disposed on the upper surface of the heat storage member 107. In addition, the temperature sensor 60 (60f) may be disposed on a rear side inner wall of the middle space in the storage chamber 30. In addition, the temperature sensor 60 (60g) may be disposed on the upper surface of the lower shelf 52. In addition, the temperature sensor 60 (60h) may be disposed inside the lower shelf 52 so as to be in contact with the latent heat storage material 52a.

The cooling equipment 4 of the present embodiment further has the hollow plate-shaped lower shelf 53 disposed inside the storage chamber 30, and the latent heat storage material 53a is hermetically sealed inside the lower shelf 53. According to this configuration, the attachment of the heat storage member inside the storage chamber 30 is facilitated and thus it is possible to reduce the number of parts in the cooling equipment 4.

Fifth Embodiment

Figure 18:
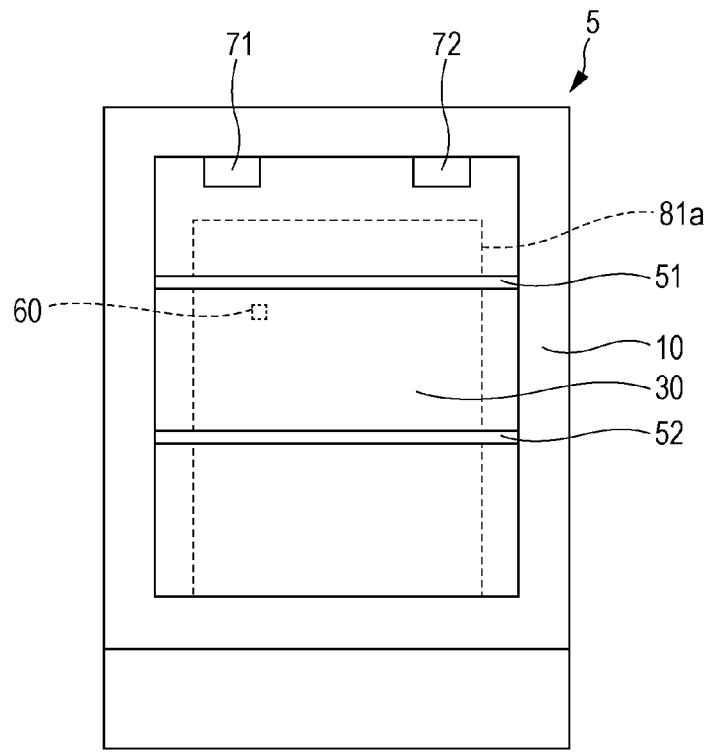
FIG. 18 is a front view illustrating a schematic configuration of cooling equipment 5 according to a fifth embodiment of the present invention.
Figure 19:
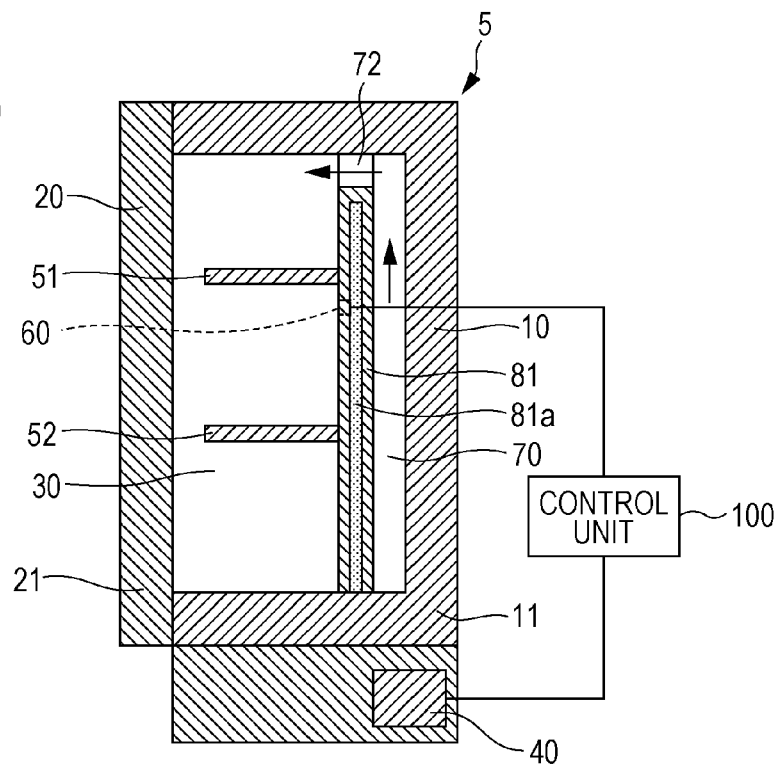
FIG. 19 is a cross-sectional view illustrating the schematic configuration of the cooling equipment 5 according to the fifth embodiment of the present invention.

Next, cooling equipment according to a fifth embodiment of the present invention will be described with reference to FIGS. 18 and 19. FIG. 18 is a front view illustrating a schematic configuration of cooling equipment 5 according to the present embodiment. FIG. 19 is a cross-sectional view illustrating the schematic configuration of the cooling equipment 5 so as to correspond to FIG. 2. The same reference numerals are given to the same configuring elements having functions and operations which are the same as those of the cooling equipment 1 according to the first embodiment, and the description thereof will be omitted.

As illustrated in FIGS. 18 and 19, in the cooling equipment 5 of the present embodiment, a separator 81 which separates the storage chamber 30 and the cold air passage 70 from each other is formed in a hollow plate shape, and a latent heat storage material 81a is hermetically sealed inside the separator 81. In the present embodiment, the separator 81 and the latent heat storage material 81a are integrated with each other in this way. For example, the temperature sensor 60 for controlling the compressor 40 is disposed at a position close to the storage chamber 30 which is inside the separator 81.

The separator 81 is in contact with the cold air passage 70. Accordingly, the heat exchange with the cold air circulating in the cold air passage 70 is promoted and thus the separator 81 is likely to have a lower temperature than the inside of the storage chamber 30. Therefore, as the latent heat storage material 81a inside the separator 81, a material may be used which has the phase change temperature lower than that of the latent heat storage material disposed in the other sections inside the storage chamber 30.

In addition, one surface of the separator 81 is in contact with the cold air passage 70 and the other surface is in contact with the storage chamber 30. The cold air which has a lower temperature than that of the air inside the storage chamber 30 flows inside the cold air passage 70. Accordingly, a difference in the temperature between one surface and the other surface of the separator 81 is relatively large. Therefore, heat transfer is relatively excellent in the separator 81 and the latent heat storage material 81a thereinside. Consequently, the latent heat storage material 81a inside the separator 81 may have a capacity, a thickness or a surface area, each of which is larger than that of the latent heat storage materials disposed in the other sections inside the storage chamber 30.

The cooling equipment 5 of the present embodiment further has the cold air passage 70 which circulates the cold air introduced to the storage chamber 30 and the hollow plate-shaped separator 81 which separates the storage chamber 30 and the cold air passage 70 from each other, and the latent heat storage material 81a is hermetically sealed inside the separator 81. According to this configuration, the attachment of the heat storage member is facilitated and thus it is possible to reduce the number of parts in the cooling equipment 5.

Sixth Embodiment

Figure 20:
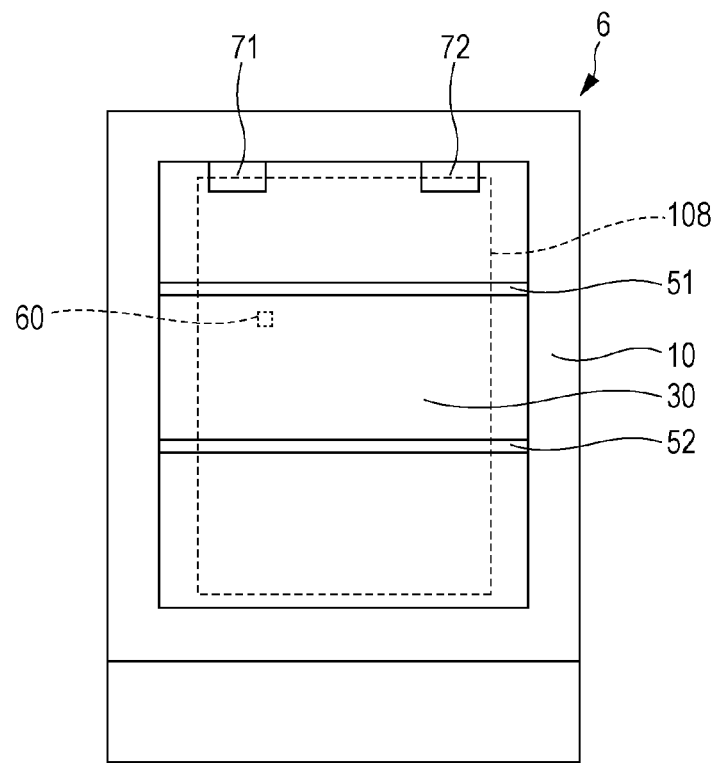
FIG. 20 is a front view illustrating a schematic configuration of cooling equipment 6 according to a sixth embodiment of the present invention.
Figure 21:
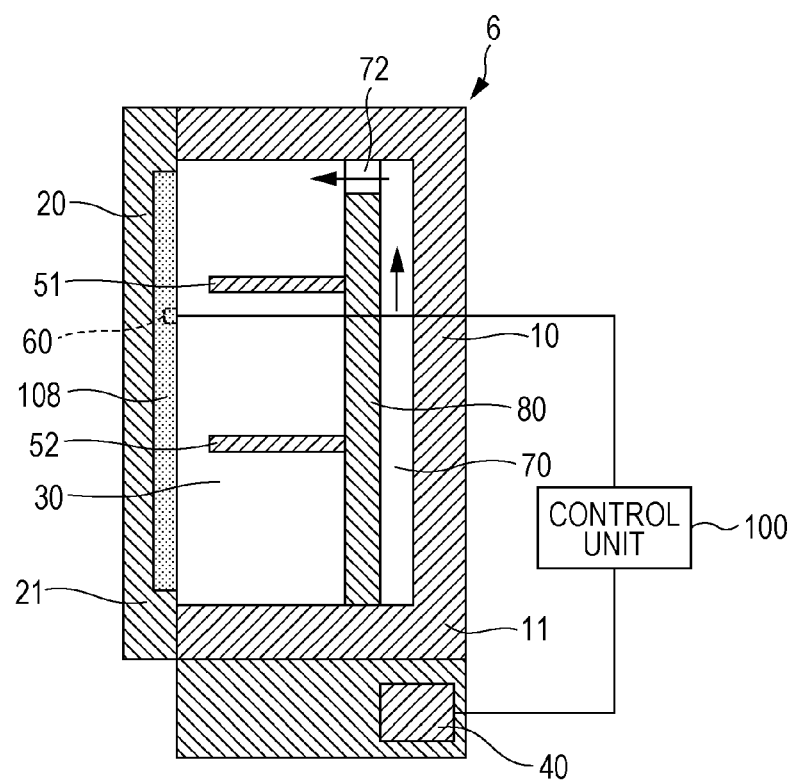
FIG. 21 is a cross-sectional view illustrating the schematic configuration of the cooling equipment 6 according to the sixth embodiment of the present invention.

Next, cooling equipment according to a sixth embodiment of the present invention will be described with reference to FIGS. 20 and 21. FIG. 20 is a front view illustrating a schematic configuration of cooling equipment 6 according to the present embodiment. FIG. 21 is a cross-sectional view illustrating the schematic configuration of the cooling equipment 6 so as to correspond to FIG. 2. The same reference numerals are given to the same configuring elements having functions and operations which are the same as those of the cooling equipment 1 according to the first embodiment, and the description thereof will be omitted.

As illustrated in FIGS. 20 and 21, the cooling equipment 6 of the present embodiment has a heat storage member 108 on an inner wall side of the door member 20 (storage chamber 30 side rather than the insulator 21). The heat storage member 108 has a rectangular flat plate shape as a whole. The heat storage member 108 has a configuration where the inside of the hollow container body which is hermetically sealed is filled with a latent heat storage material.

The temperature sensor 60 for controlling the compressor 40 is disposed inside the container body of the heat storage member 108 so as to be in direct contact with the latent heat storage material. If the temperature sensor 60 is disposed in the door member 20 side, in some cases, there is a problem of wiring layout or the like. Accordingly, the temperature sensor 60 may be disposed in the cooling equipment main body 10 side. In this case, it is desirable to dispose the temperature sensor 60 in a position closest to the heat storage member 108 of the door member 20, which is the upper space within the storage chamber 30.

Seventh Embodiment

Figure 22:
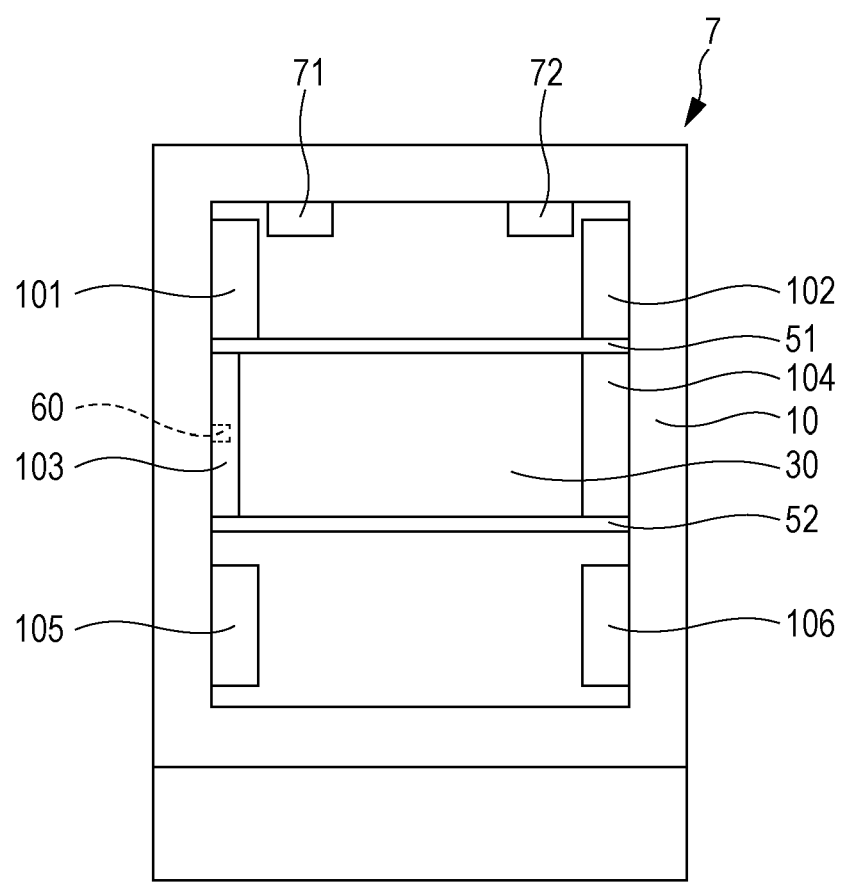
FIG. 22 is a front view illustrating a schematic configuration of cooling equipment 7 according to a seventh embodiment of the present invention.
Figure 23:
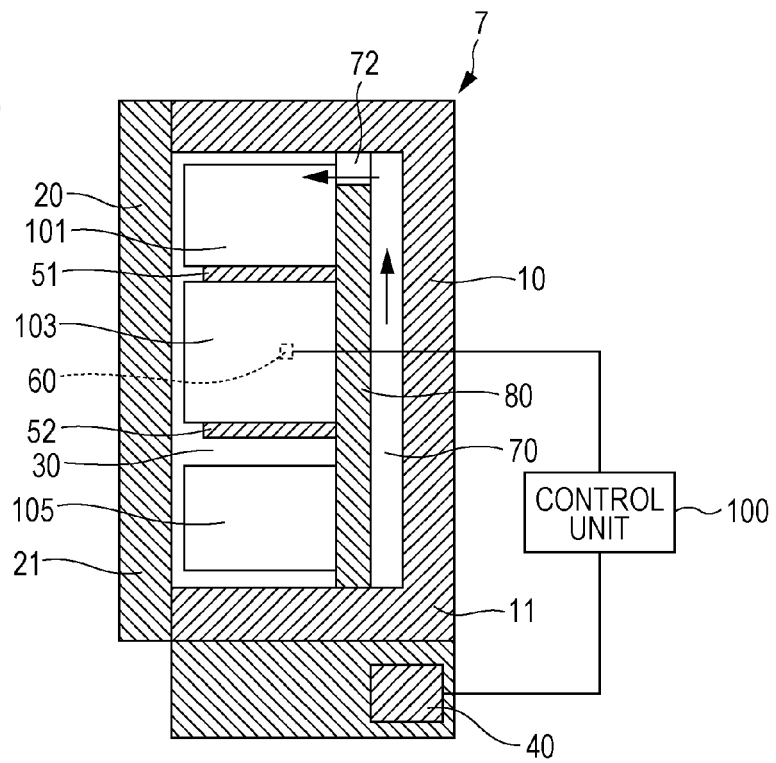
FIG. 23 is a cross-sectional view illustrating the schematic configuration of the cooling equipment 7 according to the seventh embodiment of the present invention.

Next, cooling equipment according to a seventh embodiment of the present invention will be described with reference to FIGS. 22 to 25. FIG. 22 is a front view illustrating a schematic configuration of cooling equipment 7 according to the present embodiment. FIG. 23 is a cross-sectional view illustrating the schematic configuration of the cooling equipment 7 so as to correspond to FIG. 2. The same reference numerals are given to the same configuring elements having functions and operations which are the same as those of the cooling equipment 1 according to the first embodiment, and the description thereof will be omitted.

As illustrated in FIGS. 22 and 23, the heat storage members 101 to 106 are disposed on the left and right inner walls of the storage chamber 30. The heat storage member 101 is attached to the left side inner wall of the upper space which is above the upper shelf 51 within the storage chamber 30. The heat storage member 102 is attached to the right side inner wall of the upper space. The heat storage member 103 is attached to the left side inner wall of the middle space between the upper shelf 51 and the lower shelf 52 within the storage chamber 30. The heat storage member 104 is attached to the right side inner wall of the middle space. The heat storage member 105 is attached to the left side inner wall of the lower space which is below the lower shelf 52 within the storage chamber 30. The heat storage member 106 is attached to the right side inner wall of the lower space.

The heat storage members 101, 102, and 104 to 106 are formed to have substantially the same thickness as that of each other. In contrast, the heat storage member 103 is formed to have the thickness thinner than that of the heat storage members 101, 102, and 104 to 106. Since the thickness of any of the container body of the heat storage members 101 to 106 is substantially the same, the latent heat storage material inside the heat storage member 103 is formed to have the thickness thinner than that of the latent heat storage materials inside the heat storage members 101, 102, and 104 to 106. In the present embodiment, the latent heat storage materials disposed inside the storage chamber 30 are formed to have a different thickness depending on a region.

The temperature sensor 60 for controlling the compressor 40 is disposed in the vicinity of the thin heat storage member 103. In the present embodiment, the temperature sensor 60 is disposed inside the container body of the heat storage member 103 so as to be in direct contact with the latent heat storage material. The thin latent heat storage material is more likely to be melted than the thick latent heat storage material. Therefore, the temperature sensor 60 detects the temperature of a portion which is likely to be melted relatively within the latent heat storage materials inside the storage chamber 30.

Figure 24:
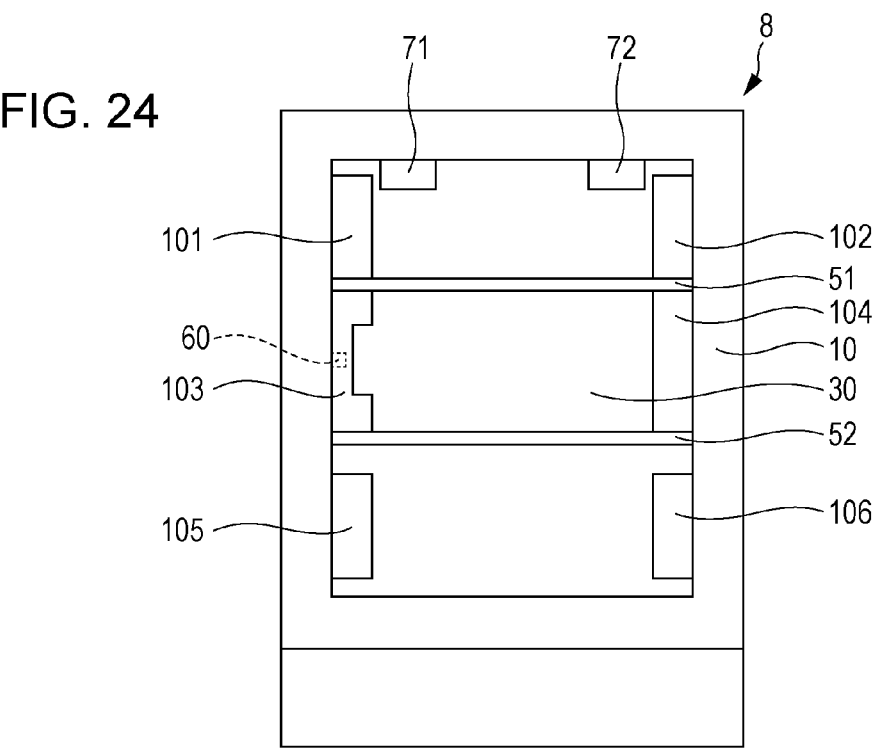
FIG. 24 illustrates a modification example of the cooling equipment 7 according to the seventh embodiment of the present invention.
Figure 25:
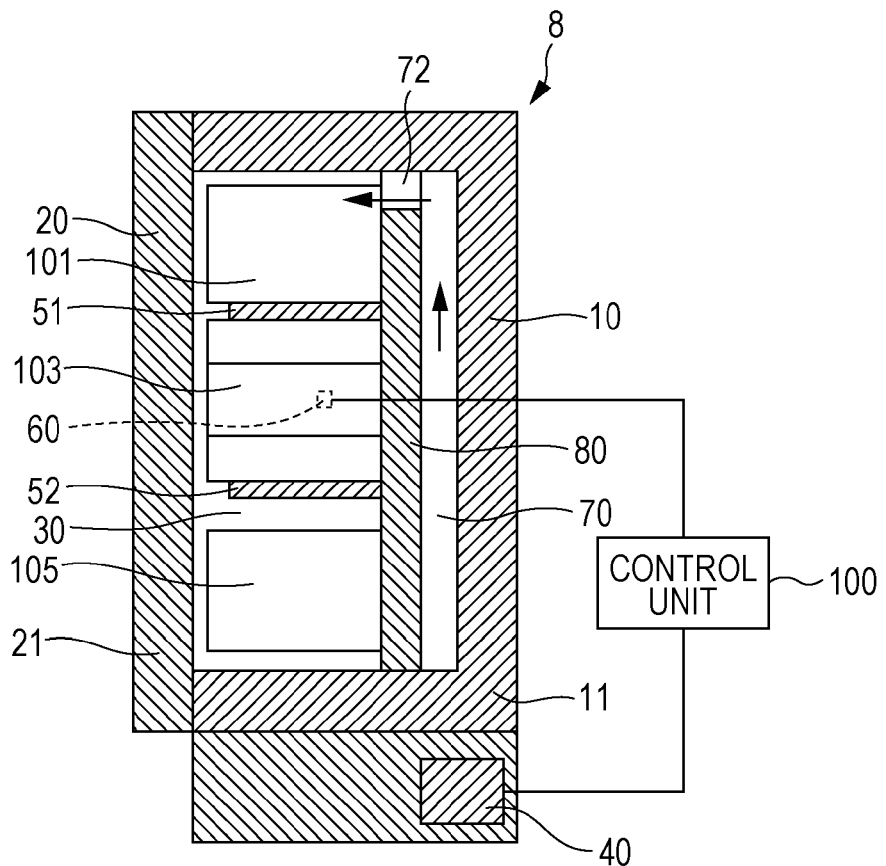
FIG. 25 illustrates a modification example of the cooling equipment 7 according to the seventh embodiment of the present invention.

FIGS. 24 and 25 respectively correspond to FIGS. 22 and 23 and illustrate a modification example of the cooling equipment 7 of the present embodiment. As illustrated in FIGS. 24 and 25, the heat storage member 103 is formed in a concave shape in a cross-sectional view and has a partially different thickness. That is, the latent heat storage material inside the heat storage member 103 is formed to have the partially different thickness. The temperature sensor 60 for controlling the compressor 40 is disposed in contact with a thin portion within the latent heat storage material inside the heat storage member 103. Therefore, the temperature sensor 60 detects the temperature of a portion which is likely to be melted relatively within the latent heat storage material inside the storage chamber 30.

As described above, in the cooling equipment 7 of the present embodiment, the latent heat storage material (heat storage members 101 to 106) is formed to have the different thickness depending on a region. The temperature sensor 60 detects the temperature of the thin portion of the latent heat storage material (for example, in the example illustrated in FIG. 22, the entire heat storage member 103, and in the example illustrated in FIG. 24, the partially thin portion within the heat storage member 103).

According to this configuration, since it is possible to detect the temperature of the portion which is likely to be melted relatively within the latent heat storage material inside the storage chamber 30, it is possible to effectively control the compressor 40 in response to the state of the phase change in the latent heat storage material. For example, it is possible to start the compressor 40 before all the latent heat storage materials melt due to the temperature rising inside the storage chamber 30.

Eighth Embodiment

Figure 26:
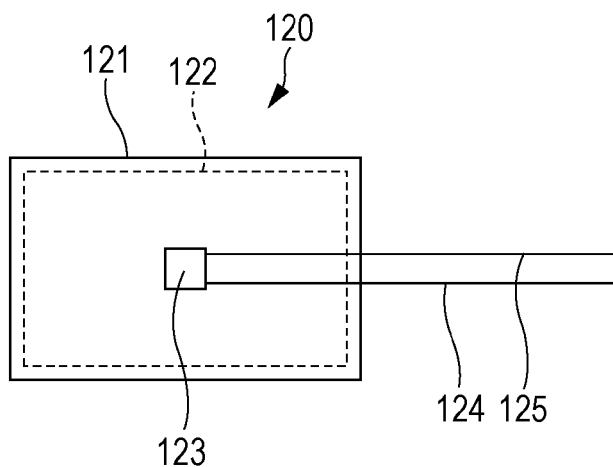
FIG. 26 illustrates a configuration of a heat storage member 120 according to an eighth embodiment of the present invention.

Next, as an eighth embodiment of the present invention, a heat storage member which can be used in the above-described first to seventh embodiments will be described. FIG. 26 illustrates a configuration of the heat storage member according to the present embodiment. FIG. 26 illustrates a plate-shaped heat storage member 120 in a plan view. As illustrated in FIG. 26, the heat storage member 120 has a rectangular flat plate shape as a whole. The heat storage member 120 has a hollow container body 121 which is hermetically sealed and a latent heat storage material 122 filling the inside of the container body 121. A temperature sensor 123 is bonded and fixed to substantially a center portion on one outer surface of the container body 121. That is, the temperature sensor 123 is disposed in contact with the container body 121 of the heat storage member 120. Required wires 124 and 125 are connected to the temperature sensor 123. This enables the heat storage member 120 to function as a temperature sensor integrated heat storage member.

According to this configuration, it becomes easy to attach the heat storage member and the temperature sensor inside the storage chamber of the cooling equipment, and it is possible to reduce the number of parts of the cooling equipment. Here, in the present embodiment, the temperature sensor 123 is disposed in contact with the container body 121. However, the temperature sensor 123 may be disposed inside the container body 121 so as to be in direct contact with the latent heat storage material 122.

Figure 27:
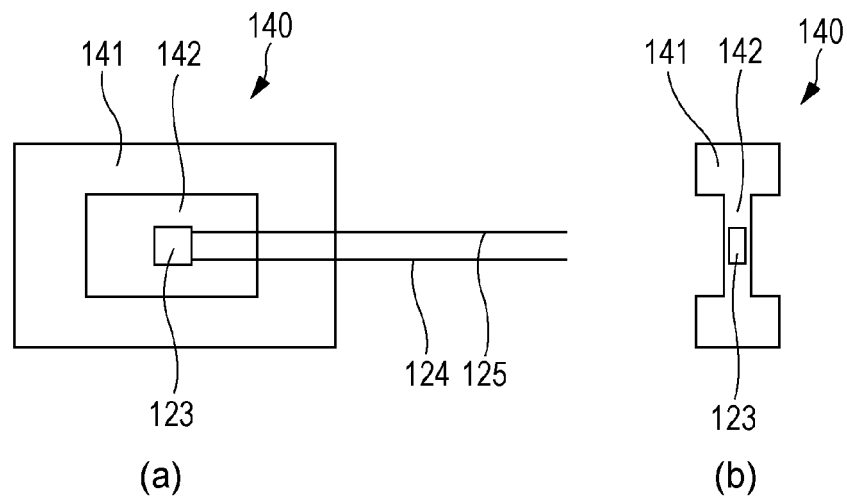
FIG. 27 illustrates a configuration of a heat storage member 140 according to the eighth embodiment of the present invention.

FIG. 27 illustrates a configuration of a heat storage member 140 according to a modification example of the present embodiment. FIG. 27(*a*) is a plan view and FIG. 27(*b*) is a side cross-sectional view. The heat storage member 140 is formed to have a different thickness depending on a region. The heat storage member 140 has a thick portion 141 where an outside is thick and a thin portion 142 where an inside thereof is thin. The temperature sensor 123 is disposed inside the container body of the thin portion 142. In other words, in the heat storage member 140, the thickness of the portion having the temperature sensor 123 is thinner than the thickness of other portions. The temperature sensor 123 detects the temperature of a portion which is likely to be melted relatively within the latent heat storage material inside the heat storage member 140.

Ninth Embodiment

Figure 28:
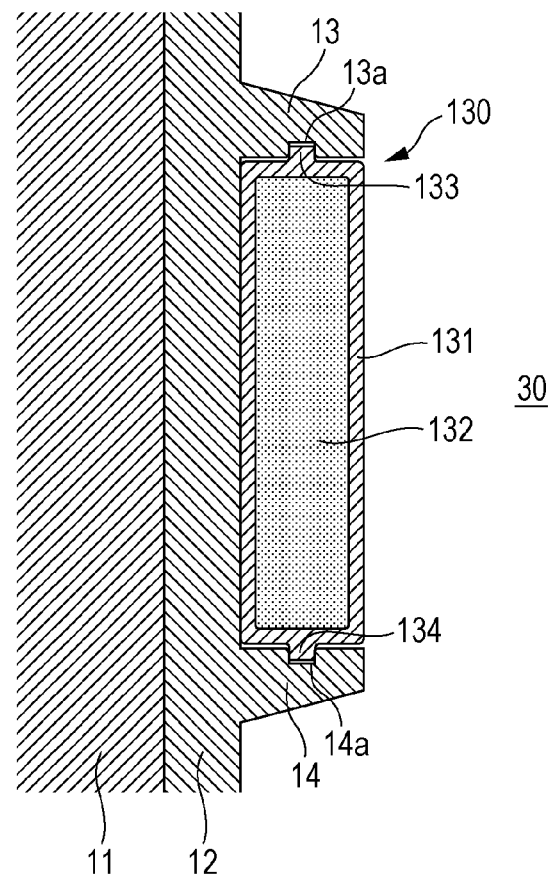
FIG. 28 illustrates a configuration of a heat storage member 130 according to a ninth embodiment of the present invention.

Next, as a ninth embodiment of the present invention, a heat storage member which can be used in the above-described first to seventh embodiments will be described. FIG. 28 is a cross-sectional view illustrating a configuration of the heat storage member according to the present embodiment. FIG. 28 illustrates a state where a heat storage member 130 is attached to an inner wall (side wall) 12 of the cooling equipment main body 10. The heat storage member 130 has a rectangular flat plate shape as a whole. The heat storage member 130 has a hollow container body 131 which is hermetically sealed and a latent heat storage material 132 filling the inside of the container body 131. One end surface (upper end surface in FIG. 28) of the container body 131 has a protruding portion 133 which extends in a straight line shape along a longitudinal direction of the end surface for example. In addition, the other end surface (lower end surface in FIG. 28) positioned at a side opposite to the above-described end surface in the container body 131 has a protruding portion 134 which extends in a straight line shape along the longitudinal direction of the end surface for example.

On the other hand, the cooling equipment main body 10 has a layered structure configured to have an outer wall (not illustrated), the insulator 11 and the inner wall 12. An upper side support portion 13 supporting one end surface (upper end surface) of the heat storage member 130 and a lower side support portion 14 supporting the other end surface (lower end surface) of the heat storage member 130 are formed to protrude on a surface of the storage chamber 30 side of the inner wall 12. The upper side support portion 13 and the lower side support portion 14 have predetermined flexibility. A fitting groove 13*a* to which the protruding portion 133 of the heat storage member 130 is fitted is formed in the upper side support portion 13. A fitting groove 14*a* to which the protruding portion 134 of the heat storage member 130 is fitted is formed in the lower side support portion 14.

For example, when attaching the heat storage member 130 to the inner wall 12, the heat storage member 130 is press-fitted to a space between the upper side support portion 13 and the lower side support portion 14 of the inner wall 12. If the heat storage member 130 is press-fitted, the protruding portion 133 is fitted to the fitting groove 13*a* of the upper side support portion 13 and the protruding portion 134 is fitted to the fitting groove 14*a* of the lower side support portion 14. Thereby, the heat storage member 130 is detachably attached to the inner wall 12. According to this configuration, attachment of the heat storage member 130 to the inner wall 12 of the storage chamber 30 is facilitated.

The present invention can be modified in various ways without being limited to the above-described embodiments.

For example, the above-described embodiments mainly include household cooling equipment, but without being limited thereto, the present invention can also be applied to business-purpose cooling equipment, a vending machine having a cooling function, and so on.

In addition, in the above-described embodiments, an example has been described where tetradecane is used as the latent heat storage material. However, without being limited thereto, the other n-paraffin, inorganic salt water solution or the like may be used in the present invention. In addition, these materials may be used in combination. as the heat storage material to be used, a material whose phase change temperature is within a temperature range which can be obtained inside the cooling equipment is selected. For example, if sodium chloride water solution of 20 wt % (melting point is approximately −17° C.) or dodecane (melting point is approximately −12° C.) is used as the latent heat storage material, the present invention can be applied to a freezer.

In addition, in the above-described embodiments, the fan type (forced convection type) cooling equipment in which the cold air is caused to blow inside the storage chamber so as to cool the inside of the storage chamber has been described as an example. However, without being limited thereto, the present invention can be applied to a direct cooling type (natural convention type) cooling equipment in which the evaporator is arranged inside the storage chamber and the natural convection cools the inside of the storage chamber.

In addition, in the above-described embodiments, the latent heat storage material in gel which has no fluidity in a state of a liquid phase has been described as an example. However, without being limited thereto, a latent heat storage material which has fluidity in a state of the liquid phase can be used in the present invention.

In addition, in the above-described embodiments, the cooling equipment in which the compressor 40 is controlled to be turned on and off has been described as an example. However, without being limited thereto, the present invention can also be applied to inverter type cooling equipment in which a rotation speed of the compressor 40 or a discharge amount of the refrigerant is variably controlled.

In addition, in the above-described embodiments, the temperature sensor which detects the temperature of the latent heat storage material has been described as an example. However, the present invention can use a sensor which detects various states such as a volume change in the latent heat storage material, mechanical strength or optical characteristics, or the like. Even by using the sensor which detects various states, it is possible to accurately detect a state of the phase change in the latent heat storage material and to effectively control the compressor 40. With regard to the volume change, a volume is contracted when the gel state (liquid phase) is changed to the solid state (solid phase). Accordingly, strain occurring when the volume is contracted is observed by using piezoelectric elements, strain gauges (resistance change), eddy currents, or the like. A member of the sensor portion may be softened so as to easily receive influence of the volume contraction. With regard to the mechanical strength, the gel state is softer than the solid state. Accordingly, a needle vertically moving at a constant interval is brought into contact with a heat storage material and a magnitude of stress applied to the needle is observed so that a state of the heat storage material is determined. With regard to the optical characteristics, the optical characteristics such as refractive index, reflectance and transmittance vary between the gel state and the solid state. Accordingly, light is transmitted and the reflected light or transmitted light is observed so that the state of the heat storage material is determined.

In addition, the above-described embodiments can be realized in combination with each other.

Tenth Embodiment

The present embodiment relates to cooling equipment which uses a latent heat storage material reversibly phase-transited between a solid phase and a liquid phase and to a temperature control system for the same.

A heat storage refrigerator has been known which includes a heat storage material in a storage chamber and controls a temperature of the storage chamber by directly detecting a temperature of the heat storage material (for example, refer to Japanese Unexamined Patent Application Publication No. 2008-128534). The heat storage refrigerator directly detects the temperature of the heat storage material. Accordingly, it is possible to effectively use the heat storage material compared to a case of measuring the temperature inside the refrigerator, thereby enabling a high cooling capacity.

However, in the heat storage refrigerator, if the temperature of the heat storage material is detected only, the heat storage material has a tendency to be excessively cooled or completely melted. In this case, coldness absorbing and radiating capacity using latent heat is lost, thereby accelerating significant rising and falling of the temperature inside the refrigerator. Then, the storage chamber (inside the refrigerator) of the heat storage refrigerator has a tendency that the temperature is excessively lowered or excessively raised. In addition, variations in the temperature occur inside the heat storage refrigerator. If the variations in the temperature occur inside the heat storage refrigerator, convection is generated inside the refrigerator, and thus the convection results in energy loss or cooling loss in the heat storage refrigerator.

An object of the present embodiment is to provide cooling equipment having less irregularities and variations in a temperature and a temperature control system for the same.

The above-described object is achieved by providing cooling equipment that includes a storage chamber that stores storage goods; a first latent heat storage member that is disposed inside the storage chamber and includes at least a first latent heat storage material which is reversibly phase-transited between a solid phase and a liquid phase; a second latent heat storage member that is disposed inside the storage chamber and includes at least a second latent heat storage material which is reversibly phase-transited between the solid phase and the liquid phase; a sensor that detects a state of the second latent heat storage member; a cooling mechanism that cools the inside of the storage chamber; and a control unit that controls the cooling mechanism based on the state of the second latent heat storage member. In this configuration, the second latent heat storage member is phase-transited earlier than the first latent heat storage member.

In the cooling equipment, during cooling of the storage chamber, at least a portion of the second latent heat storage member completes phase-transition and freezes earlier than the first latent heat storage member. During coldness radiating of the storage chamber, at least a portion of the second latent heat storage member completes the phase-transition and melts earlier than the first latent heat storage member.

In the cooling equipment, the state includes any one of a temperature, a volumetric change, a mechanical strength, and optical characteristics.

In the cooling equipment, the cooling mechanism includes any one of a compressor, a cold air port, an opening of a vent hole, and a cooling fan.

In the cooling equipment, a latent heat amount of at least a portion of the second latent heat storage member in a thickness direction is smaller than a latent heat amount of at least a portion of the first latent heat storage member in the thickness direction.

In the cooling equipment, the sensor is disposed in a section where the latent heat amount of the second latent heat storage member in the thickness direction is smaller than the maximum value of the latent heat amount of the first latent heat storage member in the thickness direction.

In the cooling equipment, the thickness of the second latent heat storage member is thinner than the thickness of the first latent heat storage member.

In the cooling equipment, the first latent heat storage member and the second latent heat storage member respectively have a substantially constant uniform thickness.

In the cooling equipment, the second latent heat storage member has a recess, and the sensor detects a state of the recess.

The cooling equipment further includes a plate-shaped member that is included in the second latent heat storage member and has a thermal conductivity higher than a thermal conductivity of the second latent heat storage member. In this configuration, the sensor is arranged in contact with the plate-shaped member.

In the cooling equipment, the second latent heat storage member has a particulate having no latent heat in a control temperature range or a heat conductive filler.

In the cooling equipment, the first latent heat storage member has a predetermined container body which seals the first latent heat storage material, and the second latent heat storage member has a predetermined container body which seals the second latent heat storage material.

In the cooling equipment, a forming material of the first latent heat storage material is the same as a forming material of the second latent heat storage material.

In the cooling equipment, the second latent heat storage member is arranged at a position where cold air blowing into the storage chamber is likely to hit relatively and near a corner inside the storage chamber.

In addition, the above-described object is achieved by providing a temperature control system that includes a first heat storage section including a first latent heat storage material which is reversibly phase-transited between a solid phase and a liquid phase; a second heat storage section including at least a second latent heat storage material which is reversibly phase-transited between the solid phase and the liquid phase; a sensor that detects a state of the second heat storage section; and a temperature control unit that controls a temperature of a temperature control target in response to the state of the second heat storage section which is detected by the sensor. In this configuration, when a state of the first and second latent heat storage materials is changed, at least a portion of the second latent heat storage material is phase-transited earlier than at least a portion of the first latent heat storage material.

In the temperature control system, the state includes any one of a temperature, a volumetric change, a mechanical strength, and optical characteristics.

In the temperature control system, a latent heat amount of at least a portion of the second heat storage section in a thickness direction is smaller in a control temperature range of the temperature control target than a latent heat amount of at least a portion of the first heat storage section in a thickness direction.

In the temperature control system, the sensor is disposed in a section where the latent heat amount of the second heat storage section in the thickness direction is smaller than the maximum value of the latent heat amount of the first heat storage section in the thickness direction.

In the temperature control system, a thickness of at least a portion of the second heat storage section is thinner than a thickness of at least a portion of the first heat storage section.

In the temperature control system, the first heat storage section and the second heat storage section respectively have a substantially constant uniform thickness.

In the temperature control system, the second heat storage section has a recess, and the sensor detects a state of the recess.

The temperature control system further includes a plate-shaped member that is included in the second heat storage section and has a thermal conductivity higher than a thermal conductivity of the second latent heat storage material. In this configuration, the sensor is arranged in contact with or internally in the plate-shaped member.

In the temperature control system, a thermal conductivity of the second heat storage section in the thickness direction is higher than a thermal conductivity of the first heat storage section in the thickness direction.

In the temperature control system, the second heat storage section includes a particulate having no latent heat in a heat conductive filler or a control temperature range.

The above-described object is achieved by providing an air conditioning system that includes the temperature control system.

The above-described object is achieved by providing a hot water supply system that includes the temperature control system.

According to the present embodiment, it is possible to realize cooling equipment having less irregularities and variations in a temperature and a temperature control system for the same.

A heat storage member, cooling equipment, an air conditioner and a hot water supply system according to the present embodiment will be described with reference to FIGS. 29 to 59. First, a principle of the heat storage member, the cooling equipment, the air conditioner and the hot water supply system according to the present embodiment will be described with reference to FIGS. 29 to 32 while pointing out the problem of the heat storage refrigerator in the related art.

Figure 29:
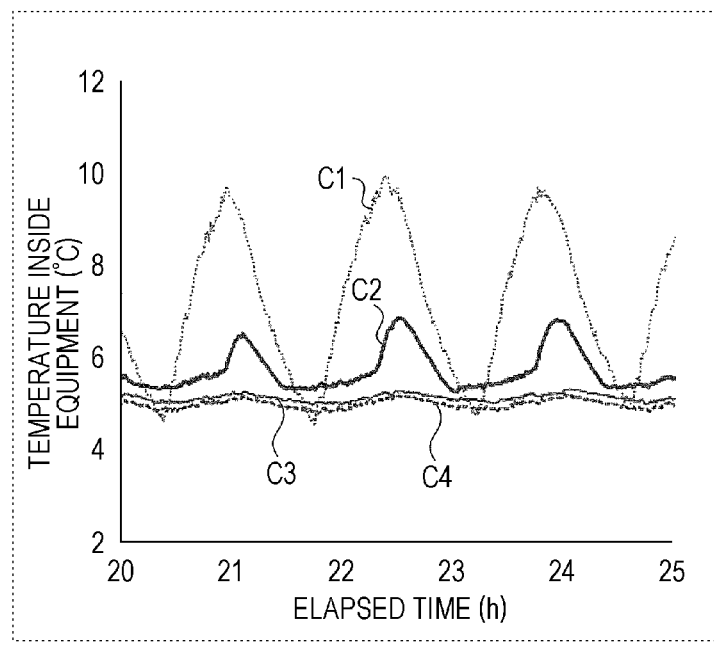
FIG. 29 illustrates a principle of temperature control used in cooling equipment, an air conditioner, and a hot water supply system according to a tenth embodiment of the present invention, and is a graph illustrating an example of a time variation in a temperature inside the cooling equipment and thickness dependence of time variation in a temperature of a latent heat storage material provided inside the equipment.

FIG. 29 is a graph illustrating an example of a time variation in a temperature inside the cooling equipment and thickness dependence of time variation in a temperature of a latent heat storage material provided inside the equipment. The horizontal axis represents an elapsed time (h) from the power supply to the cooling equipment, and the vertical axis represents a temperature (° C.) of the inside of the equipment and the latent heat storage material. The curve C1 of the dashed line represents a time variation in the temperature inside the equipment, the curve C2 of the dashed line represents a time variation in the temperature of the latent heat storage material of 4 mm in thickness, the curve C3 of the dashed line represents a time variation in the temperature of the latent heat storage material of 8 mm in thickness, and the curve C4 of the dashed line represents a time variation in the temperature of the latent heat storage material of 20 mm in thickness. A forming material of each latent heat storage material is identical. In addition, except for the thickness, each latent heat storage material has an identical outer shape, and has a rectangular parallelepiped shape in which a bottom side thereof is 5 cm×5 cm. Measurement is performed by arranging each latent heat storage material side by side on a bottom portion of a refrigerator where the inside of the equipment contains approximately 46 liters.

In FIG. 29, a period when the temperature inside the equipment falls is a period when the compressor included in the cooling equipment is operated to cool the inside of the equipment, and a period when the temperature inside the equipment rises is a period when the compressor is stopped to stop cooling the inside of the equipment. The cooling equipment maintains the temperature inside the equipment by using the latent heat storage material during a period when the cooling of the inside of the equipment is stopped. As illustrated in FIG. 29, if the cooling of the inside of the cooling equipment is started when 21 hours have elapsed from the power supply for example, the temperature inside the equipment begins to fall immediately as illustrated by the curve C1. However, as illustrated by the curves C2 to C4 in FIG. 29, temperature of any of the latent heat storage materials does not fall immediately down to a phase change temperature (phase transition temperature) even if the cooling of the inside of the equipment is started. The temperature of the latent heat storage material continues to rise from when the cooling of the inside of the equipment is started until a predetermined time has elapsed, and thereafter starts to fall. In addition, for example, if the cooling of the inside of the equipment is stopped after approximately 22.5 hours have elapsed from the power supply, the temperature inside the equipment rises immediately as illustrated by the curves C1 to C4. However, the temperature of the latent heat storage material continues to fall until a predetermined time elapses, and thereafter start to rise. In this manner, with respect to the start time and the stop time of the cooling inside the equipment, a time lag occurs between the time when the temperature inside the equipment starts to change and the time when the temperature of the latent heat storage material starts to change.

Figure 30:
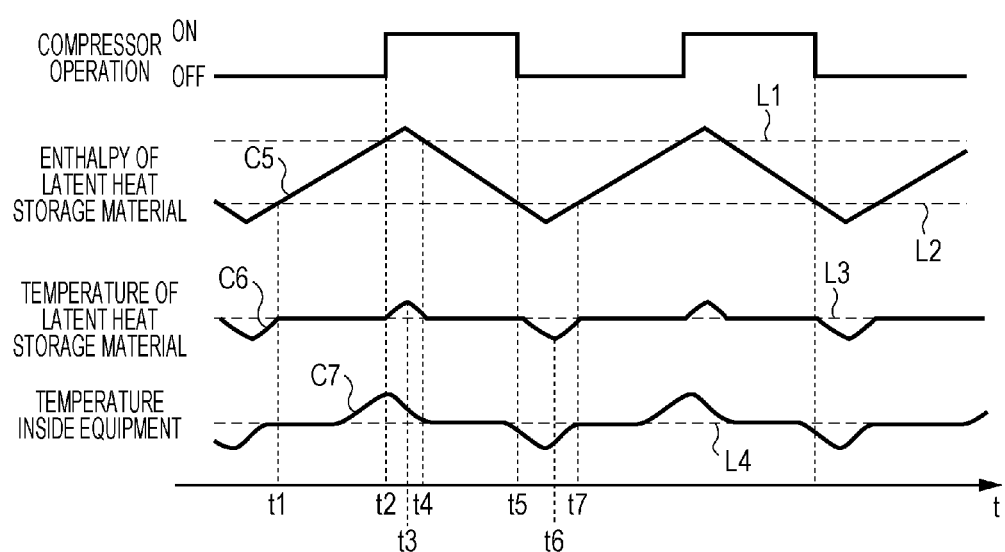
FIG. 30 illustrates the principle of the temperature control used in the cooling equipment, the air conditioner, and the hot water supply system according to the tenth embodiment of the present invention, and illustrates an example of a time variation or the like in a temperature inside the cooling equipment when controlling start and stop of cooling inside the equipment based on a temperature of the latent heat storage material provided inside the equipment.

FIG. 30 illustrates an example of a time variation in the temperature inside the equipment when controlling start and stop of the cooling inside the equipment based on the temperature of the latent heat storage material provided inside the cooling equipment. In the present embodiment, similar to the heat storage refrigerator in the related art, the thickness of the latent heat storage materials provided inside the equipment is substantially constant. In FIG. 30, sequentially from above in the drawing, "compressor operation" represents an operation time of the compressor, "enthalpy of latent heat storage material" represents the time variation in the enthalpy of the latent heat storage material, "temperature of latent heat storage material" represents the time variation in the temperature of the latent heat storage material inside the equipment, and "temperature inside equipment" represents the time variation of an average temperature inside the equipment. In the drawing, the elapsed time is illustrated from the left to the right. In addition, "on" in the "compressor operation" represents an operation period of the compressor, and "off" represents a stop period of the compressor. The straight line L1 of the dashed line represents the enthalpy in a state where the latent heat storage material is completely melted (state of the liquid phase only without any solid phase), the straight line L2 of the dashed line represents the enthalpy in a state where the latent heat storage material is completely frozen (state of the solid phase only without any liquid phase), and the curve C5 of the solid line represents the time variation in the enthalpy of the latent heat storage material. The straight line L3 of the dashed line represents the phase change temperature of the latent heat storage material, and the curve C6 of the solid line represents the time variation in the temperature of the latent heat storage material. The straight line L4 of the dashed line represents the phase change temperature of the latent heat storage material, and the curve C7 of the solid line represents the time variation in the temperature inside the equipment.

As illustrated in FIG. 30, during a period from time t1 to time t2, the latent heat storage material maintains the phase change temperature. However, the latent heat storage material continues to radiate the coldness to the cooling equipment main body and into the equipment in order to cool the inside of the equipment during the period. That is, the latent heat storage material continues to absorb heat energy entering from the cooling equipment main body and heat energy entering the inside of the equipment. Therefore, the enthalpy of the latent heat storage material continues to rise. In addition, the latent heat storage material is in the solid phase only at time t1, but is in a state of two phases (solid and liquid phases) with the lapse of time, and is in the liquid phase only at time t2. That is, the latent heat storage material has the most excellent cooling capacity at time t1, gradually has the deteriorated cooling capacity with the lapse of time, and eventually loses the cooling capacity at time t2. Therefore, as illustrated in FIG. 30, from time t1 to a predetermined period of time, the average temperature inside the equipment is maintained to have the phase change temperature of the latent heat storage material. However, due to the deteriorated cooling capacity of the latent heat storage material, the average temperature inside the equipment rises rapidly after the predetermined period of time elapses.

If the temperature of the latent heat storage material is higher than the phase change temperature at time t2, the compressor is operated to start the cooling inside the equipment. As described using FIG. 29, if the cooling inside the equipment is started, the temperature inside the equipment starts to fall immediately, but the temperature of the latent heat storage material does not start to fall immediately. Therefore, as illustrated in FIG. 30, the temperature of the latent heat storage material continues to rise from time t2 to time t3. The temperature of the latent heat storage material starts to fall after time t3 and becomes the phase change temperature at time t4. The latent heat storage material radiates the heat energy until time t3, thereby increasing the enthalpy. Thereafter, the latent heat storage material absorbs the heat energy, thereby decreasing the enthalpy. A section between the straight line L1 indicating complete melting and the straight line L2 indicating complete freezing shows a state where the latent heat storage material stores the latent heat.

If the temperature of the latent heat storage material is lower than the phase change temperature at time t5, the compressor is stopped to finish the cooling inside the equipment. As described using FIG. 29, even if the cooling inside the equipment is stopped, the temperature of the latent heat storage material does not immediately become constant at the phase change temperature. Therefore, as illustrated in FIG. 30, the temperature of the latent heat storage material continues to fall from time t5 to time t6 . After time t6, the temperature of the latent heat storage material starts to rise and becomes the phase change temperature at time t7. The latent heat storage material absorbs the heat energy until time t6, thereby decreasing the enthalpy. Thereafter, the latent heat storage material starts to radiate the heat energy, thereby increasing the enthalpy. On the other hand, as illustrated in FIG. 30, if the compressor is stopped, the temperature inside the equipment is changed to follow the temperature of the latent heat storage material.

As described above by using FIGS. 29 and 30, the temperature of the latent heat storage material included inside the cooling equipment is changed later compared to the temperature inside the equipment. Therefore, when starting the cooling for example, even if the cold air is introduced into the equipment after detecting that the temperature of the latent heat storage material is higher than the phase change temperature, the temperature of the latent heat storage material does not start to fall immediately. The temperature of the latent heat storage material continues to rise for a while and then starts to fall. Similarly, when stopping the cooling, the temperature of the latent heat storage material falls for a while and then starts to rise. Therefore, the heat storage refrigerator in the related art has a problem in that the latent heat storage material may be excessively cooled. This causes storage performance for foodstuff in the cooling equipment to be decreased. In addition, in the heat storage refrigerator in the related art, an energy loss occurs during a period when the temperature of the latent heat storage material is higher than the phase change temperature (period when the curve C6 becomes convex upward with respect to the phase change temperature) and during a period when the temperature of the latent heat storage material is lower than the phase change temperature (period when the curve C6 becomes convex downward with respect to the phase change temperature). The energy loss is increased as the period is longer. In addition, during that period and when the compressor is operated, the energy loss is increased as the temperature of the latent heat storage material becomes higher than the phase change temperature. In addition, during that period and when the compressor is stopped, the energy loss is increased as the temperature of the latent heat storage material becomes lower than the phase change temperature. In the heat storage refrigerator in the related art, the temperature inside the refrigerator is not changed to follow the temperature of the latent heat storage material. Accordingly, there is a problem in that even if the inside of the refrigerator is cooled based on the temperature of the latent heat storage material, it is difficult to maintain a substantially constant temperature inside the refrigerator. Furthermore, the heat storage refrigerator in the related art has a problem in that it is not possible to detect a phase change state of the latent heat storage material (a degree of melting or freezing).

FIG. 31 illustrates an example of the time variation in the temperature of the latent heat storage materials having a different thickness. FIG. 31(a) illustrates an example of the time variation in the temperature of the latent heat storage material having a relatively thin thickness, and FIG. 31(b) illustrates an example of the time variation in the temperature of the latent heat storage material having a thickness thicker than that of the latent heat storage material in FIG. 31(a). In FIGS. 31(a) and 31(b), sequentially from above in the drawings, "compressor operation" represents an operation time of the compressor, "enthalpy of latent heat storage material" represents the time variation in the enthalpy of the latent heat storage material, "temperature of latent heat storage material" represents the time variation in the temperature of the latent heat storage material inside the equipment, and the elapsed time is illustrated from the left to the right in the drawing. In addition, "on" in the "compressor operation" represents an operation period of the compressor, and "off" represents a stop period of the compressor. The straight lines L4 and L7 of the dashed line represent the enthalpy in a state where the latent heat storage material is completely melted (state of the liquid phase only without any solid phase), the straight lines L5 and L8 of the dashed line represent the enthalpy in a state where the latent heat storage material is completely frozen (state of the solid phase only without any liquid phase), and the curves C7 and C9 of the solid line represent the time variation in the enthalpy of the latent heat storage material. The straight lines L6 and L9 of the dashed line represent the phase change temperature of the latent heat storage material, and the curve C8 and of the solid line and the straight line L10 of the solid line represent the time variation in the temperature of the latent heat storage material. The straight lines L9 and L10 are substantially coincident with each other. However, for ease of understanding, both of the straight lines L9 and L10 are illustrated by being shifted in FIG. 31(b).

The "compression operation", "enthalpy of latent heat storage material" and "temperature of latent heat storage material" illustrated in FIG. 31(a) are similar to the "compression operation", "enthalpy of latent heat storage material" and "temperature of latent heat storage material" illustrated in FIG. 30, and thus the description will be omitted.

Incidentally, when comparing two latent heat storage materials having the same forming material and the different thickness of the outer dimensions, the thick latent heat storage material can store more latent heat than the thin latent heat storage material. Since the thick latent heat storage material can store relatively more latent heat, the melting and the freezing take a longer period of time compared to the thin latent heat storage material. That is, the relatively thin latent heat storage material is likely to be melted and frozen compared to the relatively thick latent heat storage material. In other words, the relatively thick latent heat storage material is unlikely to be melted and frozen compared to the relatively thin latent heat storage material. Therefore, a distance between the straight lines L4 and L5 illustrated in FIG. 31(a) is longer than a distance between the straight lines L7 and L8 illustrated in FIG. 31(b). Here, a latent heat quantity of a portion which is surrounded by taking any unit surface from the surface of the latent heat storage material and extending the unit surface to a surface opposing in a thickness direction is defined by a latent heat quantity in the thickness direction. In a case of the thick portion of the latent heat storage material, the latent heat quantity in the thickness direction is increased. In contrast, in a case of the thin portion, the latent heat quantity in the thickness direction is decreased. That is, if the portion has the relatively small latent heat quantity in the thickness direction, the portion is melted and frozen earlier (phase-transited earlier).

FIG. 31(b) illustrates the time variation in the temperature and the enthalpy of the latent heat storage material when operating/stopping the compressor at the same time illustrated in FIG. 31(a). As described above, the thick latent heat storage material is unlikely to be melted and frozen compared to the thin latent heat storage material. Accordingly, the thick latent heat storage material can maintain a state of two phases (solid and liquid phases) during a period when the thin latent heat storage material can be frozen. Therefore, as illustrated in FIG. 31(b), the thick latent heat storage material can maintain the phase change temperature during a period from time t1 to time t2 (period when the thin latent heat storage material can be frozen corresponding to the period from time t2 to t5 illustrated in FIG. 31(a)). In addition, the thick latent heat storage material can maintain the state of two phases (solid and liquid phases) during a period when the thin latent heat storage material can be melted. Therefore, as illustrated in FIG. 31(b), the thick latent heat storage material can maintain the phase change temperature during a period from time t2 to time t3 (period when the thin latent heat storage material can be melted corresponding to the period from time t5 to t8 illustrated in FIG. 31(a)).

Therefore, the cooling equipment according to the present embodiment includes the first latent heat storage material, the second latent heat storage material which is phase-transited earlier than the first latent heat storage material, and the sensor for controlling the temperature inside the equipment which detects the state of the second latent heat storage material (for example, any one of the temperature, the volume change, the mechanical strength, and the optical characteristics).

The cooling equipment according to the present embodiment is configured to introduce the cold air into the equipment if a value detected by the sensor satisfies a predetermined condition (for example, if the temperature higher than the phase change temperature is detected), and to stop introducing the cold air into the equipment if the value satisfies the other predetermined condition (for example, if the temperature lower than the phase change temperature is detected). In addition, the cooling equipment according to the present embodiment is configured to be capable of maintaining the temperature inside the equipment to have a substantially constant temperature by using the first latent heat storage material which can maintain the phase change temperature by always storing the latent heat regardless of the state of the second latent heat storage material. The cooling equipment according to the present embodiment is configured to start the cooling before the first latent heat storage material is completely melted and to stop the cooling before the first latent heat storage material is completely frozen. The cooling equipment according to the present embodiment includes at least two types of the latent heat storage material having the different structure inside the equipment, detects the state of the phase change of the latent heat storage material which is phase-transited relatively earlier by using a simple method, and starts/stops the cooling inside the equipment based on the state of the latent heat storage material. By using such a simple configuration and method, it is possible to obtain an effect of reducing irregularities and variations in the temperature inside the equipment.

Figure 32:
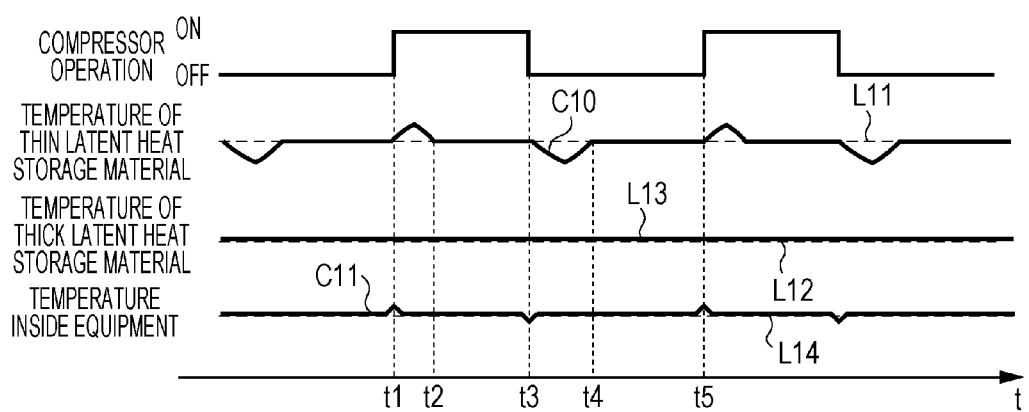
FIG. 32 illustrates the principle of the temperature control used in the cooling equipment, the air conditioner, and the hot water supply system according to the tenth embodiment of the present invention, and illustrates a time variation or the like inside the cooling equipment according to the present embodiment.

FIG. 32 illustrates the time variation in the temperature inside the cooling equipment according to the present embodiment. In FIG. 32, sequentially from above, "compressor operation" represents an operation time of the compressor, "temperature of thin latent heat storage material" represents the time variation in the temperature of the relatively thin latent heat storage material (an example of the above-described second latent heat storage material), "temperature of thick latent heat storage material" represents the time variation in the temperature of the relatively thick latent heat storage material (an example of the above-described first latent heat storage material), "temperature inside equipment" represents the time variation in the average temperature inside the equipment, and the elapsed time is illustrated from the left to the right. In addition, "on" in the "compressor operation" represents an operation period of the compressor, and "off" represents a stop period of the compressor. The straight lines L11, L12 and L14 of the dashed line represent the phase change temperature of the latent heat storage material, the curve C10 of the solid line represents the time variation in the temperature of the thin latent heat storage material, the straight line L13 of the solid line represents the time variation in the temperature of the thick latent heat storage material, and the curve C11 of the solid line represents the time variation in the temperature inside the equipment. The straight lines L12 and L13 are substantially coincident with each other, and the straight line L14 and the straight line portion of the curve C11 are substantially coincident with each other. However, for ease of understanding, the straight lines L12, L13 and L14 and the straight line portion of the curve C11 are illustrated by being respectively shifted in FIG. 32.

As illustrated in FIG. 32, since the temperature of the thin latent heat storage material becomes higher than the phase change temperature at time t1, the compressor is operated to start the cooling inside the equipment. Thereafter, since the temperature of the thin latent heat storage material becomes lower than the phase change temperature at time t3, the compressor is stopped to finish the cooling inside the equipment. Furthermore, then, since the temperature of the thin latent heat storage material becomes higher than the phase change temperature at time t5, the compressor is operated to start the cooling inside the equipment. Such a cooling operation is repeated after time t5.

In a cooling cycle inside the equipment based on the temperature of the thin latent heat storage material, the thick latent heat storage material is not in the completely frozen state (state of the solid phase only without any liquid phase) or in the completely melted state (state of the liquid phase only without any solid phase). In the cooling cycle inside the equipment, the thick latent heat storage material is always in the solid and liquid phases. The thick latent heat storage material is in a state where the liquid phase prevails over the solid phase (close to the melted state) before and after time t1, and is in a state where the solid phase prevails over the liquid phase (close to the frozen state) before and after time t3. The thick latent heat storage material maintains the phase change temperature even when the state close to the melted state is changed to the state close to the frozen state or the state close to the frozen state is changed to the state close to the melted state. Therefore, as illustrated in FIG. 32, the temperature of the thick latent heat storage material is substantially constant at the phase change temperature in the cooling cycle inside the equipment.

The cooling equipment according to the present embodiment maintains the temperature inside the equipment by using the thick latent heat storage material. Therefore, as illustrated in FIG. 32, the temperature inside the equipment is substantially constant at the phase change temperature. When the compressor is switched over to the on-state or the off-state, the temperature inside the equipment has a variation in an error range, but there is little effect on the storage goods inside the equipment.

Hereinafter, examples of each structure of the heat storage member used in controlling the temperature inside the equipment and the heat storage member used in maintaining the temperature inside the equipment, and an attachment section inside the equipment for the heat storage member used in controlling the temperature inside the equipment will be described in more detail with reference to FIGS. 33 to 55. The cooling equipment according to the following examples is used as a household refrigerator.

EXAMPLE 1

Figure 33:
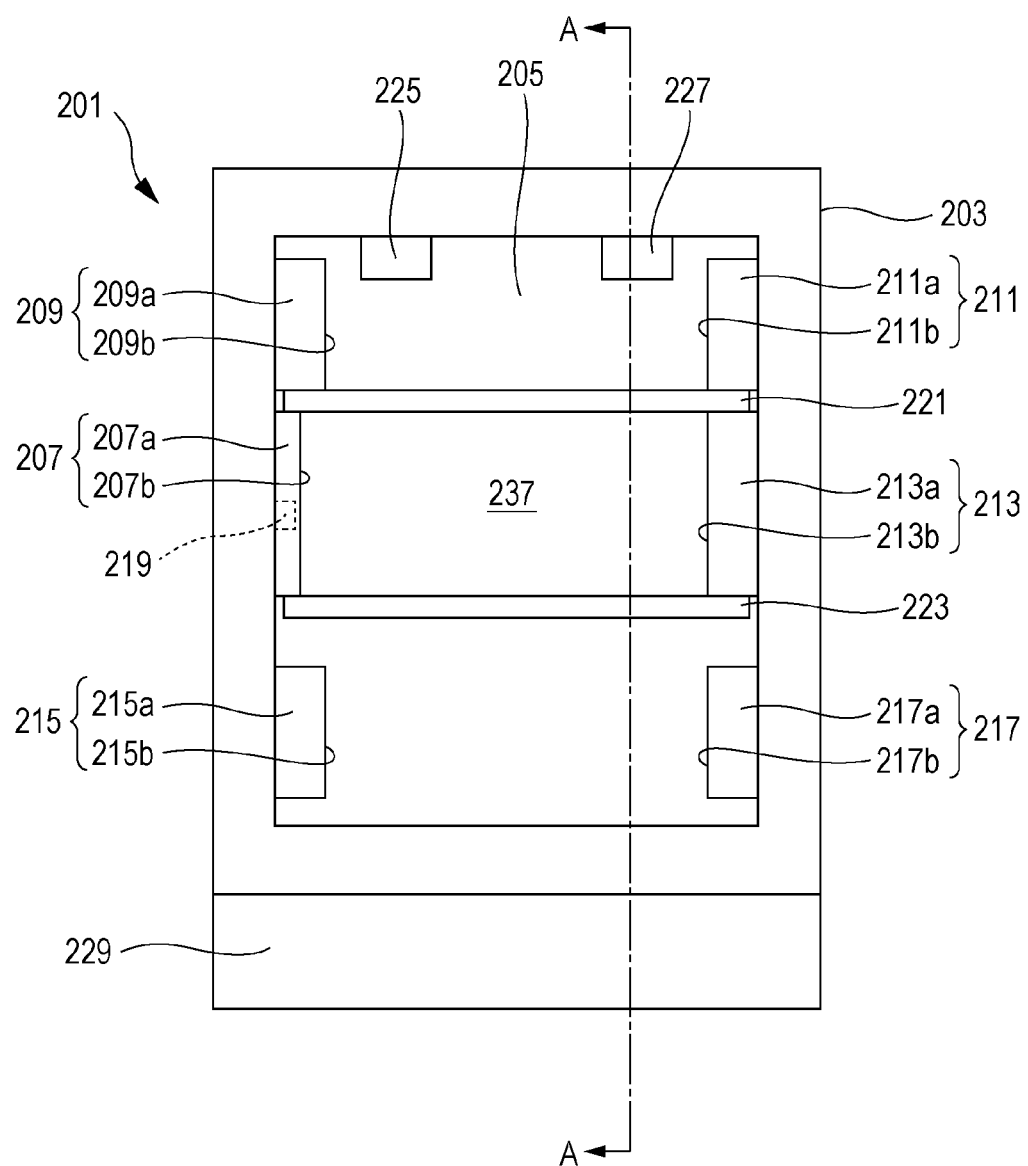
FIG. 33 is a front view illustrating a schematic configuration of cooling equipment 201 according to Example 1 of the tenth embodiment of the present invention.
Figure 34:
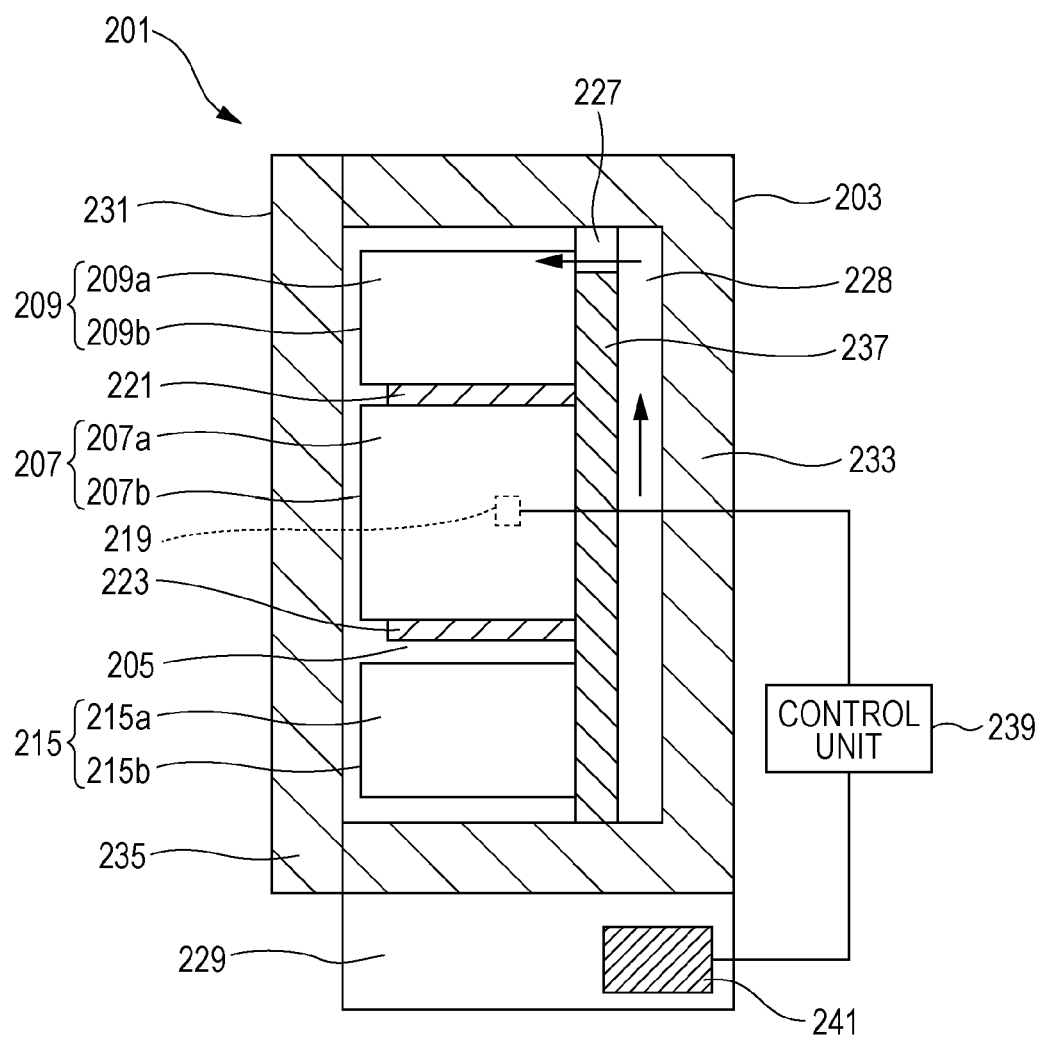
FIG. 34 is a cross-sectional view illustrating the schematic configuration of the cooling equipment 201 according to Example 1 of the tenth embodiment of the present invention.
Figure 35:
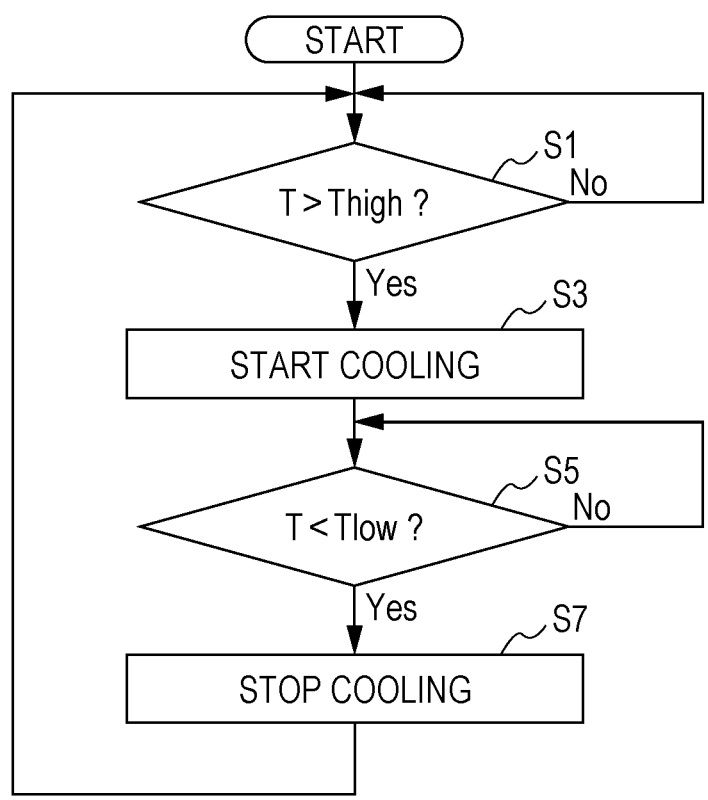
FIG. 35 is a flowchart illustrating an example of a control process flow in a temperature inside the cooling equipment 201 according to Example 1 of the tenth embodiment of the present invention.

First, cooling equipment according to Example 1 of the present embodiment will be described with reference to FIGS. 33 to 35. FIG. 33 is a front view illustrating a schematic configuration of cooling equipment 201 according to the present example. FIG. 34 is a cross-sectional view schematically illustrating a configuration of the cooling equipment 201 cut along the line A-A in FIG. 33. As illustrated in FIGS. 33 and 34, the cooling equipment 201 according to the present example has a rectangular parallelepiped-shaped cooling equipment main body 203 where one surface has an opening and a door member 231 (not illustrated in FIG. 33) which is rotatably attached to the cooling equipment main body 203 via a hinge (not illustrated) and can open and close the opening of the cooling equipment main body 203. A storage chamber 205 which stores storage goods is formed inside the cooling equipment main body 203.

The cooling equipment main body 203 has an insulator 233 which insulates the inside of the storage chamber 205 so as not to receive heat from outside. The insulator 233 fills a space between an outer wall (not illustrated) formed of a thin metal plate for example and an inner wall (not illustrated) formed of an ABS resin for example. That is, the cooling equipment main body 203 has a layered structure formed of the outer wall, the insulator 233 and the inner wall. The insulator 233 is formed of forming materials such as fiber-based insulation materials (glass wool or the like) or foaming resin-based insulation materials.

The door member 231 has an insulator 235 which insulates the storage chamber 205 so as not to receive the heat from outside. The insulator 235 fills a space between an outer wall (not illustrated) formed of a thin metal plate for example and an inner wall (not illustrated) formed of an ABS resin for example. That is, similar to the cooling equipment main body 203, the door member 231 has a layered structure formed of the outer wall, the insulator 235 and the inner wall. The insulator 235 is formed of a material the same as that of the insulator 233. A space surrounded by the insulator 233 of the cooling equipment main body 203 and the insulator 235 of the door member 231 in a state where the door member 231 is closed is an insulation space insulated from outside.

In addition, the cooling equipment 201 has a compressor 241 which configures a part of a vapor compression type refrigerating cycle for cooling the inside of the storage chamber 205 and compresses refrigerant. The compressor 241 is disposed in a space unit 229 disposed in a lower portion of the cooling equipment main body 203. Although not illustrated, in addition to the compressor 241, the refrigerating cycle is configured to have at least a condenser which condenses the refrigerant compressed in the compressor 241 and radiates heat outward, an expansion unit that expands the condensed refrigerant (for example, a capillary tube) and an evaporator which vaporizes the expanded refrigerant and cools the inside of the storage chamber 205 by using vaporization heat. The compressor 241 and the condenser are disposed outside the insulation space surrounded with the insulators 233 and 235. The evaporator is disposed in a cold air passage 228 (to be described later) within the insulation space.

The storage chamber 205 has an upper shelf 221 which defines an upper space of the storage chamber 205 and a lower shelf 223 which is arranged below the upper shelf 221 and defines a middle space of the storage chamber 205 between the lower shelf 223 and the upper shelf 221. The upper shelf 221 and the lower shelf 223 are respectively and horizontally supported by the shelf supports (not illustrated) or the like disposed on left and right inner walls inside the storage chamber 205 in a front view. A lower space of the storage chamber 205 is formed below the lower shelf 223.

The cold air passage 228 vertically extending for example is disposed inside the insulator 233, which is a further rear side from the storage chamber 205. The cold air passage 228 circulates cold air which is supplied by a blower (not illustrated) and cooled by heat exchange with the evaporator. An arrow in FIG. 34 indicates a flowing direction of the cold air. The cold air circulating in the cold air passage 228 is caused to blow out into the storage chamber 205 from a plurality of cold air ports (only two cold air ports 225 and 227 are illustrated in FIG. 33) disposed in an upper portion for example within the rear side inner wall of the storage chamber 205. In the cooling equipment 201 of the present example, the inside of the storage chamber 205 is cooled by the cold air which circulates in the cold air passage 228 and blows out from the cold air ports 225 and 227. The storage chamber 205 and the cold air passage 228 are separated from each other by a plate-shaped separator 237. The cold air blowing out into the storage chamber 205 returns to the cold air passage 228 via a suction port (not illustrated) disposed in a lower portion inside the storage chamber 205 for example.

The left and right inner walls of the upper space in the storage chamber 205 have temperature-maintaining heat storage members (first latent heat storage member) 209 and 211, the right inner wall of the middle space has a temperature-maintaining heat storage member 213, and the left and right inner walls of the lower space have temperature-maintaining heat storage members 215 and 217. The temperature-maintaining heat storage members 209 to 217 are disposed in order to maintain a temperature inside the storage chamber 205 to have a predetermined temperature for a predetermined period of time. The temperature-maintaining heat storage member 209 is attached to the left side inner wall of the upper space which is above the upper shelf 221 within the storage chamber 205. The temperature-maintaining heat storage member 211 is attached to the right side inner wall of the upper space. The temperature-maintaining heat storage member 213 is attached to the right side inner wall of the middle space between the upper shelf 221 and the lower shelf 223 within the storage chamber 205. The temperature-maintaining heat storage member 215 is attached to the left side inner wall in the lower space below the lower shelf 223 within the storage chamber 205. The temperature-maintaining heat storage member 217 is attached to the right side inner wall of the lower space.

The temperature-maintaining heat storage member 209 has a latent heat storage material (first latent heat storage material) 209a which is reversibly phase-transited between the solid phase and the liquid phase, and a container body (predetermined container body) 209b which seals the latent heat storage material 209a. Similarly, the temperature-maintaining heat storage members 211, 213, 215, and 217 respectively have latent heat storage materials (first latent heat storage materials) 211a, 213a, 215a, and 217a which are reversibly phase-transited between the solid phase and the liquid phase, and container bodies (predetermined container bodies) 211b, 213b, 215b, and 217b which seal the latent heat storage materials 211a, 213a, 215a, and 217a.

The temperature-maintaining heat storage members 209, 211, 215, and 217 have a shape which is substantially the same as each other. The temperature-maintaining heat storage members 209, 211, 215, and 217 respectively have a rectangular flat plate shape as a whole. The temperature-maintaining heat storage members 209, 211, 215, and 217 respectively have a substantially constant thickness. The temperature-maintaining heat storage members 209, 211, 215, and 217 respectively have a substantially uniform thickness. The temperature-maintaining heat storage member 213 has a square flat plate shape as a whole. The temperature-maintaining heat storage member 213 has a substantially constant thickness. The temperature-maintaining heat storage members 209 to 217 have the thickness which is substantially the same as each other. The temperature-maintaining heat storage members 209 to 217 are respectively formed to have an average thickness which is substantially the same as each other. The thickness of the temperature-maintaining heat storage members 209 to 217 and a temperature-control heat storage member (to be described later, a second latent heat storage member) 207 is a length from a contact surface brought into contact with the inner wall of the storage chamber 205 to an opposing surface opposing the contact surface for example. The same is applied to the thickness of the temperature-control heat storage members and the temperature-maintaining heat storage member in the following example.

The container bodies 209b, 211b, 213b, 215b, and 217b have a shape of a thin box made of resins such as ABS or polycarbonate, and have a predetermined rigidity. When the latent heat storage material is flammable, it is desirable to form the container body by using a flame-retardant material. In addition, when using paraffin as the latent heat storage material, it is desirable that the container body have a gas barrier property since paraffin is a volatile organic compound (VOC) depending on types. Alternatively, a sheet or a film which adsorbs gas of paraffin may be used.

The temperature-maintaining heat storage members 209 to 217 are generally used in a predetermined working temperature range and working pressure range. The temperature-maintaining heat storage members 209 to 217 of the present example are cooled inside the storage chamber 205 so as to store coldness when the compressor 241 of the cooling equipment 1 is operated, and radiates the coldness so as to suppress the temperature rising inside the storage chamber 205 when the compressor 241 is stopped. In this case, the working temperature range of the temperature-maintaining heat storage members 209 to 217 includes a temperature inside the storage chamber 205 during a normal operation. In addition, the working pressure of the temperature-maintaining heat storage members 209 to 217 is an atmospheric pressure for example.

The latent heat storage materials 209a to 217a included in the temperature-maintaining heat storage members 209 to 217 have a phase change temperature (melting point) which reversibly causes a phase change between the solid phase and the liquid phase within the working temperature range of the temperature-maintaining heat storage members 209 to 217. The latent heat storage material has the liquid phase at a temperature higher than the phase change temperature and the solid phase at a temperature lower than the phase change temperature. The latent heat storage material at the phase change temperature is in a two-phase (solid and liquid phases) state where the solid phase and the liquid phase are mixed together. As described above with reference to FIGS. 29 to 32, the temperature-maintaining heat storage members 209 to 217 of the present example always maintain a state of two phases (solid and liquid phases) when the cooling equipment 1 is in a normal operation state (operation state where the compressor 241 is normally controlled).

A heat storage is a technology where heat is temporarily stored and the heat is extracted when necessary. A heat storage method includes sensible heat storage, latent heat storage and chemical heat storage, but the present example adopts the latent heat storage. In the latent heat storage, the latent heat of materials is used to store heat energy of a phase change of the materials. Heat storage density is high and an output temperature is constant. As the latent heat storage materials 209a to 217a, ice (water), paraffin or inorganic salt are used.

The latent heat storage materials 209a to 217a of the present example include paraffin. Paraffin refers to a general term of saturated chain hydrocarbon expressed by a general formula $C_nH_{2n+2}$. In the present example, it is desirable that the phase change temperature which allows the latent heat storage materials 209a to 217a to be reversibly phase-changed between the solid phase and the liquid phase is approximately 4° C. to 6° C.

In addition, the latent heat storage materials 209a to 217a contain a gelling agent for gelling (solidifying) paraffin. A gel means that molecules are cross-linked to form a three-dimensional network structure and the inside thereof absorbs solvent to swell. The gelling agent leads to a gelling effect only by allowing paraffin to contain a few mass % of the gelling agent.

The temperature-control heat storage member 207 is disposed opposing the temperature-maintaining heat storage member 213 on the left inner wall of the middle space. The temperature-control heat storage member 207 has a latent heat storage material (second latent heat storage material) 207a which is reversibly phase-transited between the solid phase and the liquid phase, and a container body (predetermined container body) 207b which seals the latent heat storage material 207a. The temperature-control heat storage member 207 has a rectangular flat plate shape as a whole. The temperature-control heat storage member 207 has a substantially constant thickness. The temperature-control heat storage member 207 has a substantially uniform thickness. The temperature-control heat storage member 207 is used in controlling the temperature inside the storage chamber 205. The temperature-control heat storage member 207 is configured to be phase-transited earlier than the temperature-maintaining heat storage members 209 to 217. The temperature-control heat storage member 207 has a structure different from that of the temperature-maintaining heat storage members 209 to 217. In the present example, the temperature-control heat storage member 207 is formed to have the thickness thinner than the thickness of the temperature-maintaining heat storage members 209 to 217. In this manner, the temperature-control heat storage member 207 has a structure different from a structure of the temperature-maintaining heat storage members 209 to 217. The temperature-control heat storage member 207 is formed to have an average thickness thinner than an average thickness of the temperature-maintaining heat storage members 209 to 217. In this manner, in the present embodiment, the latent heat storage materials disposed inside the storage chamber 205 are formed to have a different thickness depending on a region. The latent heat quantity of the latent heat storage material in the thickness direction is increased as the thickness is thicker. The temperature-control heat storage member 207 has the thickness thinner than that of the temperature-maintaining heat storage members 209 to 217. Therefore, the latent heat quantity of the temperature-control heat storage member 207 in the thickness direction is smaller than the latent heat quantity of the temperature-maintaining heat storage members 209 to 217 in the thickness direction. The cooling time of the latent heat storage material is substantially proportional to the latent heat quantity of the latent heat storage material in the thickness direction. That is, the cooling time of the latent heat storage material is substantially proportional to the thickness of the latent heat storage material. For example, in order to start the cooling inside the storage chamber 205 at the time when all the latent heat storage materials 209a to 217a are respectively melted by 80%, the thickness of the latent heat storage material 207a at a section for disposing a temperature sensor 219 (to be described later) is set to have the thickness of approximately 80% as compared to each thickness of the latent heat storage materials 209a to 217a. The temperature-control heat storage member 207, when maintaining the phase change temperature, also functions as the heat storage member for maintaining the temperature inside the storage chamber 205.

The latent heat storage material 207a is formed to have the forming material the same as that of the latent heat storage materials 209a to 217a. Thus, the detailed description will be omitted. The container body 207b is formed to have the forming material the same as that of the container bodies 209b to 217b. Thus, the detailed description will be omitted.

The cooling equipment 201 has the temperature sensor 219 which detects a state of the temperature-control heat storage member 207. The temperature sensor 219 is used for controlling the compressor 241. The temperature sensor 219 is disposed in the vicinity of the temperature-control heat storage member 207 which is phase-transited earlier than the temperature-maintaining heat storage members 209 to 217. The temperature sensor 219 is disposed in the vicinity of the temperature-control heat storage member 207 whose thickness is thinner than that of the temperature-maintaining heat storage members 209 to 217. In the present example, the temperature sensor 219 is disposed inside the container body 207b of the temperature-control heat storage member 207 so as to be in direct contact with the latent heat storage material 207a included in the temperature-control heat storage member 207. As described above with reference to FIGS. 29 to 32, the thin latent heat storage material is likely to be melted and frozen compared to the thick latent heat storage material. Therefore, the temperature sensor 219 detects the temperature of the portion which is likely to be melted and frozen relatively among the latent heat storage materials 207a to 217a inside the storage chamber 205. The temperature-maintaining heat storage members 209 to 217 are formed to have a substantially constant thickness. Therefore, the latent heat quantity of the temperature-maintaining heat storage members 209 to 217 in the thickness direction has a substantially equal value at any portion. In another point of view, any portion has the maximum value. Accordingly, the temperature sensor 219 is disposed at a section where the latent heat quantity of the temperature-control heat storage member 207 in the thickness direction is smaller than the maximum value of the latent heat quantity of the temperature-maintaining heat storage members 209 to 217 in the thickness direction. Therefore, the temperature sensor 219 detects the temperature of the portion where the latent heat quantity in the thickness direction is small among latent heat storage materials 207a to 217a inside the storage chamber 205.

In addition, the cooling equipment 201 has a control unit 239 which includes a CPU, a ROM, a RAM, input and output ports and controls the entire cooling equipment 201. The temperature sensor 219 is connected to the input port of the control unit 239. The control unit 239 controls the compressor 241 based on the temperature signal input from the temperature sensor 219. Based on the input temperature signal, the control unit 239 starts the compressor 241 when determining that the temperature of the latent heat storage material 207a of the temperature-control heat storage member 207, which is likely to be phase-transited relatively, is higher than the phase change temperature (melting point). This operates the refrigerating cycle to lower the temperature inside the storage chamber 205. In addition, based on the input temperature signal, the control unit 239 stops the compressor 241 when determining that the temperature of the latent heat storage material 207a is lower than the phase change temperature. The latent heat storage materials 209a to 217a of the temperature-maintaining heat storage members 209 to 217 can maintain the phase change temperature during the normal operation of the compressor 241 and can maintain the state of two phases (solid and liquid phases). This enables the cooling equipment 201 to easily and accurately maintain a substantially constant temperature inside the storage chamber 205.

Next, a control process of the temperature inside the cooling equipment 201 according to the present example will be described with reference to FIG. 35. FIG. 35 is a flowchart illustrating an example of a control process flow of the temperature inside the cooling equipment 201 according to the present example. As illustrated in FIG. 35, in the control process flow of the temperature inside the cooling equipment 201, it is first determined whether or not a temperature T of the latent heat storage material 207a included in the temperature-control heat storage member 207 is higher than an upper limit temperature Thigh (step S1). The upper limit temperature Thigh is set to have a value which is higher than the phase change temperature (melting point) of the latent heat storage material 207a. The upper limit temperature Thigh is set to be the temperature which is higher than the phase change temperature by 0.5° C. to 1° C. for example. The control unit 239 determines whether or not a detection temperature detected by the temperature sensor 219, that is, the temperature T of the latent heat storage material 207a is higher than the upper limit temperature Thigh. The control unit 239 repeats the process until the detection temperature is higher than the upper limit temperature Thigh, and proceeds to a process in step S3 when determining that the detection temperature is higher than the upper limit temperature Thigh.

In step S3 next to step S1, the cooling of the storage chamber 205 is started. For example, the control unit 239 proceeds to a process in step S5 after operating the compressor 241 to start the cooling of the storage chamber 205.

In step S5 next to step S3, the control unit 239 determines whether or not the temperature T of the latent heat storage material 207a is lower than a lower limit temperature Tlow. The lower limit temperature Tlow is set to be the temperature which is lower than the phase change temperature (melting point) of the latent heat storage material 207a. The lower limit temperature Tlow is set to be the temperature which is lower than the phase change temperature by 0.5° C. to 1° C. for example. The control unit 239 determines whether or not the temperature T of the latent heat storage material 207a which is detected by the temperature sensor 219 is lower than the lower limit temperature Tlow. The control unit 239 repeats the process until the temperature T is lower than the lower limit temperature Tlow, and proceeds to a process in step S7 when determining that the temperature T is lower than the lower limit temperature Tlow.

In step S7 next to step S5, the cooling of the storage chamber 205 is stopped. For example, the control unit 239 proceeds to a process in step S1 after stopping the compressor 241 to stop the cooling of the storage chamber 205.

In this manner, the cooling equipment 201 according to the present example is configured to detect the temperature of the temperature-control heat storage member 207 which is thinner than the temperature-maintaining heat storage members 209 to 217 and to control the compressor 241 based on the temperature. The cooling equipment 201 can accurately maintain a substantially constant temperature inside the storage chamber 205 by using a simple method of detecting the temperature of the temperature-control heat storage member 207 which is independently disposed and separated from the temperature-maintaining heat storage members 209 to 217.

The cooling equipment 201 according to the present example is configured to start and finish the cooling by using an absolute value detected by the temperature sensor 219, but is not limited thereto. For example, the cooling equipment 201 according to the present embodiment may be configured to sequentially calculate an amount of the time variation in the temperature detected by the temperature sensor 219 and to determine the time for starting the cooling and the time for finishing the cooling by using a size of the absolute value of the variation amount. In addition, the control of the cooling inside the storage chamber 205 is not limited to the operation/stop of the compressor 241. The control may be an on-off control for the cold air ports 225 and 227, or a vent hole (not illustrated) located in the middle of the cold air passages 225 and 227 from the evaporator. Furthermore, the control of the cooling inside the storage chamber 205 may be an operation/stop control for a cooling fan (not illustrated) which blows the cold air to the cold air ports 225 and 227 from the evaporator. In addition, when a plurality of evaporators is provided with respect to one compressor, the control may be control as to whether or not the refrigerant is allowed to flow to the evaporators.

As described above, the cooling equipment 201 according to the present example has the storage chamber 205 which stores storage goods; the temperature-maintaining heat storage members 209 to 217 which have the latent heat storage materials 209a to 217a, disposed inside the storage chamber 205 and maintains the temperature inside the storage chamber 205; the temperature-control heat storage member 207 which has the latent heat storage material 207a, provided with the structure different from that of the temperature-maintaining heat storage members 209 to 217, disposed inside the storage chamber 205 and is used in controlling the temperature inside the storage chamber 205; the temperature sensor 219 which detects the state (in the present embodiment, the temperature) of the temperature-control heat storage member 207; the compressor 241 which configures the refrigerating cycle for cooling the inside of the storage chamber 205; and the control unit 239 which controls the compressor 241 based on the state (temperature) of the temperature-control heat storage member 207.

In this manner, the cooling equipment 201 can easily and accurately maintain a substantially constant temperature of the storage chamber 205. Since the cooling equipment 201 can more stably maintain the temperature of the storage chamber 205, foodstuff stored inside the storage chamber 205 is not under stress, thereby maintaining freshness of the foodstuff. In addition, in the cooling equipment 201, the temperature-maintaining heat storage members 209 to 217 are always in a state of storing the coldness. Accordingly, it is possible to prevent the temperature rising inside the storage chamber 205 when the door member 231 is opened and closed. In addition, in the cooling equipment 201, it is sufficient if the temperature of the cold air during the cooling is slightly lower than the phase change temperature of the temperature-maintaining heat storage members 209 to 217. Accordingly, as compared to the heat storage refrigerator in the related art, it is not necessary to prepare colder air for lowering the temperature of the heat storage material whose temperature rises during the period of the stopped compressor. Therefore, as compared to the heat storage refrigerator in the related art, the cooling equipment 201 can reduce a load applied to the compressor 241. Since the load applied to the compressor 241 is reduced, it is possible for the cooling equipment 201 to miniaturize the compressor 241, thereby enabling cost saving. Furthermore, the cooling equipment 201 can prevent the temperature-maintaining heat storage members 209 to 217 from being excessively cooled. Accordingly, it is possible to reduce energy loss, thereby obtaining an energy saving effect.

EXAMPLE 2

Figure 36:
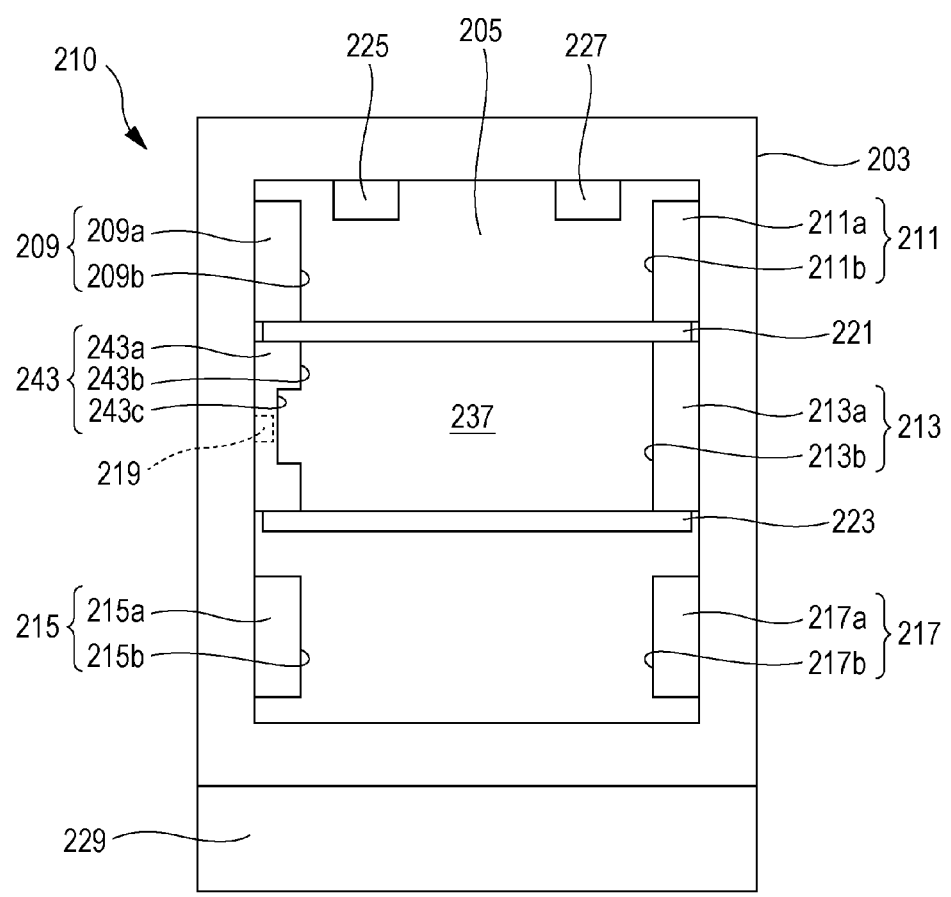
FIG. 36 is a front view illustrating a schematic configuration of cooling equipment 210 according to Example 2 of the tenth embodiment of the present invention.
Figure 37:
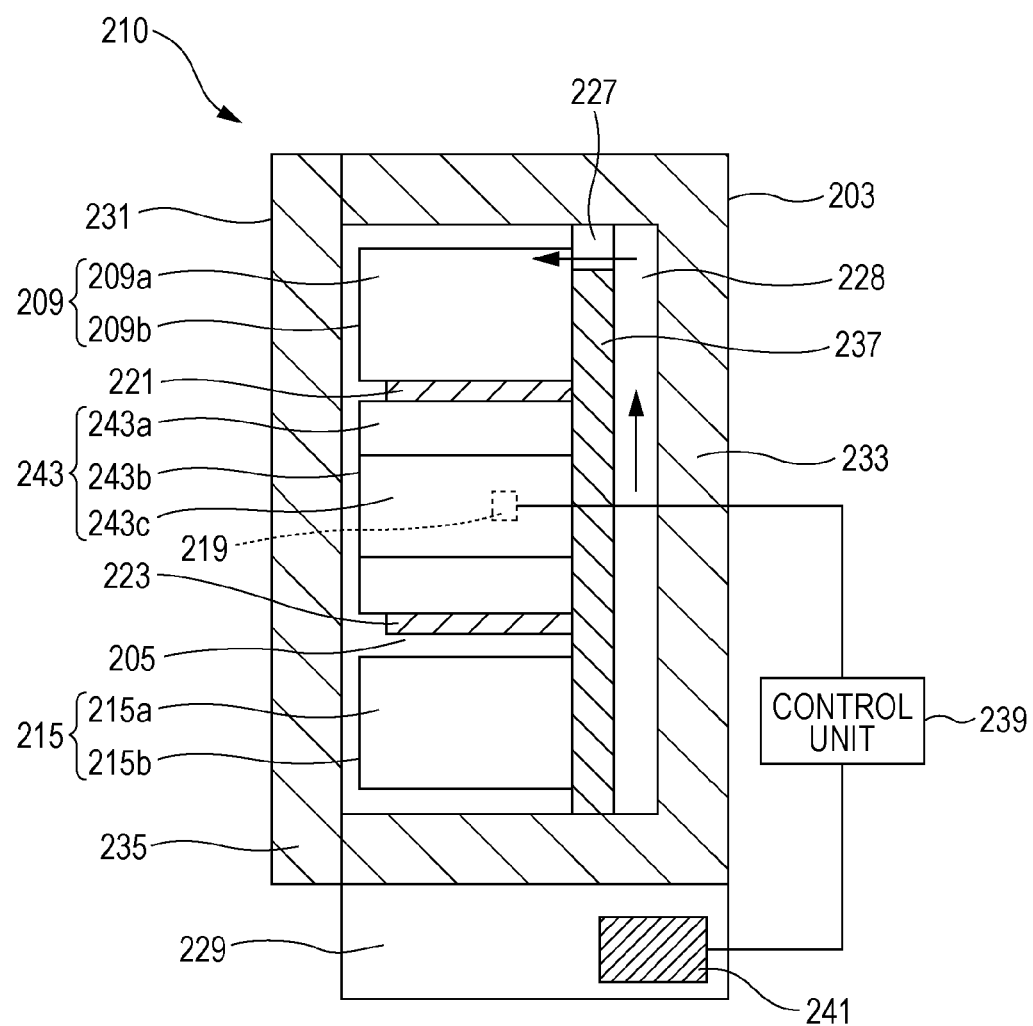
FIG. 37 is a cross-sectional view illustrating the schematic configuration of the cooling equipment 210 according to Example 2 of the tenth embodiment of the present invention.

Cooling equipment 210 according to Example 2 of the present embodiment will be described with reference to FIGS. 36 and 37. FIGS. 36 and 37 respectively correspond to FIGS. 33 and 34, and illustrate a schematic configuration of the cooling equipment 210 according to the present example. The same reference numerals are given to the same configuring elements having functions and operations which are the same as those of the cooling equipment 201 according to Example 1 described above, and the description thereof will be omitted.

As illustrated in FIGS. 36 and 37, a temperature-control heat storage member 243 has a latent heat storage material 243a, a container body 243b which seals the latent heat storage material 243a, and a recess 243c disposed to be partially thin. Since the temperature-control heat storage member 243 includes the recess 243c, the temperature-control heat storage member 243 is formed to have a recess shape in a cross-sectional view and to have a partially different thickness. Within the temperature-control heat storage member 243, the thickness of a region having the recess 243c is thinner than the thickness of the remaining region. That is, since the region of the recess 243c is thinner than the remaining region, the latent heat storage material 243a is formed to have the partially different thickness. This causes a structure of the temperature-control heat storage member 243 to be different from a structure of the rectangular flat plate-shaped temperature-maintaining heat storage members 209 to 217.

The latent heat storage material 243a is formed of the forming material the same as that of the latent heat storage material 207a of Example 1 described above. The container body 243b is formed to have a recess shape in a cross-sectional view and to have the partially different thickness. The container body 243b is formed of the forming material the same as that of the container body 207b of Example 1 described above.

A temperature sensor 219 for controlling the compressor 241 is disposed in contact with the latent heat storage material 243a in the thin recess 243c within the temperature-control heat storage member 243. In addition, the thickness of the temperature-control heat storage member 243 of the recess 243c having the temperature sensor 219 is thinner than the average thickness of the temperature-maintaining heat storage members 209 to 217. Therefore, the temperature sensor 219 detects the temperature of a portion which is likely to be phase-transited relatively within the latent heat storage material inside the storage chamber 205.

As described above, in the cooling equipment 210 of the present example, the heat storage member (temperature-maintaining heat storage members 209 to 217 and the temperature-control heat storage member 243) is formed to have the different thickness depending on a region, and the temperature sensor 219 is configured to detect the temperature of the portion in which the latent heat storage material is thin (thin portion of the recess 243c of the temperature-control heat storage member 243).

According to this configuration, it is possible to detect the temperature of the portion which is likely to be phase-transited relatively among the latent heat storage materials 209a to 217a and 243a of the temperature-maintaining heat storage members 209 to 217 and the temperature-control heat storage member 243 inside the storage chamber 205. Accordingly, it is possible to effectively control the compressor 241 in response to the state of the phase change of the latent heat storage material 243a. For example, it is possible to start the compressor 241 before the temperature inside the storage chamber 205 rises and the latent heat storage materials 209a to 217a of the temperature-maintaining heat storage members 209 to 217 are melted. It is possible to stop the compressor 241 before the temperature inside the storage chamber 205 falls and the latent heat storage materials 209a to 217a are frozen. This enables the cooling equipment 210 to obtain the effect the same as that of the cooling equipment 201 according to Example 1 described above.

EXAMPLE 3

Figure 38:
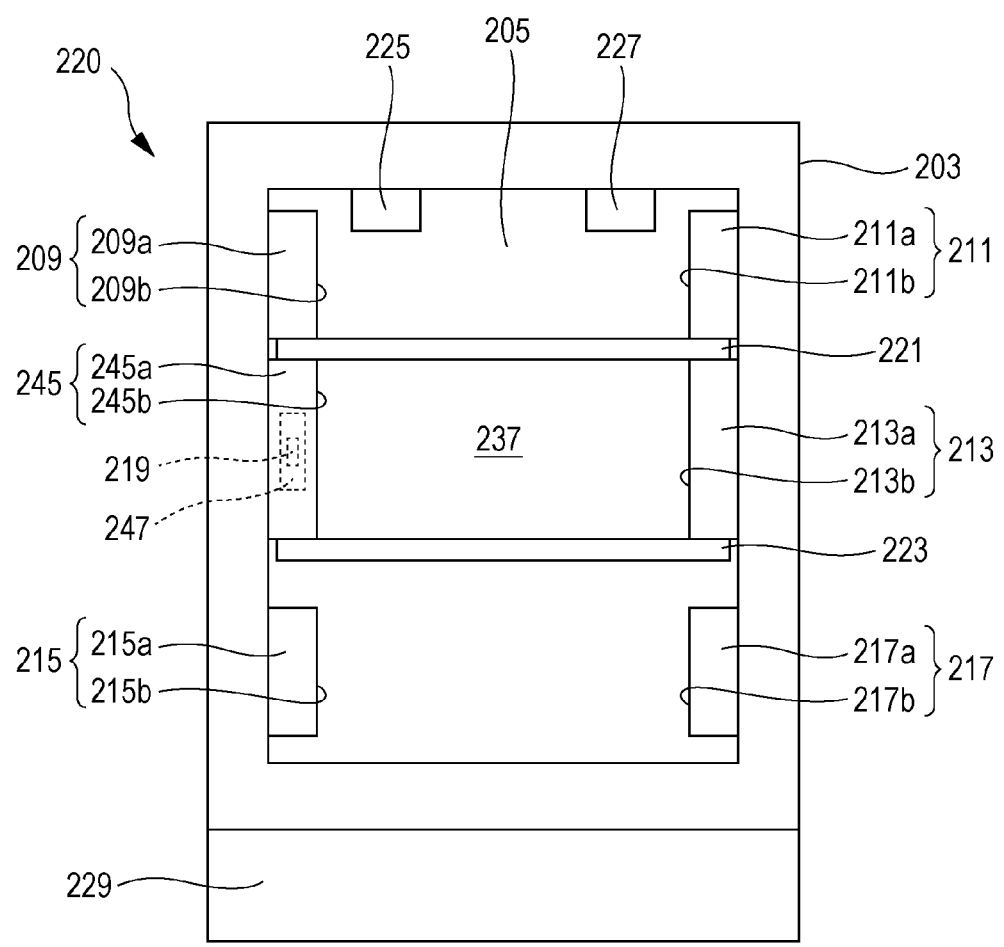
FIG. 38 is a front view illustrating a schematic configuration of cooling equipment 220 according to Example 3 of the tenth embodiment of the present invention.
Figure 39:
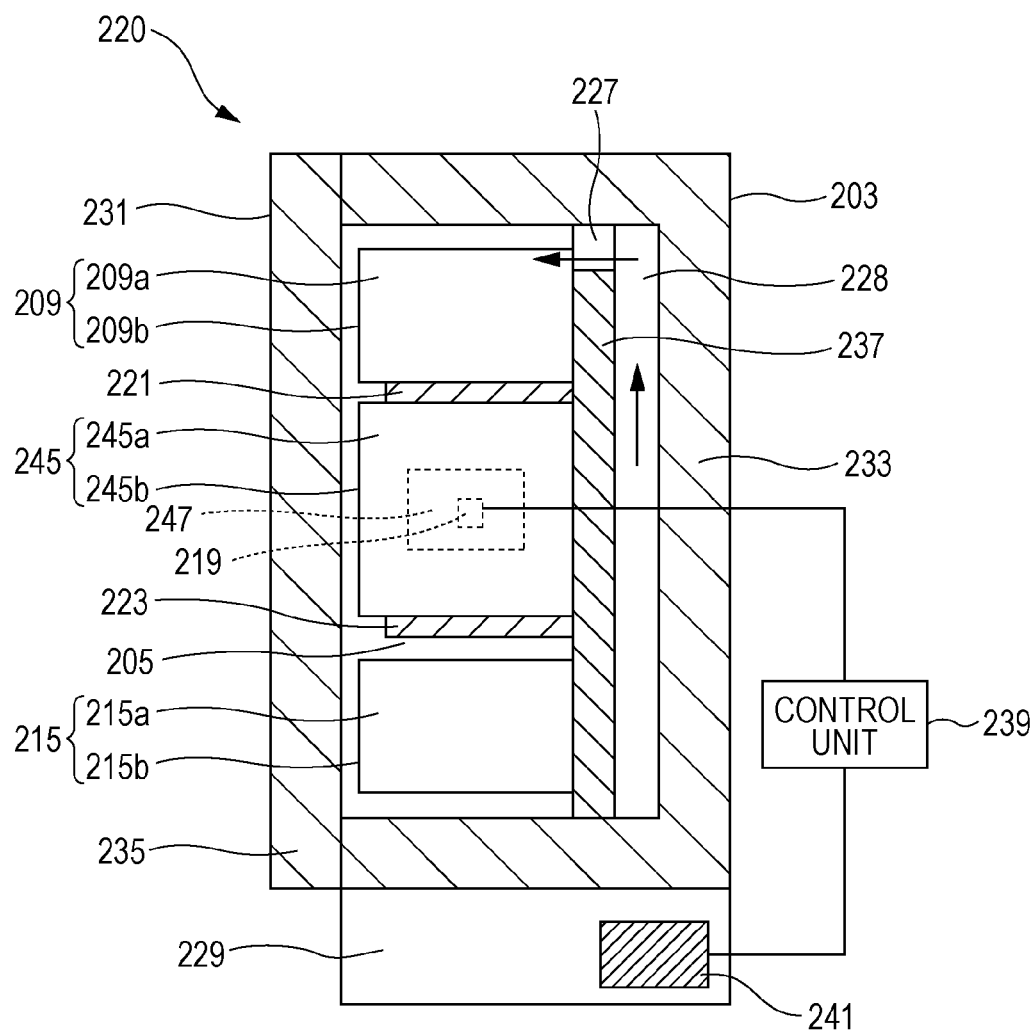
FIG. 39 is a cross-sectional view illustrating the schematic configuration of the cooling equipment 220 according to Example 3 of the tenth embodiment of the present invention.

Next, cooling equipment 220 according to Example 3 of the present embodiment will be described with reference to FIGS. 38 to 40. FIGS. 38 and 39 respectively correspond to FIGS. 33 and 34, and illustrate a schematic configuration of the cooling equipment 220 according to the present example. The same reference numerals are given to the same configuring elements having functions and operations which are the same as those of the cooling equipment 201 according to Example 1 described above, and the description thereof will be omitted.

As illustrated in FIGS. 38 and 39, the cooling equipment 220 has a plate-shaped member 247 provided in a temperature-control heat storage member 245. This causes a structure of the temperature-control heat storage member 245 to be different from a structure of the rectangular flat plate-shaped temperature-maintaining heat storage members 209 to 217. The temperature sensor 219 for controlling the compressor 241 is arranged in contact with the plate-shaped member 247 inside a latent heat storage material 245a of the temperature-control heat storage member 245. In the example illustrated in FIGS. 38 and 39, the temperature sensor 219 is arranged by being embedded in substantially a center portion inside the plate-shaped member 247.

The plate-shaped member 247 is arranged in a portion of the center of the temperature-control heat storage member 245. The plate-shaped member 247 is formed of a material having no latent heat within a temperature range for controlling the temperature inside the storage chamber 205. The plate-shaped member 247 is formed of the material having high heat conductivity since increased uniformity of the temperature is needed. The plate-shaped member 247 is formed of the material having the heat conductivity higher than that of the forming material of the latent heat storage material 245a. The plate-shaped member 247 has a rectangular flat plate shape. The plate-shaped member 247 is formed in a rectangular thin plate shape having a vertical length and a horizontal length which are approximately equal to or longer than the thickness when viewed in a normal direction. The plate-shaped member 247 is formed to have the thickness thinner than each thickness of the temperature-maintaining heat storage members 209 to 217 and the temperature-control heat storage member 245.

The temperature-control heat storage member 245 has a rectangular flat plate shape as a whole. In addition, the temperature-control heat storage member 245 has an outer shape which is substantially the same as that of the temperature-maintaining heat storage member 213. The temperature-control heat storage member 245 has a thickness which is substantially the same as that of the temperature-maintaining heat storage member 213. However, the plate-shaped member 247 is arranged inside the temperature-control heat storage member 245. Although the temperature-control heat storage member 245 has the thickness which is substantially the same as that of the temperature-maintaining heat storage member 213, a portion where the plate-shaped member 247 of the temperature-control heat storage member 245 is arranged has a smaller latent heat quantity in the thickness direction by a portion where the plate-shaped member 247 is arranged as compared to a portion where plate-shaped member 247 is not arranged. The portion having the relatively smaller latent heat quantity is likely to be melted and frozen relatively. In the present example, the temperature sensor 219 is disposed in the plate-shaped member 247. Accordingly, the temperature sensor 219 is arranged in the portion having the smaller latent heat quantity in the thickness direction of the temperature-control heat storage member 245. That is, the temperature sensor 219 detects the temperature of the portion which is likely to be phase-transited relatively within the latent heat storage material inside the storage chamber 205. This enables the cooling equipment 220 according to the present example to obtain the effect the same as that of the cooling equipment 201 according to Example 1 described above.

FIG. 40 illustrates various shapes of the plate-shaped member 247. As illustrated in FIG. 40(*a*), the plate-shaped member 247 has a square flat plate shape and the temperature sensor 219 is arranged in substantially the center portion. As illustrated in FIG. 40(*b*), the plate-shaped member 247 may have a square flat plate shape and the temperature sensor 219 may be arranged on the surface thereof. If the plate-shaped member 247 illustrated in FIG. 40(*b*) is arranged in the temperature-control heat storage member 245 which is filled with the latent heat storage material 245a, the temperature sensor 219 can be in direct contact with the latent heat storage material 245a. Although not illustrated, the plate-shaped member 247 may have a rectangular flat plate shape and the temperature sensor 219 may be arranged on the surface thereof. As illustrated in FIG. 40(*c*), the plate-shaped member 247 may have a shape of a flat plate disk and the temperature sensor 219 may be arranged in substantially the center portion. In addition, as illustrated in FIG. 40(*d*), the plate-shaped member 247 may have a shape of a disk having an elliptical shape when viewed from a lateral surface side and the temperature sensor 219 may be arranged in substantially the center portion.

If the plate-shaped member 247 has a shape other than a rectangular parallelepiped shape, it is desirable that the temperature sensor 219 is arranged inside the plate-shaped member 247 such that within the length from the temperature sensor 219 to the surface of the plate-shaped member 247, the length parallel to the thickness direction of the temperature-control heat storage member 245 is substantially equal to or shorter than the length orthogonal to the thickness direction of the temperature-control heat storage member 245.

EXAMPLE 4

Figure 41:
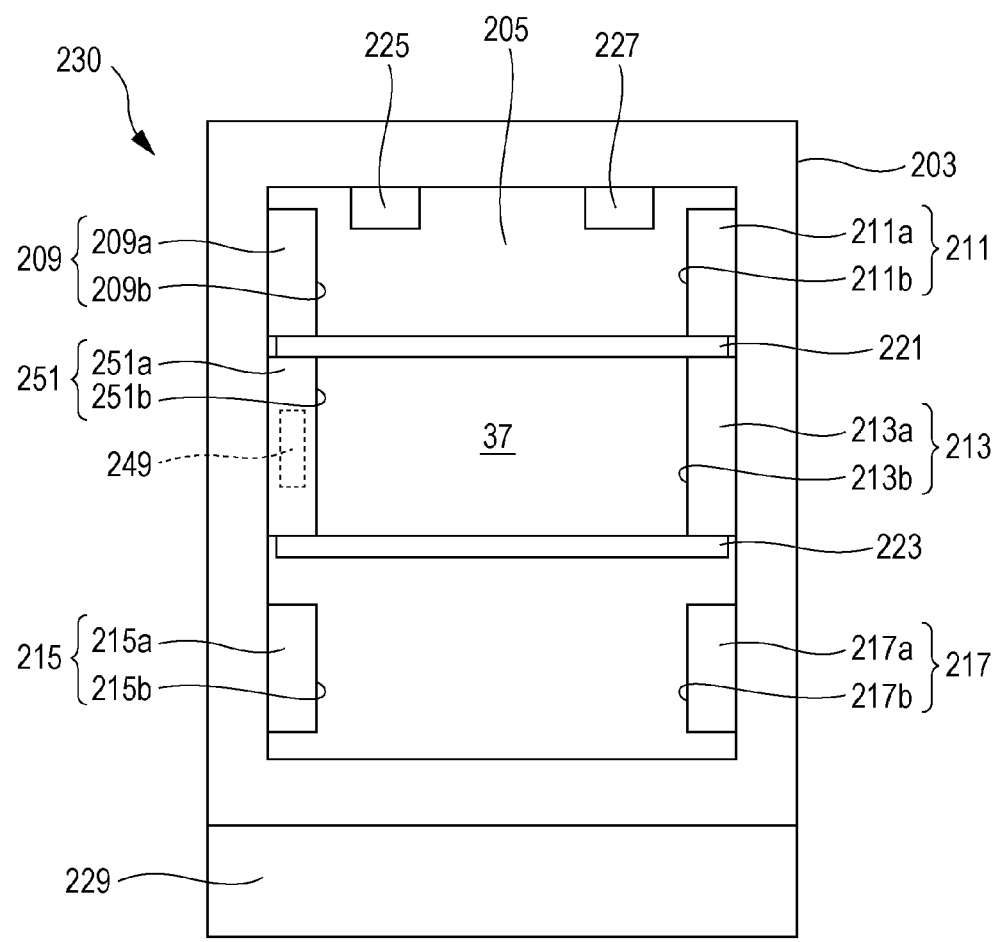
FIG. 41 is a front view illustrating a schematic configuration of cooling equipment 230 according to Example 4 of the tenth embodiment of the present invention.
Figure 42:
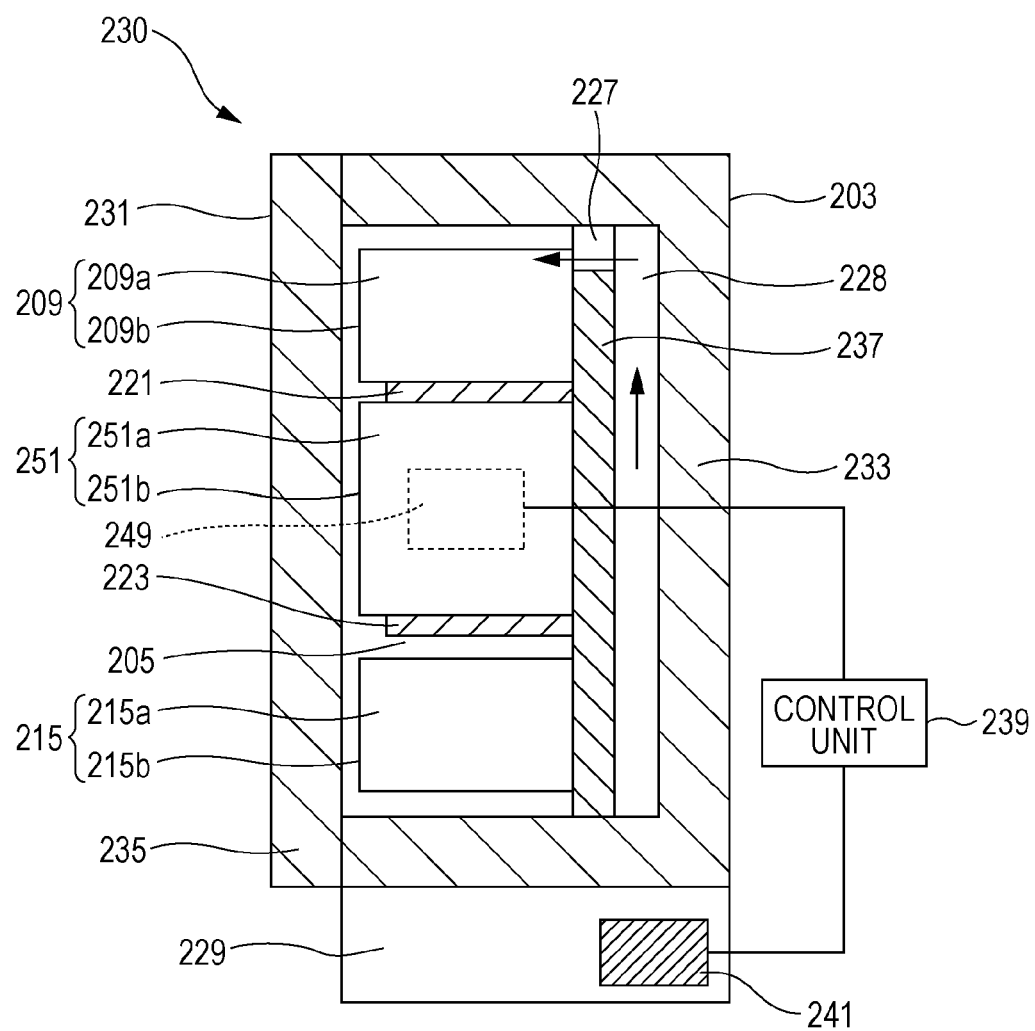
FIG. 42 is a cross-sectional view illustrating the schematic configuration of the cooling equipment 230 according to Example 4 of the tenth embodiment of the present invention.

Next, cooling equipment 230 according to Example 4 of the present embodiment will be described with reference to FIGS. 41 to 42. FIGS. 41 and 42 respectively correspond to FIGS. 33 and 34, and illustrate a schematic configuration of the cooling equipment 230 according to the present example. The same reference numerals are given to the same configuring elements having functions and operations which are the same as those of the cooling equipment 201 according to Example 1 described above, and the description thereof will be omitted.

As illustrated in FIGS. 41 and 42, the cooling equipment 230 has a temperature sensor 249 which is disposed inside a temperature-control heat storage member 251 and has a predetermined thickness. The temperature sensor 249 is used in controlling the compressor 241. The temperature sensor 249 has a rectangular flat plate shape. The temperature sensor 249 is arranged by being embedded in substantially a center inside the temperature-control heat storage member 251. This causes a structure of the temperature-control heat storage member 251 to be different from a structure of the rectangular flat plate-shaped temperature-maintaining heat storage members 209 to 217. The temperature-control heat storage member 251 has a latent heat storage material 251a and a container body 251b which seals the latent heat storage material 251a. The latent heat storage material 251a is formed of a material the same as that of the latent heat storage materials 209a to 217a. The container body 251b has a rectangular box shape. The container body 251b is formed of the material the same as that of the container bodies 209b to 217b.

The temperature sensor 249 is arranged in a portion of the center of the temperature-control heat storage member 251. The temperature sensor 249 is formed of a material having no latent heat within a temperature range for controlling the temperature inside the storage chamber 205. The temperature sensor 249 is formed of the material having high heat conductivity since increased uniformity of the temperature is needed. The temperature sensor 249 is formed of the material having the heat conductivity higher than that of the forming material of the latent heat storage material 251a. The temperature sensor 249 has a rectangular flat plate shape. The temperature sensor 249 is formed in a rectangular thin plate shape having a vertical length and a horizontal length which are longer than the thickness when viewed from a normal direction. The temperature sensor 249 is formed to have the thickness thinner than each thickness of the temperature-maintaining heat storage members 209 to 217 and the temperature-control heat storage member 251.

The temperature-control heat storage member 251 has a rectangular flat plate shape as a whole. In addition, the temperature-control heat storage member 251 has an outer shape which is substantially the same as that of the temperature-maintaining heat storage members 213. The temperature-control heat storage member 251 has the thickness which is substantially the same as that of the temperature-maintaining heat storage members 213. However, the temperature sensor 249 is arranged inside the temperature-control heat storage member 251. Although the temperature-control heat storage member 251 has the thickness which is substantially the same as that of the temperature-maintaining heat storage member 213, a portion where the temperature sensor 249 of the temperature-control heat storage member 251 is arranged has a smaller latent heat quantity in the thickness direction by a portion where the temperature sensor 249 is arranged as compared to a portion where temperature sensor 249 is not arranged. The portion having the relatively smaller latent heat quantity is likely to be melted and frozen relatively. In the present example, the temperature sensor 249 is arranged in the portion having the smaller latent heat quantity in the thickness direction of the temperature-control heat storage member 251. That is, the temperature sensor 249 detects the temperature of the portion which is likely to be phase-transited relatively within the latent heat storage material inside the storage chamber 205. This enables the cooling equipment 230 according to the present example to obtain the effect the same as that of the cooling equipment 201 according to Example 1 described above.

EXAMPLE 5

Figure 43:
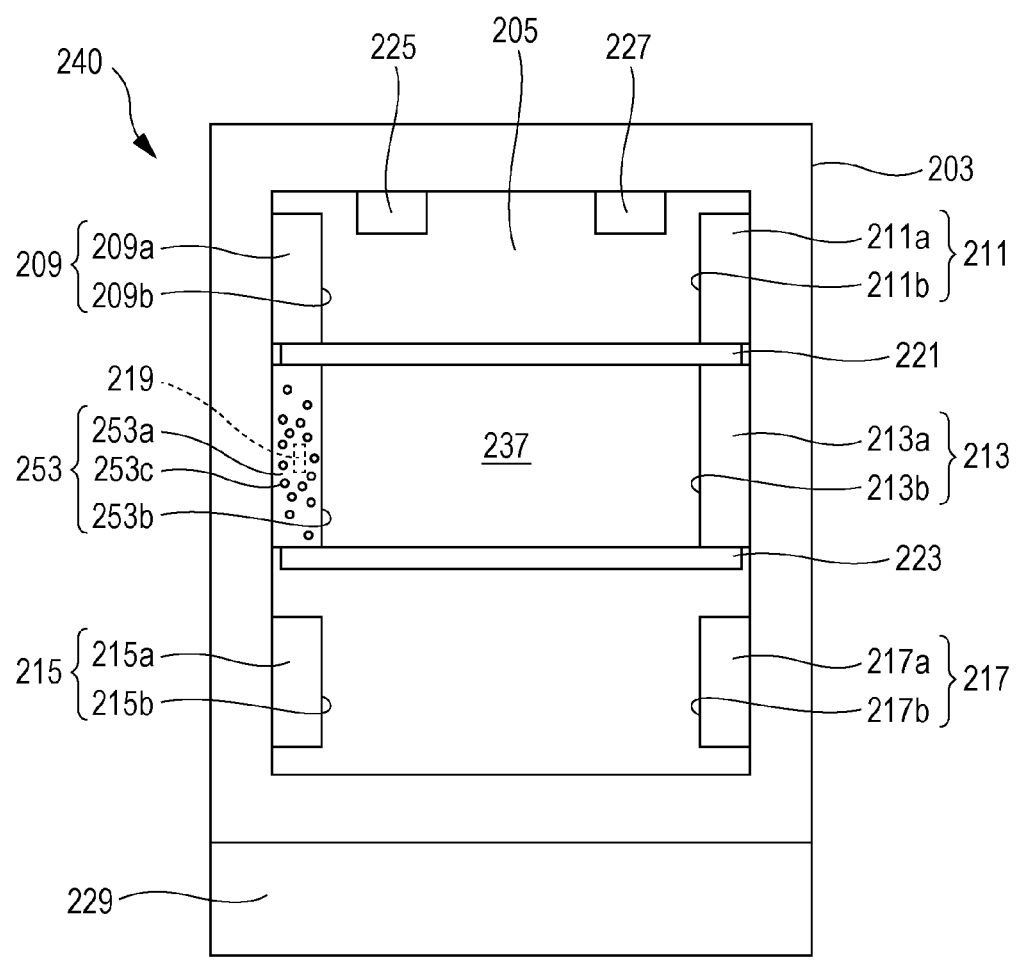
FIG. 43 is a front view illustrating a schematic configuration of cooling equipment 240 according to Example 5 of the tenth embodiment of the present invention.
Figure 44:
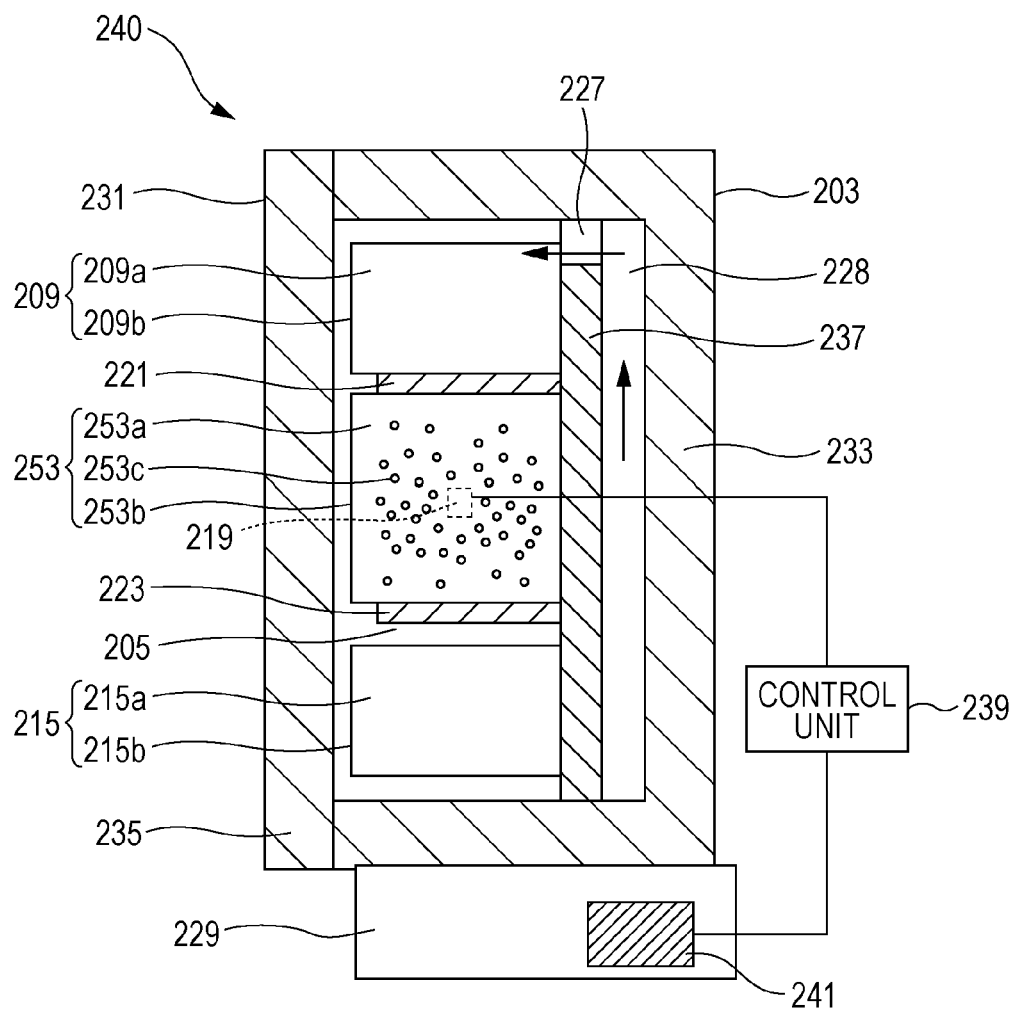
FIG. 44 is a cross-sectional view illustrating the schematic configuration of the cooling equipment 240 according to Example 5 of the tenth embodiment of the present invention.

Next, cooling equipment 240 according to Example 5 of the present embodiment will be described with reference to FIGS. 43 and 44. FIGS. 43 and 44 respectively correspond to FIGS. 33 and 34, and illustrate a schematic configuration of the cooling equipment 240 according to the present example. The same reference numerals are given to the same configuring elements having functions and operations which are the same as those of the cooling equipment 201 according to Example 1 described above, and the description thereof will be omitted.

As illustrated in FIGS. 43 and 44, the cooling equipment 240 has a temperature-control heat storage member 253 which is provided with a latent heat storage material 253a, a heat conductive filler 253c mixed into the latent heat storage material 253a and a container body 253b which seals the latent heat storage material 253a and the heat conductive filler 253c. Whereas the temperature-control heat storage member 253 has the heat conductive filler 253c, the temperature-maintaining heat storage members 209 to 217 have no heat conductive filler 253c. This causes a structure of the temperature-control heat storage member 253 to be different from a structure of the temperature-maintaining heat storage members 209 to 217. In the temperature-control heat storage member 253, mixing a small amount of the heat conductive filler 253c with the latent heat storage material 253a slightly decreases the latent heat quantity in the thickness direction. However, as compared to the temperature-maintaining heat storage members 209 to 217 having no heat conductive filler 253c, there is little difference in the latent heat quantity. It is desirable that a particle size of the heat conductive filler 253c be small to such an extent that the mixing of the heat conductive filler 253c does not cause non-uniformity of the temperature-control heat storage member 253. A range of the particle size of the heat conductive filler 253c is from a lower limit length which limits machining to an upper limit length which does not cause irregularities in the heat conduction. For example, it is desirable that the particle size of the heat conductive filler 253c be in the range of several μm to several hundred μm. In addition, there is a need that the heat conductivity of the heat conductive filler 253c is higher than the heat conductivity of the latent heat storage material 253a. The heat conductive filler 253c is small particles formed of aluminum for example and has several % of the latent heat storage material 253a mixed thereinside by volume ratio.

The latent heat storage material 253a is formed of a material the same as that of the latent heat storage materials 209a to 217a. The container body 253b has a shape of a rectangular box. The container body 253b is formed of a material the same as that of the container bodies 209b to 217b.

The temperature-control heat storage member 253 has the heat conductive filler 253c in a portion inside the container body 253b for example. In the portion having the heat conductive filler 253c, the heat conductivity is increased compared to the other portions. Therefore, in the latent heat storage material 253a in the vicinity of the heat conductive filler 253c, heat exchange is accelerated compared to the latent heat storage material 253a of the other portions so as to be phase-transited relatively earlier. Therefore, the cooling equipment 240 according to the present example is arranged by bringing the temperature sensor 219 into contact with the latent heat storage material 253a in the vicinity of the heat conductive filler 253c, thereby obtaining the effect the same as that of the cooling equipment 1 according to Example 1 described above. In addition, in the cooling equipment 240 according to the present example, the heat conductivity is increased in a portion of the temperature-control heat storage member 253. Therefore, the temperature-control heat storage member 253 is not necessarily formed to be relatively thin or formed to have a partial thin portion. The temperature-control heat storage member 253 can be formed to have the thickness which is substantially the same as that of the temperature-maintaining heat storage members 209 to 217.

In addition, in the present example, the heat conductive filler is mixed into the temperature-control heat storage member 253, but the present example is not limited thereto. For example, a fine particle additive material may be mixed into the temperature-control heat storage member 253 instead of the heat conductive filler. The fine particle additive material is formed of polyethylene for example which is intimate to the latent heat storage material 253a. It is desirable that the particle size of the fine particle additive material be several μm to several hundred μm and uniform. The fine particle additive material is mixed into the latent heat storage material 253a by volume ratio of approximately 20% of the latent heat storage material 253a for example. In the temperature-control heat storage member 253 having the fine particle additive material mixed, compared to the temperature-maintaining heat storage members 209 to 217, the heat conductivity is substantially the same as each other, but the latent heat quantity is decreased. Therefore, compared to the temperature-maintaining heat storage members 209 to 217, the temperature-control heat storage member 253 is melted earlier and frozen earlier. This enables the cooling equipment 240 provided with the temperature-control heat storage member 253 having the fine particle additive material to obtain the effect the same as that of the cooling equipment 201 according to Example 1 described above.

EXAMPLE 6

Figure 45:
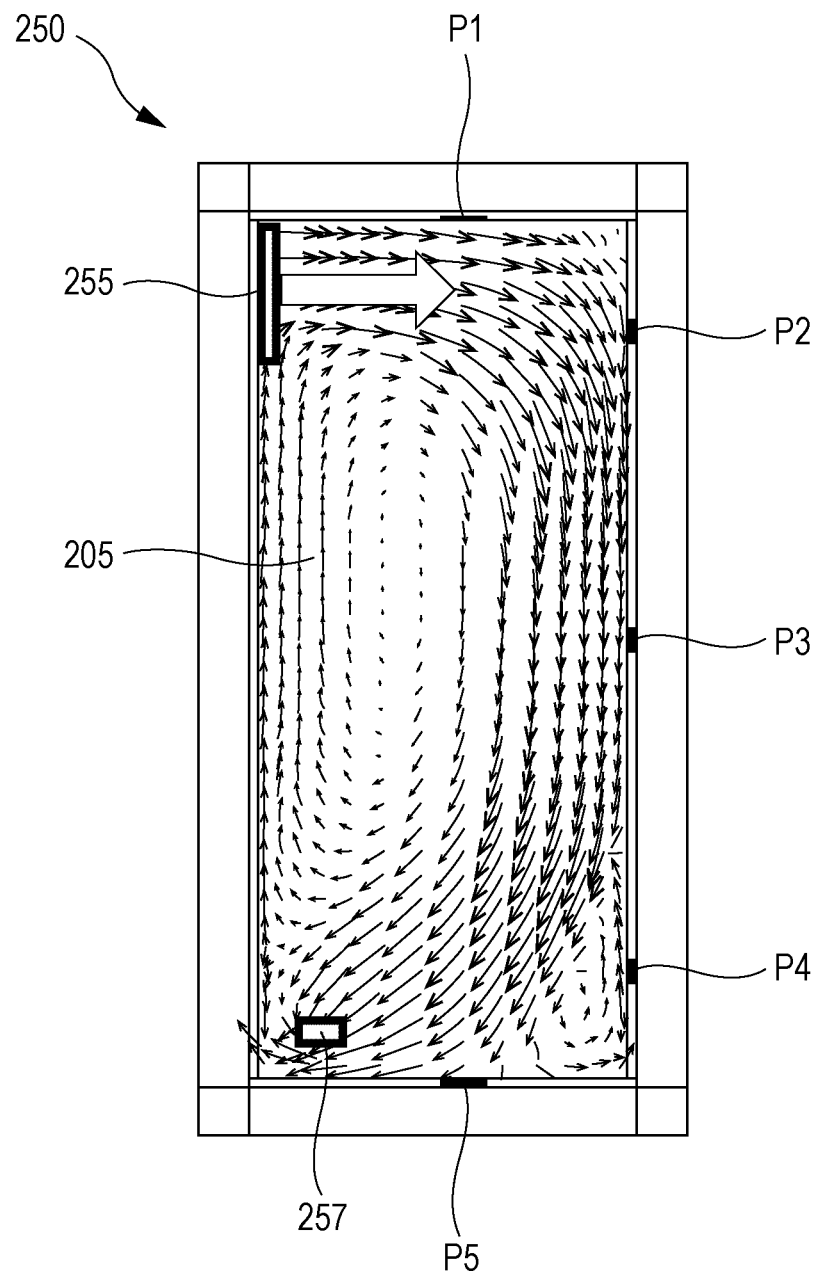
FIG. 45 schematically illustrates a schematic configuration of cooling equipment 250 according to Example 6 of the tenth embodiment of the present invention, the cooling equipment 250 being used in a simulation of a cooling state inside a storage chamber 205.

Next, cooling equipment 250 according to Example 6 of the present embodiment will be described with reference to FIGS. 45 to 47. The cooling equipment 250 according to the present example is characterized by an arrangement section inside the equipment for a temperature-control heat storage member. FIG. 45 schematically illustrates a schematic configuration of the cooling equipment 250 according to the present example by using a simulation of a state of cooling inside the storage chamber 205. As illustrated in FIG. 45, the cooling equipment 250 has a cold air port 255 which is disposed in an upper portion on a left side surface and through which the cold air blows, and a suction port 257 which is disposed in a lower portion on a front surface and sucks the cold air flowing in the storage chamber. A thick arrow illustrated in FIG. 45 indicates the cold air flowing into the storage chamber 205. In addition, measurement points P1 to P5 indicate the arrangement sections for the latent heat storage materials and indicate data acquisition sections on the temperature variation in the latent heat storage material. In addition, a plurality of thin arrows illustrated in FIG. 45 schematically indicates a convection state of the cold air inside the storage chamber 205.

The cold air is caused to blow into the storage chamber 205 toward an opposing surface which opposes a side surface having the cold air port 255 by a speed of 30 cm/sec. A temperature of the cold air is 0° C. The inside of the storage chamber 205 is cooled by the cold air for 20 hours and after finishing the cooling, the coldness is naturally radiated. FIGS. 46 and 47 are graphs illustrating a simulation result of the time variation in the temperature at the measurement points P1 to P5 which is obtained based on the above-described condition. FIG. 47(a) is a graph illustrating an enlarged portion of a cooling time illustrated by a double-headed arrow L15 in FIG. 46, and FIG. 47(b) is a graph illustrating an enlarged portion of a natural cooling time illustrated by a double-headed arrow L16 in FIG. 46. In FIGS. 46 and 47, the horizontal axis represents the elapsed time (h) from the cooling through the natural radiating of the coldness. The vertical axis represents the temperature (° C.) at the measurement points P1 to P5. In FIGS. 46 and 47, the curve C12 of the dashed line represents the time variation in the temperature at the measurement point P1 on the upper surface inside the storage chamber 205, the curve C13 of the dashed line represents the time variation in the temperature at the measurement point P2 in the upper portion on the side surface inside the storage chamber 205, the curve C14 of the dashed line represents the time variation in the temperature at the measurement point P3 in the middle portion on the side surface inside the storage chamber 205, the curve C15 of the solid line represents the time variation in the temperature at the measurement point P4 in the lower portion on the side surface inside the storage chamber 205, and the curve C16 of the solid line represents the time variation in the temperature at the measurement point P5 in the bottom surface inside the storage chamber 205.

Figure 46:
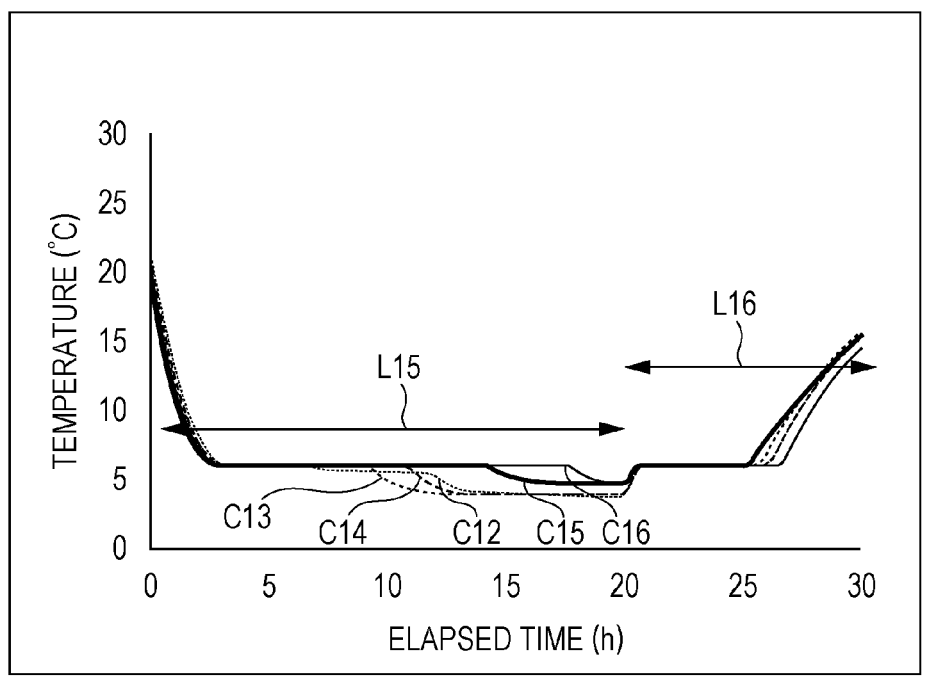
FIG. 46 is a graph illustrating a simulation result of a time variation in a temperature at measuring points P1 to P5 in the cooling equipment 250 according to Example 6 of the tenth embodiment of the present invention.

As illustrated in FIGS. 46 and 47(a), the temperature at the measurement point P1 corresponding to the curve C12 starts to fall most quickly, then the temperature at the measurement point P2 corresponding to the curve C13 starts to fall, then the temperature at the measurement point P3 corresponding to the curve C14 starts to fall, then the temperature at the measurement point P4 corresponding to the curve C15 starts to fall, and then the temperature at the measurement point P5 corresponding to the curve C16 starts to fall. In this manner, within the storage chamber 205, the latent heat storage material arranged in the sections with which the blowing cold air is likely to collide starts to be frozen first. The temperature at the measurement point P1 starts to fall most quickly, but falls in stages. Therefore, the time for reaching approximately 4° C. which is the lowest cooling temperature of the latent heat storage material is the shortest at the measurement point P2, then shorter at the measurement point P3 and then shorter at the measurement point P1.

As illustrated in FIGS. 46 and 47(b), the temperature at the measurement point P4 corresponding to the curve C15 starts to rise most quickly, then the temperature at the measurement point P2 corresponding to the curve C13 starts to rise, then the temperature at the measurement point P1 corresponding to the curve C12 starts to rise, then the temperature at the measurement point P3 corresponding to the curve C14 starts to rise, and then the temperature at the measurement point P5 corresponding to the curve C16 starts to rise. In this manner, the latent heat storage material arranged in the section where the heat is transferred in a plurality of directions like corners within the storage chamber 205 to cause large heat transfer starts to be melted.

It is desirable that the temperature-control heat storage member be likely to be frozen and melted relatively. Therefore, in the cooling equipment 250 according to the present example, the temperature-control heat storage member is arranged in the section which is likely to be frozen and melted relatively, that is, in the vicinity of the corners with which the cold air is likely to collide. In contrast, the temperature-maintaining heat storage members are arranged in the other sections. According to the configuration illustrated in FIG. 45, the temperature-control heat storage member is arranged at the measurement point P2. A structure of the temperature-control heat storage member may adopt any of the structures in Examples 1 to 5 for example. In addition, since the temperature-control heat storage member is arranged in the section which is likely to be frozen and melted relatively, the structure of the temperature-control heat storage member may be the same as the structure of the temperature-maintaining heat storage members. In addition, as the section which is likely to be frozen and melted relatively, the temperature-control heat storage member may be of course arranged in a section of large heat transfer, such as a packing disposed in an outer periphery of the door member in order to enhance sealability between the door member and the cooling equipment main body.

As described above, the cooling equipment 250 according to the present example has the temperature-control heat storage member in the section which is likely to be frozen and melted relatively. Therefore, it is possible to obtain the effect the same as that of the cooling equipment 201 according to Example 1 described above.

EXAMPLE 7

Figure 48:
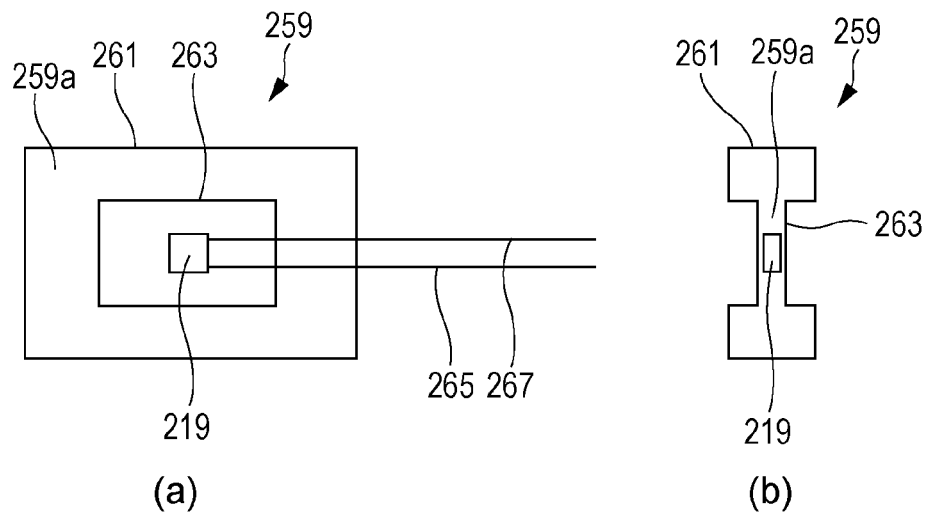
FIG. 48 illustrates a schematic configuration of a temperature-control heat storage member 259 which is used in cooling equipment according to Example 7 of the tenth embodiment of the present invention.

Next, cooling equipment 260 according to Example 7 of the present embodiment will be described with reference to FIGS. 48 to 50. A temperature-control heat storage member which can be used instead of the temperature-control heat storage members in Examples 1 to 6 will be described as the present example. FIG. 48 illustrates a configuration of a temperature-control heat storage member 259 which is used in the cooling equipment according to the present example. FIG. 48($a$) is a plan view and FIG. 48($b$) is a side cross-sectional view. The temperature-control heat storage member 259 is formed to have a different thickness depending on a region. The temperature-control heat storage member 259 has a thick portion 261 where an outside is thick and a thin portion 263 where an inside thereof is thin. The temperature sensor 219 is disposed inside the container body of the thin portion 263. In other words, in the temperature-control heat storage member 259, the thickness of the portion having the temperature sensor 219 is thinner than the thickness of other portions. The temperature sensor 219 detects the temperature of a portion which is likely to be melted and frozen relatively within the latent heat storage material 259$a$ inside the temperature-control heat storage member 259. Required wires 265 and 267 are connected to the temperature sensor 219. This enables the temperature-control heat storage member 259 to function as a temperature sensor integrated temperature-control heat storage member.

Figure 49:
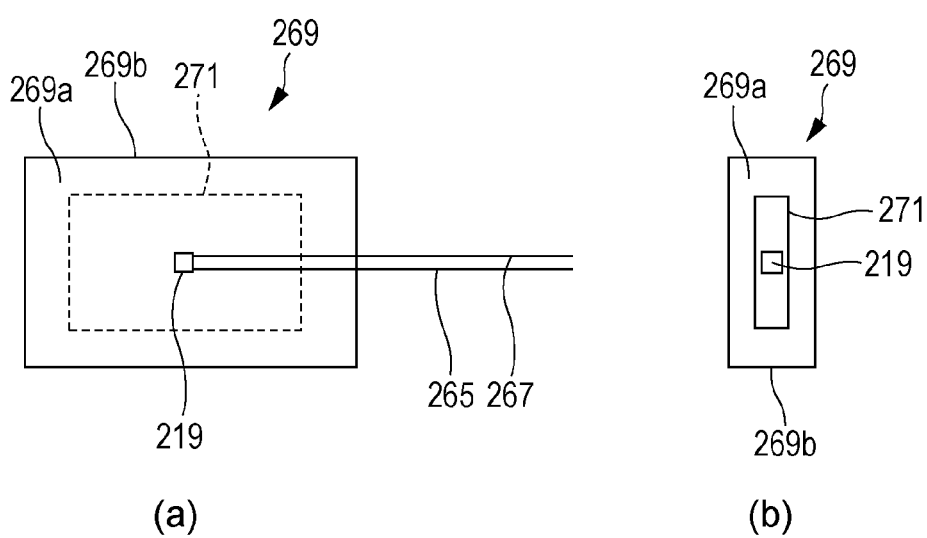
FIG. 49 illustrates a schematic configuration of a temperature-control heat storage member 269 which is used in cooling equipment according to a modification example of Example 7 of the tenth embodiment of the present invention.

FIG. 49 illustrates a configuration of a temperature-control heat storage member 269 according to a modification example of the present example. FIG. 49($a$) is a plan view and FIG. 49($b$) is a cross-sectional view. As illustrated in FIGS. 49($a$) and 49($b$), the temperature-control heat storage member 269 has a rectangular flat shape as a whole. The temperature-control heat storage member 269 has a hollow container body 269$b$ which is hermetically sealed and a latent heat storage material 269$a$ which fills the inside of the container body 269$b$. The temperature-control heat storage member 269 has a plate-shaped member 271 which is arranged in substantially a center portion inside the container body 269$b$. The plate-shaped member 271 has a rectangular flat plate shape as a whole. The plate-shaped member 271 is formed of a material having no latent heat in a control temperature range. For example, the plate-shaped member 271 is formed of aluminum or polyethylene. The temperature sensor 219 is arranged inside the plate-shaped member 271. The temperature sensor 219 is disposed in contact with the latent heat storage material 269$a$ via the plate-shaped member 271.

Figure 50:
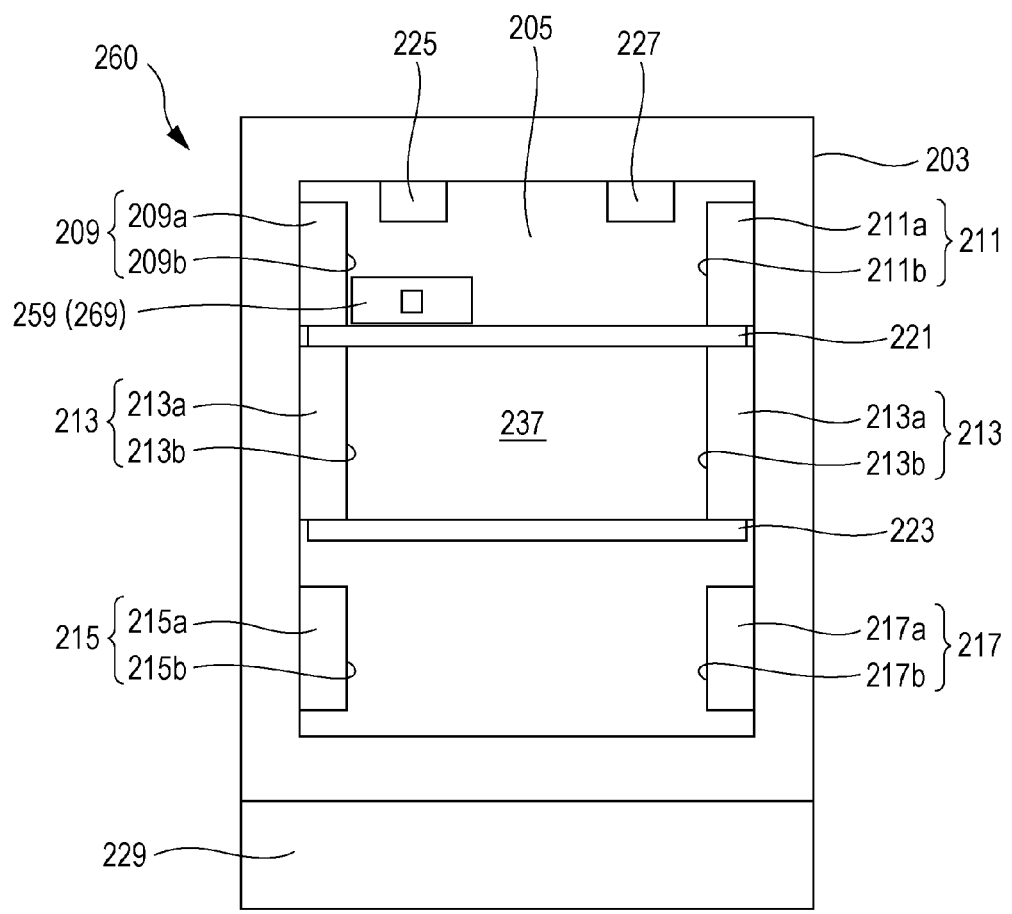
FIG. 50 is a front view illustrating a schematic configuration of cooling equipment 260 according to Example 7 of the tenth embodiment of the present invention.

FIG. 50 corresponds to FIG. 33 and illustrates a schematic configuration of the cooling equipment 260 according to the present example. The same reference numerals are given to the same configuring elements having functions and operations which are the same as those of the cooling equipment 201 according to Example 1 described above, and the description thereof will be omitted.

As illustrated in FIG. 50, the temperature-control heat storage member 259 or the temperature-control heat storage member 269 can be arranged in any place inside the storage chamber 205. In the present example, the temperature-control heat storage member 259 or the temperature-control heat storage member 269 is arranged in the upper space of the storage chamber 205 so as to be attachable and detachable. In the present example, the temperature-maintaining heat storage members 213 are respectively arranged on left and right side surfaces in the center space inside the storage chamber 205. In the present example, the temperature-control heat storage member 259 or the temperature-control heat storage member 269 is easily attached to the temperature sensor 219 inside the storage chamber 205 of the cooling equipment 260. When the temperature sensor 219 fails, it is easy to replace the temperature sensor 219. In addition, in the present example, it is not necessary to dispose the temperature sensor in the heat storage member fixed inside the storage chamber 205. Therefore, it is possible to simplify molding work for forming the heat storage member.

EXAMPLE 8

Figure 51:
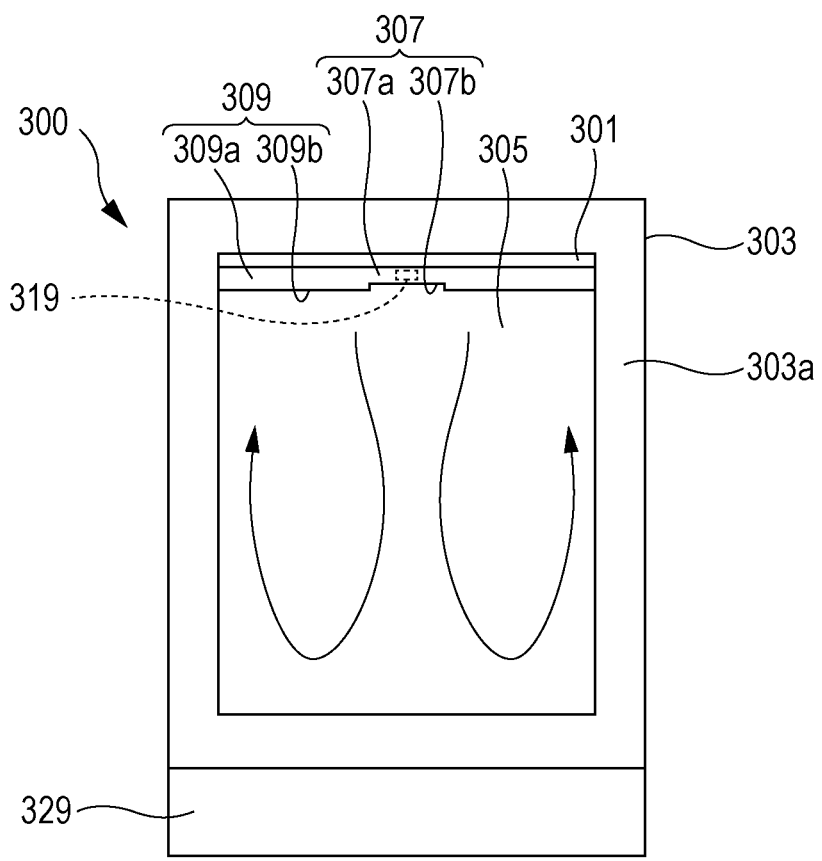
FIG. 51 is a front view illustrating a schematic configuration of cooling equipment 300 according to Example 8 of the tenth embodiment of the present invention.

Next, cooling equipment 300 according to Example 8 of the present embodiment will be described with reference to FIG. 51. In the above-described examples, the fan type (forced convection type) cooling equipment which cools the inside of the storage chamber by blowing the cold air into the storage chamber has been described as an example. However, the cooling equipment according to the present example is a direct cooling type (natural convection type) where the evaporator is arranged inside the storage chamber to cool the inside of the storage chamber by using natural convection. FIG. 51 is a front view illustrating a schematic configuration of the cooling equipment 300 according to the present example.

The cooling equipment 300 has a rectangular parallelepiped cooling equipment main body 303 which is high in a vertical direction when installed. FIG. 51 illustrates a state when observed from a front surface 303$a$ of the cooling equipment main body 303. A rectangular opening is disposed on the front surface 303$a$ of the cooling equipment main body 303. The rectangular opening is disposed as an open end, and a hollow box-shaped storage chamber 305 which stores storage goods is disposed inside the cooling equipment main body 303.

A door member made of resins for example is attached to be openable and closeable to a right side of the open end of the front surface 303$a$ via a hinge mechanism (not illustrated). The door member has a rectangular flat plate shape including a region which covers the rectangular opening of the storage chamber 305 in a state where the door member is closed. In addition, a door packing (not illustrated) for ensuring sealability of the storage chamber 305 when the door is closed is arranged on a side surface of the door member which opposes an outer periphery including the opening of the storage chamber 305.

In addition, the cooling equipment 300 has a compressor (not illustrated) which configures a vapor compression type refrigerating cycle for cooling the inside of the storage chamber 205 and compresses refrigerant. The compressor is disposed in a space unit 329 disposed in the lower portion of the cooling equipment main body 303. Although not illustrated, in addition to the compressor, the refrigerating cycle is configured to have at least a condenser which condenses the refrigerant compressed in the compressor and radiates the heat outward, an expansion unit which expands the condensed refrigerant (for example, a capillary tube) and an evaporator which vaporizes the expanded refrigerant and cools the inside of the storage chamber 305 by using vaporization heat.

A cooling plate 301 as the evaporator is arranged in the upper portion inside the storage chamber 305 of the cooling equipment main body 303. The cooling plate 301 has a flat plate-shaped front surface and rear surface which are arranged opposing each other by interposing an evaporation mechanism (not illustrated) vaporizing the refrigerant thereinside. The front surface of the cooling plate 301 faces the inside of the storage chamber 305 and is in contact with a temperature-control heat storage member 307 (details to be described later) and a temperature-maintaining heat storage member 309 (details to be described later). The rear surface of the cooling plate 301 faces the cooling equipment main body 303 and is in contact with the cooling equipment main body 303.

In the present example, the temperature-control heat storage member 307 and the temperature-maintaining heat storage member 309 are formed integrally with each other. The temperature-maintaining heat storage member 309 is arranged in both sides of the temperature-control heat storage member 307. The temperature-maintaining heat storage member 309 has a latent heat storage material 309a and a container body 309b which seals the latent heat storage material 309a. The latent heat storage material 309a is formed of a material the same as that of the latent heat storage material 207a in Example 1 described above. The container body 309b is formed of a material the same as that of the container body 207b in Example 1 described above.

The temperature-control heat storage member 307 has a latent heat storage material 307a and a container body 307b which seals the latent heat storage material 307a. The latent heat storage material 307a is formed of a material the same as that of the latent heat storage material 207a in Example 1 described above. The container body 307b is formed of a material the same as that of the container body 207b in Example 1 described above.

The temperature-control heat storage member 307 is formed to have the thickness thinner than that of the temperature-maintaining heat storage member 309. In addition, the temperature-control heat storage member 307 is arranged by being interposed between the temperature-maintaining heat storage members 309. Therefore, an entire shape of the temperature-control heat storage member 307 and the temperature-maintaining heat storage members 309 which are integrated with each other has a recess shape in a cross-sectional view where a portion having the temperature-control heat storage member 307 is a recess.

A temperature sensor 319 for controlling the compressor is disposed in contact with the latent heat storage material 307a of the temperature-control heat storage member 307. In addition, an average thickness of the temperature-control heat storage member 307 having the temperature sensor 319 is thinner than an average thickness of the temperature-maintaining heat storage members 309. Therefore, the temperature sensor 319 detects the temperature of the portion which is likely to be melted and frozen relatively within the latent heat storage material inside the storage chamber 305. This enables the cooling equipment 300 according to the present example to realize the temperature control the same as that of the cooling equipment 201 according to Example 1 described above.

The entire the front surface of the cooling plate 301 is almost covered with the temperature-control heat storage member 307 and the temperature-maintaining heat storage members 309. Therefore, the coldness from the cooling plate 301 is introduced into the storage chamber 305 via the temperature-control heat storage member 307 and the temperature-maintaining heat storage members 309. In this manner, the cooling equipment 300 according to the present example performs indirect cooling via the temperature-control heat storage member 307 and the temperature-maintaining heat storage members 309. The air flow generated inside the storage chamber 305 of the cooling equipment 300 according to the present example flows downward from the center of the upper portion of the storage chamber 305 and rises along the side wall inside the storage chamber 305 as illustrated by the curved arrow in the drawing. The coldness from the temperature-control heat storage member 307 and the temperature-maintaining heat storage members 309 rides on this natural convection to be circulated inside the storage chamber 305, and thus the inside of the storage chamber 305 is cooled.

The temperature-maintaining heat storage members 309 are arranged over a wide range of the front surface of the cooling plate 301 compared to the temperature-control heat storage member 307. The temperature-maintaining heat storage members 309 are always in two phases (solid and liquid phases). Therefore, the inside of the storage chamber 305 in which the upper portion is covered with the temperature-control heat storage member 307 and the temperature-maintaining heat storage members 309 has the temperature which is substantially the same as the phase change temperature of the temperature-maintaining heat storage members 309. This enables the cooling equipment 300 according to the present example to have the effect the same as that of the cooling equipment 201 according to Example 1 described above. Furthermore, since the cooling equipment 300 according to the present example is the direct cooling type, there is no possibility of supplying the cold air into the storage chamber 305 unlike the fan type. Therefore, the cooling equipment 300 can obtain an effect that the temperature inside the storage chamber 305 is not influenced by the temperature of the cold air.

In addition, the cooling equipment 300 performs the temperature control the same as that of the cooling equipment 201 according to Example 1 at the section where the temperature-control heat storage member 307 and the cooling plate 301 are combined with each other. Accordingly, it is possible to achieve a state the same as a state where a cooling plate having a constant temperature is always provided. In this manner, it is not necessary for the cooling equipment 300 to provide a complicated control mechanism to maintain a constant temperature inside the storage chamber 305, thereby achieving the cost saving.

EXAMPLE 9

Figure 52:
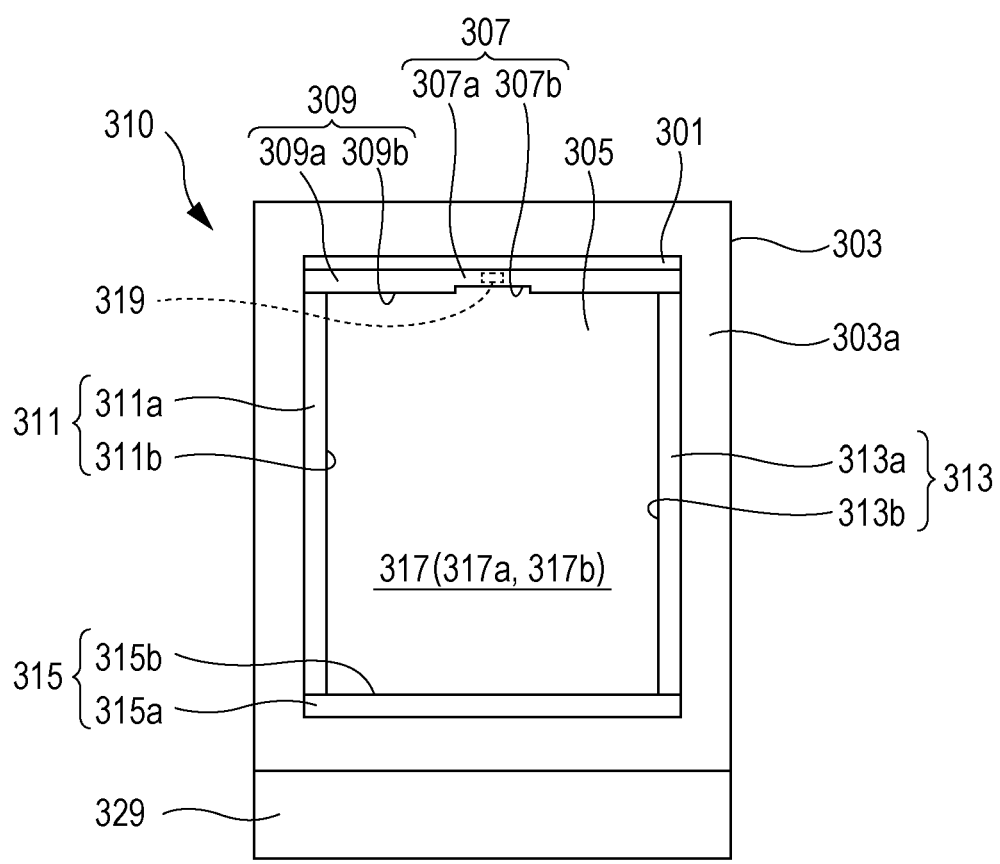
FIG. 52 is a front view illustrating a schematic configuration of cooling equipment 300 according to Example 9 of the tenth embodiment of the present invention.

Next, cooling equipment 310 according to Example 9 of the present embodiment will be described with reference to FIG. 52. In the Example 8 described above, whereas the temperature-maintaining heat storage member is arranged only in the upper portion inside the storage chamber 305, the cooling equipment 310 according to the present example is characterized in that the temperature-maintaining heat storage members are also arranged in both side portions, a rear surface portion, a bottom portion and a door member in the storage chamber 305. FIG. 52 is a front view illustrating a schematic configuration of the cooling equipment 310 according to the present example.

As illustrated in FIG. 52, the cooling equipment 310 according to the present example has a temperature-maintaining heat storage member 311 which is disposed on substantially the entire surface of the left side portion when viewed from the front surface 303a side of the cooling equipment main body 303, a temperature-maintaining heat storage member 313 which is disposed on substantially the entire surface of the right side portion, a temperature-maintaining heat storage member 315 which is disposed on substantially the entire surface of the bottom portion, a temperature-maintaining heat storage member 317 which is disposed on substantially the entire surface of the rear surface portion, and a temperature-maintaining heat storage member (not illustrated) which is disposed on substantially the entire surface of the storage chamber 305 side of the door member (not illustrated).

The temperature-maintaining heat storage members 311, 313, 315, and 317 respectively have latent heat storage materials 311a, 313a, 315a, and 317a, and container bodies 311b, 313b, 315b, and 317b which respectively seal the latent heat storage materials 311a, 313a, 315a, and 317a. The latent heat storage materials 311a, 313a, 315a, and 317a are respectively formed of a material the same as that of the latent heat storage material 207a in Example 1 described above. The container bodies 311b, 313b, 315b, and 317b are respectively formed of a material the same as that of the container body 207b in Example 1 described above. In addition, the temperature-maintaining heat storage member disposed in the door member has a latent heat storage material (not illustrated) formed of a material the same as that of the latent heat storage material 207a in Example 1 described above, and a container body (not illustrated) formed of a material the same as that of the container body 207b in Example 1 described above.

The average thickness of the temperature-maintaining heat storage members 311, 313, 315, and 317 and the temperature-maintaining heat storage member disposed in the door member is formed to be thicker than the average thickness of the temperature-control heat storage member 307. Therefore, the temperature-maintaining heat storage members 309, 311, 313, 315, and 317 and the temperature-maintaining heat storage member disposed in the door member are always in two phases (solid and liquid phases) in an operation state where the compressor (not illustrated) is normally controlled. Therefore, the inside of the storage chamber 305 the periphery of which is covered with the temperature-maintaining heat storage members 309, 311, 313, 315, and 317, the temperature-maintaining heat storage member disposed in the door member and the temperature-control heat storage member 307 has substantially the same temperature as the phase change temperature of these temperature-maintaining heat storage members. This enables the cooling equipment 310 according to the present example to have the effect the same as that of the cooling equipment 300 according to Example 8 described above. Furthermore, substantially the entire periphery of the storage chamber 305 is surrounded by the temperature-maintaining heat storage members 311, 313, 315, and 317, the temperature-maintaining heat storage member disposed in the door member. Therefore, the cooling equipment 310 according to the present example can obtain an effect that the temperature inside the equipment can be more uniformly maintained.

In Examples 1 to 9, the temperature sensor which detects the temperature of the temperature-control heat storage member has been described as an example. However, in order to detect a state of the temperature-control heat storage member without being limited to the temperature only, a sensor can be used which detects various states such as the volume change, the mechanical strength or the optical characteristics of the latent heat storage material. Even by using the sensor which detects these various states, it is possible to accurately detect the state of the phase change in the latent heat storage material and to very accurately control the temperature inside the cooling equipment.

EXAMPLE 10

Figure 53:
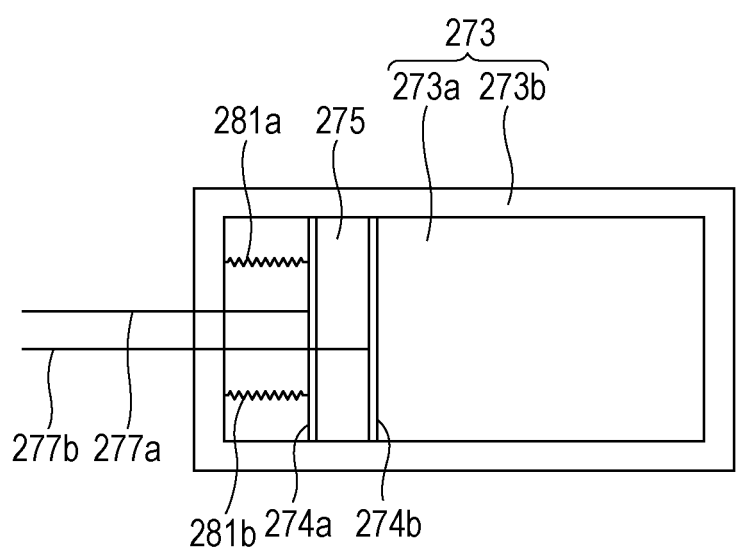
FIG. 53 illustrates a schematic configuration of a temperature-control heat storage member 273 which is used in cooling equipment according to Example 10 of the tenth embodiment of the present invention.

Cooling equipment according to Example 10 of the present embodiment will be described with reference to FIG. 53. The cooling equipment according to the present example is characterized in that the cooling equipment detects a state of the latent heat storage material based on a volume change. With regard to the volume change, a volume is contracted when a gel state (liquid phase) is changed to a solid state (solid phase). Accordingly, strain occurring when the volume is contracted is observed by using piezoelectric elements, strain gauges (resistance change), eddy currents, or the like. A member of the sensor portion may be softened so as to easily receive influence of the volume contraction. FIG. 53 illustrates a configuration of the temperature-control heat storage member 273 used in the cooling equipment according to the present example. The temperature-control heat storage member 273 has a rectangular flat plate shape as a whole. The temperature-control heat storage member 273 has a hollow container body 273b which is hermetically sealed. The temperature-control heat storage member 273 has a pair of electrodes 274a and 274b and a piezoelectric element 275 which is interposed between the pair of electrodes 274a and 274b disposed inside the container body 273b. A space between one side surface of the container body 273b and the electrode 274b is filled with a latent heat material 273a. In addition, two spring members 281a and 281b are disposed between an opposing side surface of the container body 273b which opposes the one side surface and the electrode 274a. A wire 277a is connected to the electrode 274a and a wire 277b is connected to the electrode 274b. The temperature-control heat storage member 273 is formed to be smaller than the temperature-maintaining heat storage member arranged in the cooling equipment. In this manner, the latent heat quantity which can be stored in the temperature-control heat storage member 273 is smaller than the latent heat quantity which can be stored in the temperature-maintaining heat storage member. In this manner, as compared to the temperature-maintaining heat storage member, the temperature-control heat storage member 273 is likely to be frozen and melted. In addition, since the temperature-control heat storage member 273 has the piezoelectric element 275 or the like, the temperature-control heat storage member 273 has a structure different from that of the temperature-maintaining heat storage member having no piezoelectric element or the like.

The piezoelectric element 275 receives a force from the latent heat storage material 273a and the spring members 281a and 281b and thus the strain occurs. This causes the piezoelectric element 275 to generate a positive charge in the electrode 274a side for example and to generate a negative charge in the electrode 274b side. Therefore, a voltage based generated charge is generated between the wires 277a and 277b via the electrodes 274a and 274b. If the latent heat storage material 273a is in a frozen state, the volume is contracted compared to a melted state. Therefore, the force applied to the piezoelectric element 275 by the latent heat storage material 273a is decreased in the frozen state compared to the melted state. If the force applied to the piezoelectric element 275 is decreased, an amount of the generated charges is decreased. Accordingly, the voltage generated between the wires 277a and 277b is further lowered in the frozen state than the latent heat storage material 273a in the melted state. Therefore, it is possible to understand a state of the latent heat storage material 273a by detecting the voltage generated between the wires 277a and 277b. This enables the cooling equipment using the temperature-control heat storage member 273 of the present example to have the effect the same as that of the cooling equipment according to Examples 1 to 7 described above. In addition, without examining a volume change in the heat storage member of the entire system, it is possible to understand a state of the phase transition in the heat storage member of the system.

EXAMPLE 11

Figure 54:
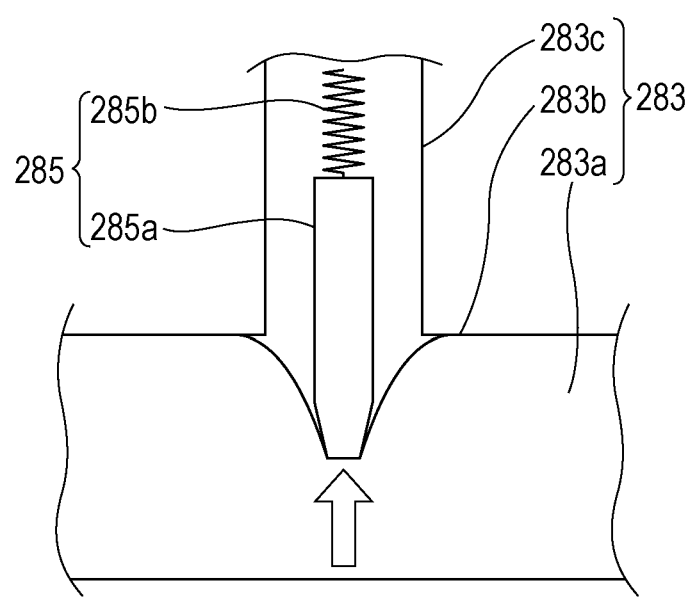
FIG. 54 is an enlarged view illustrating a schematic configuration of a portion of a temperature-control heat storage member 283 which is used in cooling equipment according to Example 11 of the tenth embodiment of the present invention.

Next, cooling equipment according to Example 11 of the present embodiment will be described with reference to FIG. 54. The cooling equipment according to the present example is characterized in that the cooling equipment detects a state of the latent heat storage material based on mechanical strength. With regard to the mechanical strength, the gel state (liquid phase) is softer than the solid state. Accordingly, a needle vertically moving at a constant interval is brought into contact with the latent heat storage material and a magnitude of stress applied to the needle is observed so that a state of the latent heat storage material is determined. FIG. 54 illustrates an enlarged portion of a temperature-control heat storage member 283 used in the cooling equipment according to the present example. As illustrated in FIG. 54, similar to the temperature-control heat storage member 207 in Example 1 described above for example, the temperature-control heat storage member 283 has a rectangular flat plate shape as a whole. The temperature-control heat storage member 283 has a latent heat storage material 283a, a container body 283b filled with the latent heat storage material 283a, a sensor arrangement portion 283c formed to protrude from the container body 283b. The latent heat storage material 283a has a surface covered with a flexible film (not illustrated) in order to avoid direct contact with a pressing needle 285a (to be described later). The latent heat storage material 283a may not be covered with the film. For example, the sensor arrangement portion 283c has a cylindrical shape and is formed integrally with the container body 283b. An inner space of the sensor arrangement portion 283c communicates with an inner space of the container body 283b. The container body 283b and the sensor arrangement portion 283c are formed of a material the same as that of the container body 207b of Example 1 described above. In addition, the latent heat storage material 283a is formed of a material the same as that of the latent heat storage material 207a of Example 1 described above.

A mechanical strength sensor 285 is arranged inside the sensor arrangement portion 283c. The mechanical strength sensor 285 is disposed such that one end portion comes into contact with the film, and has the pressing needle 285a pressing down the latent heat storage material 283a and a spring member 285b disposed in the other end portion of the pressing needle 285a. A control unit (not illustrated) and the spring member 285b cause the pressing needle 285a to apply a constant pressure to the latent heat storage material 283a while moving vertically in a constant interval. If the pressing needle 285a presses down the latent heat storage material 283a, as illustrated by a thick arrow in FIG. 54, the pressing needle 285a receives a repulsive force from the latent heat storage material 283a. The repulsive force varies depending on a state of the latent heat storage material 283a, is relatively strong in a frozen state and is relatively weak in a melted state. Therefore, based on the repulsive force from the latent heat storage material 283a which is detected by the mechanical strength sensor 285, a control unit 239 (not illustrated in FIG. 54) can determine whether the latent heat storage material 283a is in a completely frozen state or in a completely melted state. The temperature-control heat storage member 283 is formed to have the thickness thinner than that of the temperature-maintaining heat storage members 209 to 217 (not illustrated in FIG. 54), and is formed to be likely to be frozen and melted. Therefore, the cooling equipment according to the present example can obtain the effect the same as that of the cooling equipment 201 according to Example 1 described above.

EXAMPLE 12

Figure 55:
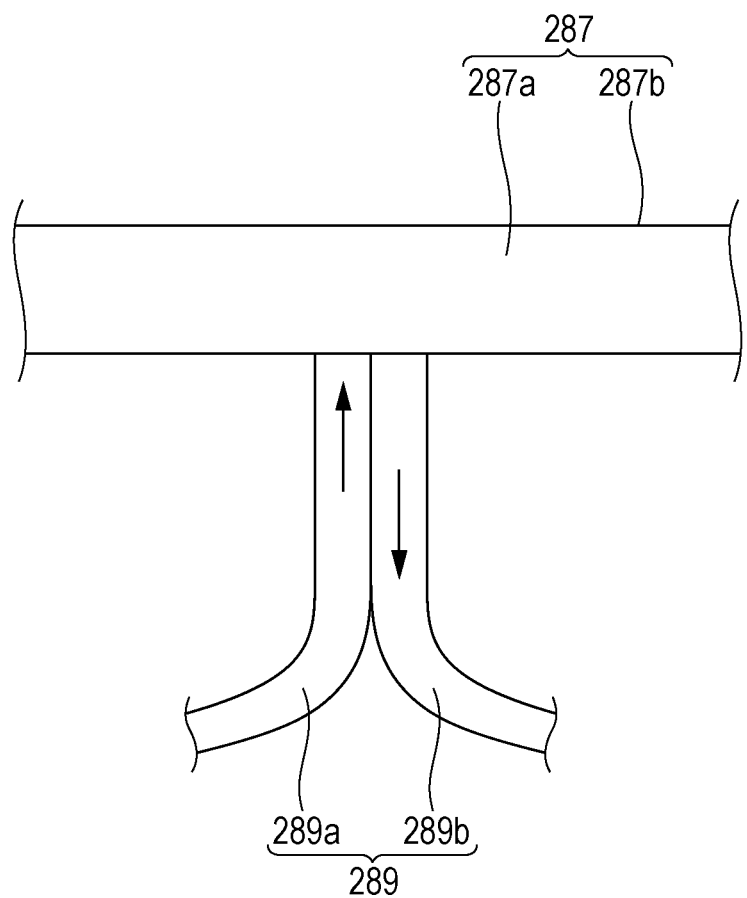
FIG. 55 is an enlarged view illustrating a schematic configuration of a portion of a temperature-control heat storage member 289 which is used in cooling equipment according to Example 12 of the tenth embodiment of the present invention.

Next, cooling equipment according to Example 12 of the present embodiment will be described with reference to FIG. 55. The cooling equipment according to the present example is characterized in that the cooling equipment detects a state of the latent heat storage material based on optical characteristics. With regard to the optical characteristics, the optical characteristics such as refractive index, reflectance and transmittance vary between the gel state (liquid phase) and the solid state (solid phase). Accordingly, light is transmitted to the latent heat storage material and the reflected light or transmitted light is observed so that the state of the heat storage material is determined. FIG. 55 illustrates an enlarged portion of the temperature-control heat storage member 287 used in the cooling equipment according to the present example. As illustrated in FIG. 55, similar to the temperature-control heat storage member 207 in Example 1 described above for example, the temperature-control heat storage member 287 has a rectangular flat plate shape as a whole. The temperature-control heat storage member 287 has a latent heat storage material 287a, and a container body 287b sealed with the latent heat storage material 287a. The latent heat storage material 287a is formed of a material the same as that of the latent heat storage material 207a of Example 1 described above. In addition, the container body 287b is formed of a material the same as that of the container body 207b of Example 1 described above.

The cooling equipment according to the present example has a sensor 289 which detects the reflected light of the latent heat storage material 287a. The sensor 289 has an optical fiber 289a which conducts light incident on the latent heat storage material 287a and an optical fiber 289b which conducts reflected light reflected on the latent heat storage material 287a. Solid lines in FIG. 55 represent a travelling direction of the light. A light source (not illustrated) is connected to a light input end of the optical fiber 289a and a light output end is in contact with the container body 287b of the temperature-control heat storage member 287. The light input end of the optical fiber 289b is in contact with the container body 287b of the temperature-control heat storage member 287 and a photoelectric detector (not illustrated) is connected to the light output end. The light emitted from the light source passes through the optical fiber 289a and is reflected on the latent heat storage material 287a. The reflected light reflected on the latent heat storage material 287a passes through the optical fiber 289b, is input to the photoelectric detector and light intensity of the reflected light is detected. The reflectance of the latent heat storage material 287a is different between a frozen state and a melted state. Therefore, based on the light intensity of the reflected light from the latent heat storage material 287a which is detected by the photoelectric detector, it is possible to determine whether the latent heat storage material 287a is in a complete frozen state or in a completely melted state. The temperature-control heat storage member 287 is formed to have the thickness thinner than that of the temperature-maintaining heat storage members 209 to 217 (not illustrated in FIG. 54), and is formed to be likely to be frozen and melted. Therefore, the cooling equipment according to the present example can obtain the effect the same as that of the cooling equipment 201 according to Example 1 described above.

Figure 56:
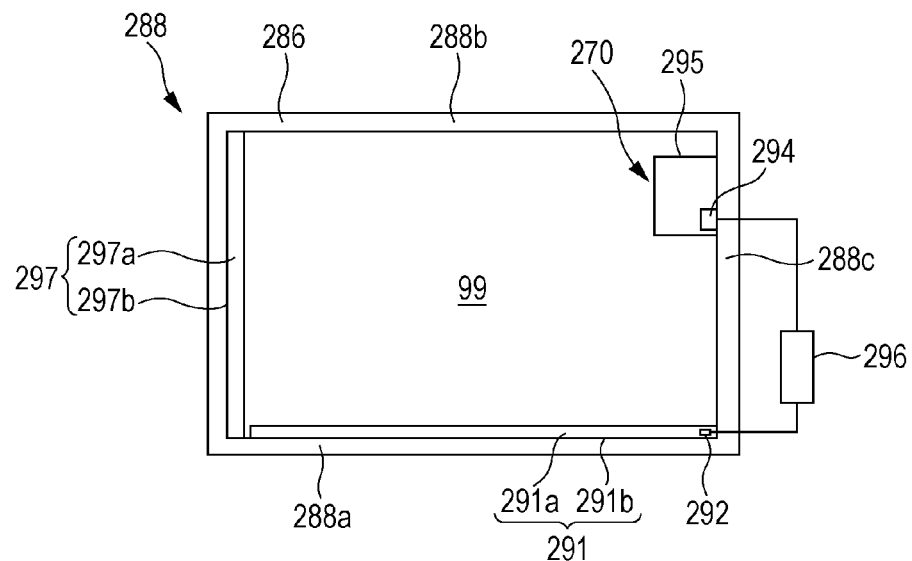
FIG. 56 illustrates a schematic configuration of an air conditioner according to the tenth embodiment of the present invention.

Next, an air conditioner according to the present embodiment will be described with reference to FIG. 56. FIG. 56 schematically illustrates a cross-section of a schematic configuration of a building 288 to which an air conditioner 270 according to the present embodiment is attached. As illustrated in FIG. 56, the air conditioner 270 according to the present embodiment is provided in the building 288 which is disposed to surround a living space 299 and has a temperature-maintaining heat storage member 297 which maintains a room temperature in the living space 299. The air conditioner 270 has a latent heat storage material 291a which is reversibly phase-transited between the solid phase and the liquid phase and is phase-transited earlier than a latent heat storage material 297a provided in the temperature-maintaining heat storage member 297. The air conditioner 270 further has a temperature-control heat storage member 291 which is disposed inside the living space 299 and used in controlling the temperature inside the living space 299, a temperature sensor 292 which detects a state (temperature in the present example) of the temperature-control heat storage member 291, a compressor 296 configuring the refrigerating cycle for cooling the inside of the living space 299 for example, and a control unit 294 which controls the compressor 296 based on the state of the temperature-control heat storage member 291. An indoor unit 295 of the air conditioner 270 is attached to an upper portion on a right side wall of the building 288. The air conditioner 270 blows cold air or warm air toward the living space 299 of the building 288.

The compressor 296 is disposed outside of the building 288. Although not illustrated, the refrigerating cycle is configured to have at least a condenser which condenses refrigerant compressed in the compressor 296 and radiates heat outward, an expansion unit which expands the condensed refrigerant (for example, a capillary tube) and an evaporator which vaporizes the expanded refrigerant and cools the inside of the living space 299 by using vaporization heat, in addition to the compressor 296. The compressor 296 and the condenser are provided in an outdoor unit disposed outside. The evaporator is provided in the indoor unit 295 disposed inside the living space 299.

The living space 299 is a hollow area surrounded by a floor plate 288a, a ceiling plate 288b and a circumferential side wall 288c. The floor plate 288a, the ceiling plate 288b and the circumferential side wall 288c have an insulator 286 which insulates the living space 299 so as not to receive the heat from outside.

The side wall 288c has the temperature-maintaining heat storage member 297. FIG. 56 illustrates only the temperature-maintaining heat storage member 297 provided on the side wall 288c opposing the side wall 288c to which the indoor unit 295 is attached. However, the temperature-maintaining heat storage member 297 is provided in the entire sidewall 288c surrounding the living space 299. In addition, the temperature-maintaining heat storage member 297 may be provided in the ceiling plate 288b. The temperature-maintaining heat storage member 297 has a latent heat storage material 297a which is reversibly phase-transited between the solid phase and the liquid phase and a container body 297b which seals the latent heat storage material 297a.

The container body 297b has a shape of a thin box made of resins such as ABS or polycarbonate, and has a predetermined rigidity. When the latent heat storage material is flammable, it is desirable to form the container body 297b by using a flame-retardant material. In addition, when using paraffin as the latent heat storage material, it is desirable that the container body have a gas barrier property since paraffin is a volatile organic compound (VOC) depending on types.

The temperature-maintaining heat storage member 297 is generally used in a predetermined working temperature range and working pressure range. The temperature-maintaining heat storage member 297 of the present example is cooled inside the living space 299 so as to store coldness when the compressor 296 of the air conditioner 270 is operated, and radiates the coldness so as to suppress the temperature rising inside the living space 299 when the compressor 296 is stopped. In this case, the working temperature range of the temperature-maintaining heat storage member 297 includes a temperature inside the living space 299 during a normal operation. In addition, the working pressure of the temperature-maintaining heat storage member 297 is an atmospheric pressure for example.

The latent heat storage material 297a included in the temperature-maintaining heat storage member 297 has a phase change temperature (melting point) which reversibly causes a phase change between the solid phase and the liquid phase within the working temperature range of the temperature-maintaining heat storage member 297. The latent heat storage material 297a of the present embodiment always maintains a state of two phases (solid and liquid phases) when the air conditioner 270 is in a normal operation state (operation state where the compressor 296 is normally controlled). The latent heat storage material 297a contains paraffin. In the present embodiment, it is desirable that the phase change temperature which causes the latent heat storage material 297a to be reversibly phase-transited between the solid phase and the liquid phase be approximately 25° C. which is an optimum living temperature. The latent heat storage material 297a contains a gelling agent for gelling (solidifying) paraffin.

The temperature-control heat storage member 291 disposed in the floor plate 288a has a latent heat storage material 291a which is reversibly phase-transited between the solid phase and the liquid phase and a container body 291b which seals the latent heat storage material 291a. The temperature-control heat storage member 291 is provided on substantially the entire surface of the floor plate 288a. The temperature-control heat storage member 291 is used in controlling the temperature inside the living space 299. The temperature-control heat storage member 291 has a structure different from that of the temperature-maintaining heat storage member 297. In the present example, the thickness of the temperature-control heat storage member 291 is formed to be thinner than the thickness of the temperature-maintaining heat storage member 297. The latent heat storage material 291a is likely to be frozen and melted compared to the latent heat storage material 297a. In addition, the structure of the temperature-control heat storage member 291 is different from the structure of the temperature-maintaining heat storage member 297. The average thickness of the temperature-control heat storage member 291 is formed to be thinner than the average thickness of the temperature-maintaining heat storage member 297. In this manner, in the present embodiment, the heat storage member disposed inside the living space 299 is formed to have the different thickness depending on a region. The temperature-control heat storage member 291, when maintaining the phase change temperature, also functions as the heat storage member for maintaining the temperature inside the living space 299.

Since the latent heat storage material 291a is formed of the forming material the same as that of the latent heat storage material 297a, the detailed description will be omitted. In addition, since the container body 291b is formed of the forming material the same as that of the container body 297b, the detailed description will be omitted.

The air conditioner 270 has a temperature sensor 292 which detects a state of the temperature-control heat storage member 291. The temperature sensor 292 is used in controlling the compressor 296. The temperature sensor 292 is disposed in the vicinity of the temperature-control heat storage member 291 which has the thinner thickness compared to the temperature-maintaining heat storage member 297. In the present embodiment, the temperature sensor 292 is disposed inside the container body 291b of the temperature-control heat storage member 291 so as to be in direct contact with the latent heat storage material 291a provided in the temperature-control heat storage member 291. As described above with reference to FIGS. 29 to 32, the thin latent heat storage material is likely to be melted and frozen compared to the thick latent heat storage material. Therefore, the temperature sensor 292 detects the temperature of the portion which is likely to be melted and frozen relatively within the latent heat storage materials 291a and 297a inside the living space 299.

In addition, the control unit 294 provided in the indoor unit 295 of the air conditioner 270 is configured to include a CPU, a ROM, a RAM, input and output ports and to control the entire air conditioner 270. The temperature sensor 292 is connected to the input port of the control unit 294. The control unit 294 controls the compressor 296 based on a temperature signal input from the temperature sensor 292. The control unit 294 starts the compressor 296 when determining that the temperature of the latent heat storage material 291a of the temperature-control heat storage member 291 which is likely to be melted and frozen relatively is higher than the phase change temperature (melting point), based on the input temperature signal. In this manner, the refrigerating cycle is operated to lower the temperature inside the living space 299. In addition, the control unit 294 stops the compressor 296 when determining that the temperature of the latent heat storage material 291a is lower than the phase change temperature, based on the input temperature signal. The latent heat storage material 297a of the temperature-maintaining heat storage member 297 can maintain the phase change temperature and can maintain the state of two phases (solid and liquid phases) during the normal operation of the compressor 296. In this manner, the air conditioner 270 can easily and accurately maintain a substantially constant temperature of the living space 299. In particular, when there is a need for strict temperature management in a clean room or a food storage warehouse, the air conditioner 270 provides more improved effect. In addition, since variations in the temperature are decreased, cooling loss is reduced, thereby leading to energy saving.

Figure 57:
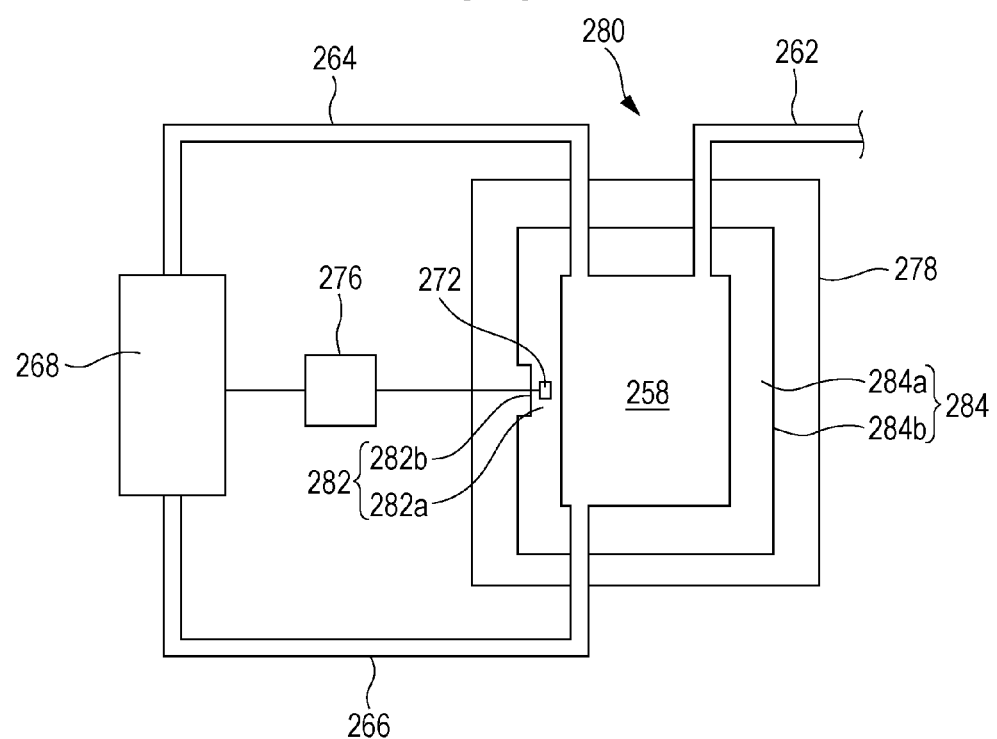
FIG. 57 illustrates a schematic configuration of a hot water supply system 280 according to the tenth embodiment of the present invention.

Next, a hot water supply system according to the present embodiment will be described with reference to FIG. 57. FIG. 57 schematically illustrates a schematic configuration of a hot water supply system 280 according to the present embodiment. As illustrated in FIG. 57, the hot water supply system 280 according to the present embodiment has a storage tank 258 which stores hot water and a temperature-maintaining heat storage member 284 that has a latent heat storage material (first latent heat storage material) 284a which is reversibly phase-transited between the solid phase and the liquid phase and that is disposed around the storage tank 258 to maintain the temperature of the hot water inside the storage tank 258. The hot water supply system 280 has a temperature-control heat storage member 282 that has a latent heat storage material (second latent heat storage material) 282a which is reversibly phase-transited between the solid phase and the liquid phase and is phase-transited earlier than the latent heat storage material 284a, and that is disposed around the storage tank 258 to be used in controlling the temperature of the hot water inside the storage tank 258. In addition, the hot water supply system 280 has a temperature sensor 272 which detects a state (temperature in the present example) of the temperature-control heat storage member 282, a heat exchanger 268 which heats water stored inside the storage tank 258 by way of heat exchange with a predetermined refrigerant, and a control unit 276 which controls the heat exchanger 268 based on the state of the temperature-control heat storage member 282.

The hot water supply system 280 has a housing 278 provided with the storage tank 258. The temperature-control heat storage member 282 and the temperature-maintaining heat storage member 284 are arranged between the housing 278 and the storage tank 258. The periphery of the storage tank 258 is surrounded by the temperature-control heat storage member 282 and the temperature-maintaining heat storage member 284.

The hot water supply system 280 has pipes 262 and 264 connected to a top portion of the storage tank 258 and a pipe 266 connected to a bottom portion of the storage tank 258. The storage tank 258 is connected to the heat exchanger 268 via the pipes 264 and 266. The water stored in a lower section inside the storage tank 258 is caused to reach the heat exchanger 268 after being circulated in the pipe 266 by a pump (not illustrated) included in the heat exchanger 268 for example. The heat exchanger 268 has a heat exchange mechanism (not illustrated) and heats the water flowing out from the pipe 266 by way of the heat exchange with a predetermined refrigerant. This allows the water to be hot water. The hot water flowing out from the heat exchanger 268 is circulated in the pipe 264 to flow into the storage tank 258. This allows the hot water to be stored inside the storage tank 258. In addition, the hot water inside the storage tank 258 is circulated to be supplied to a water heater or a heater (both are not illustrated) through the pipe 262.

The temperature-maintaining heat storage member 284 disposed in an outer periphery of the storage tank 258 has a container body 284b which seals a latent heat storage material 284a. The container body 284b is made of resins such as ABS or polycarbonate, and has a predetermined rigidity. When the latent heat storage material 284a is flammable, it is desirable to form the container body 284b by using a flame-retardant material. In addition, when using paraffin as the latent heat storage material 284a, it is desirable that the container body 284b have a gas barrier property since paraffin is a volatile organic compound (VOC) depending on types.

The temperature-maintaining heat storage member 284 is generally used in a predetermined working temperature range and working pressure range. The temperature-maintaining heat storage member 284 of the present embodiment is heated by the hot water flowing from the heat exchanger 268 to the storage tank 258 so as to store the heat, when the heat exchanger 268 is operated, and radiates the heat so as to suppress temperature falling of the hot water inside the storage tank 258, when the heat exchanger 268 is stopped. In this case, the working temperature range of the temperature-maintaining heat storage member 284 includes the temperature of the hot water inside the storage tank 258 during a normal operation. In addition, the working pressure of the temperature-maintaining heat storage member 284 is an atmospheric pressure for example.

The latent heat storage material 284a provided in the temperature-maintaining heat storage member 284 has the phase change temperature (melting point) which causes a phase change to reversibly occur between the solid phase and the liquid phase, within the working temperature range of the temperature-maintaining heat storage member 284. The latent heat storage material 284a of the present embodiment always maintains the state of two phases (solid and liquid phases) when the hot water supply system 280 is in a normal operation state (operation state where the heat exchanger 268 is normally controlled). In the present embodiment, it is desirable that the phase change temperature which causes the latent heat storage material 284a to be reversibly phase-transited between the solid phase and the liquid phase be approximately 60° C. to 95° C. Therefore, the latent heat storage material 284a contains paraffin having 30 or more carbon atoms (The phase change temperature is approximately 70° C.). The latent heat storage material 284a contains a gelling agent for gelling (solidifying) paraffin. Instead of paraffin, the latent heat storage material 284a may contain sugar alcohol such as xylitol (the phase change temperature is approximately 95° C.) and a mixture thereof.

The temperature-control heat storage member 282 disposed in the outer periphery of the storage tank 258 has a container body 282b which seals the latent heat storage material 282a. The temperature-control heat storage member 282 is provided in a part of the outer periphery of the storage tank 258. The temperature-control heat storage member 282 is used in controlling the temperature of the hot water stored in the storage tank 258. In the present embodiment, the thickness of the temperature-control heat storage member 282 is formed to be thinner than the thickness of the temperature-maintaining heat storage member 284. This causes the structure of the temperature-control heat storage member 282 to be different from the structure of the temperature-maintaining heat storage member 284. In addition, the average thickness of the temperature-control heat storage member 282 is formed to be thinner than the average thickness of the temperature-maintaining heat storage member 284. In this manner, in the present embodiment, the heat storage member disposed in the outer periphery of the storage tank 258 is formed to have a different thickness depending on a region. In the present embodiment, the temperature-control heat storage member 282 is formed integrally with the temperature-maintaining heat storage member 284. The temperature-control heat storage member 282 may be formed separately and independently from the temperature-maintaining heat storage member 284. The temperature-control heat storage member 282, when maintaining the phase change temperature, also functions as the heat storage member for maintaining the temperature of the hot water inside the storage tank 258.

Since the latent heat storage material 282a is formed of the forming material the same as that of the latent heat storage material 284a, the detailed description will be omitted. In addition, since the container body 282b is formed of the forming material the same as that of the container body 284b, the detailed description will be omitted.

The hot water supply system 280 has the temperature sensor 272 which detects the temperature of the temperature-control heat storage member 282. The temperature sensor 272 is used in controlling the heat exchanger 268 (pump or heat exchange mechanism). The temperature sensor 272 is disposed in the vicinity of the temperature-control heat storage member 282 which is thinner than the temperature-maintaining heat storage member 284. In the present embodiment, the temperature sensor 272 is disposed inside the container body 282b of the temperature-control heat storage member 282 so as to be in direct contact with the latent heat storage material 282a provided in the temperature-control heat storage member 282. As described above with reference to FIGS. 29 to 32, the thin latent heat storage material is likely to be melted and frozen as compared to the thick latent heat storage material. Therefore, the temperature sensor 272 detects the temperature of the latent heat storage material 282a which is likely to be melted and frozen relatively between the latent heat storage materials 282a and 284a in the outer periphery of the storage tank 258.

In addition, the control unit 276 provided in the hot water supply system 280 is configured to include a CPU, a ROM, a RAM, input and output ports and to control the entire hot water supply system 280. The temperature sensor 272 is connected to the input port of the control unit 276. The control unit 276 controls the heat exchanger 268 (pump or heat exchange mechanism) based on a temperature signal input from the temperature sensor 272. The control unit 276 starts the heat exchanger 268 (pump or heat exchange mechanism) when determining that the temperature of the latent heat storage material 282a of the temperature-control heat storage member 282 which is likely to be melted and frozen relatively is lower than the phase change temperature (melting point), based on the input temperature signal. In this manner, the water stored in the lower section inside the storage tank 258 is heated to be the hot water in the heat exchanger 268 and to flow into the storage tank 258, thereby raising the temperature of the hot water stored in the storage tank 258. In addition, the control unit 276 stops the heat exchanger 268 (pump or heat exchange mechanism) when determining that the temperature of the latent heat storage material 282a is higher than the phase change temperature, based on the input temperature signal. The latent heat storage material 284a of the temperature-maintaining heat storage member 284 can maintain the phase change temperature and can maintain the state of two phases (solid and liquid phases) during the normal operation of the heat exchanger 268. In this manner, the hot water supply system 280 can easily and accurately maintain a substantially constant temperature of the hot water inside the storage tank 258.

The temperature-maintaining heat storage member and the temperature-control heat storage member are not limited to the above-described embodiments. For example, the temperature-maintaining heat storage member and the temperature-control heat storage member may have a plurality of thicknesses respectively.

The temperature-maintaining heat storage member and/or the temperature-control heat storage member which have a plurality of thicknesses will be described with reference to FIG. 58. FIG. 58 is a cross-sectional view illustrating a schematic configuration of a temperature-maintaining heat storage member 331 and a temperature-control heat storage member 333 which can be applied to the cooling equipment, the building or the hot water supply system according to the above-described embodiments. FIG. 58(a) illustrates the temperature-maintaining heat storage member 331 having the plurality of thicknesses and the temperature-control heat storage member 333 having a substantially constant thickness. As illustrated in FIG. 58(a), the temperature-maintaining heat storage member 331 has a thickness a and a thickness b which is thinner than the thickness a. A region of the thickness a occupies more regions in the overall thickness of the temperature-maintaining heat storage member 331. Therefore, the thickness a is a dominant thickness in the temperature-maintaining heat storage member 331. The temperature-maintaining heat storage member 331 has a latent heat storage material 331a contained in a container body (not illustrated).

As illustrated in FIG. 58(a), the temperature-control heat storage member 333 has a substantially constant thickness c. The temperature-control heat storage member 333 has a latent heat storage material 333a contained in a container body (not illustrated). The temperature-control heat storage member 333 has a temperature sensor 335 which is disposed inside the container body so as to be in direct contact with the latent heat storage material 333a. The temperature sensor 335 exerts a function the same as that of the temperature sensor 219 in the above-described example 1.

The latent heat storage material 333a is formed of a material the same as that of the latent heat storage material 331a. The latent heat storage material 333a and the latent heat storage material 331a are formed of a material which can be applied to the latent heat storage material 207a in Example 1 for example.

When the temperature-maintaining heat storage member 331 and the temperature-control heat storage member 333 are used in the storage chamber or the like of the cooling equipment for example, since the thickness c is formed to be thinner than the thickness a, the temperature-control heat storage member 333 can exert an operation and a function which are the same as those of the temperature-control heat storage member 207 or the like in the above-described example. This enables the cooling equipment or the like provided with the temperature-maintaining heat storage member 331 and the temperature-control heat storage member 333 to have the effect the same as that of the cooling equipment or the like according to the above-described examples.

FIG. 58(b) illustrates another example of the temperature-maintaining heat storage member 331 having the plurality of thicknesses and the temperature-control heat storage member 333 having substantially the constant thickness. As illustrated in FIG. 58(b), the temperature-maintaining heat storage member 331 has the thickness a and the thickness b which is thinner than the thickness a. The region of the thickness a occupies more regions in the overall thickness of the temperature-maintaining heat storage member 331. Therefore, the thickness b is the dominant thickness in the temperature-maintaining heat storage member 331. The temperature-maintaining heat storage member 331 has the latent heat storage material 331a contained in the container body (not illustrated).

As illustrated in FIG. 58(b), the temperature-control heat storage member 333 has substantially the constant thickness c. The temperature-control heat storage member 333 of the present embodiment has a structure the same as that of the temperature-control heat storage member 333 illustrated in FIG. 58(a). Accordingly, the detailed description will be omitted.

The latent heat storage material 333a is formed of a material the same as that of the latent heat storage material 331a. The latent heat storage material 333a and the latent heat storage material 331a are formed of a material which can be applied to the latent heat storage material 207a in Example 1 for example.

The thickness b is the dominant thickness in the temperature-maintaining heat storage member 331. The thickness c of the temperature-control heat storage member 333 is formed to be thinner than the maximum thickness (thickness a in the present example) of the temperature-maintaining heat storage member 331. In this manner, the temperature-control heat storage member 333 can exert an operation and a function which are the same as those of the temperature-control heat storage member 207 or the like in the above-described example. This enables the cooling equipment or the like provided with the temperature-maintaining heat storage member 331 and the temperature-control heat storage member 333 to have the effect the same as that of the cooling equipment or the like according to the above-described examples. It is desirable that in the temperature-maintaining heat storage member 331, the region of the thickness a have a sufficient latent heat in order to maintain the temperature inside the entire cooling equipment for example.

FIG. 58(c) illustrates further another example of the temperature-maintaining heat storage member 331 having the plurality of thicknesses and the temperature-control heat storage member 333 having substantially the constant thickness. As illustrated in FIG. 58(c), the temperature-maintaining heat storage member 331 has the thickness a and the thickness b which is thicker than the thickness a. The region of the thickness a occupies more regions in the overall thickness of the temperature-maintaining heat storage member 331. Therefore, the thickness a is the dominant thickness in the temperature-maintaining heat storage member 331. The temperature-maintaining heat storage member 331 has the latent heat storage material 331a contained in the container body (not illustrated).

As illustrated in FIG. 58(c), the temperature-control heat storage member 333 has substantially the constant thickness c. The temperature-control heat storage member 333 of the present embodiment has a structure the same as that of the temperature-control heat storage member 333 illustrated in FIG. 58(a). Accordingly, the detailed description will be omitted.

The latent heat storage material 333a is formed of a material the same as that of the latent heat storage material 331a. The latent heat storage material 333a and the latent heat storage material 331a are formed of a material which can be applied to the latent heat storage material 207a in Example 1 for example.

When the temperature-maintaining heat storage member 331 and the temperature-control heat storage member 333 are used in the storage chamber or the like of the cooling equipment for example, since the thickness c is formed to be thinner than the thickness a, the temperature-control heat storage member 333 can exert an operation and a function which are the same as those of the temperature-control heat storage member 207 or the like in the above-described example. This enables the cooling equipment or the like provided with the temperature-maintaining heat storage member 331 and the temperature-control heat storage member 333 to have the effect the same as that of the cooling equipment or the like according to the above-described examples.

FIG. 58(d) illustrates an example of the temperature-maintaining heat storage member 331 having the plurality of thicknesses and the temperature-control heat storage member 333 having the plurality of thicknesses. As illustrated in FIG. 58(d), the temperature-maintaining heat storage member 331 has a concave-convex portion 331b on one surface. The temperature-maintaining heat storage member 331 has an average length from an opposing surface opposing the one surface to the concave-convex portion 331b, that is an average thickness a. The temperature-maintaining heat storage member 331 has a latent heat storage material 331a contained in the container body (not illustrated).

As illustrated in FIG. 58(d), the temperature-control heat storage member 333 has a concave-convex portion 333b on one surface. The temperature-control heat storage member 333 has an average length from an opposing surface opposing the one surface to the concave-convex portion 333b, that is an average thickness c. The temperature-control heat storage member 333 has a latent heat storage material 333a contained in the container body (not illustrated). The temperature-control heat storage member 333 has a temperature sensor 335 disposed inside the container body so as to be in direct contact with the latent heat storage material 333a. The temperature sensor 335 exerts a function the same as that of the temperature sensor 219 in Example 1 described above.

The latent heat storage material 333a is formed of a material the same as that of the latent heat storage material 331a. The latent heat storage material 333a and the latent heat storage material 331a are formed of a material which can be applied to the latent heat storage material 207a in Example 1 for example.

When the temperature-maintaining heat storage member 331 and the temperature-control heat storage member 333 are used in the storage chamber or the like of the cooling equipment for example, since the thickness c is formed to be thinner than the average thickness a (for example, thinner than the thickness a by approximately 10%), the temperature-control heat storage member 333 can exert an operation and a function which are the same as those of the temperature-control heat storage member 207 or the like in the above-described example. This enables the cooling equipment or the like provided with the temperature-maintaining heat storage member 331 and the temperature-control heat storage member 333 to have the effect the same as that of the cooling equipment or the like according to the above-described examples. However, it is necessary that a change in the thickness due to the concave-convex portion 331b of the temperature-maintaining heat storage member 331 (ratio of the minimum thickness to the maximum thickness) is smaller than a ratio of the average thickness c to the average thickness a.

It is desirable that each vertical length and horizontal length of a plane of the temperature-control heat storage member be longer than the thickness. In addition, it is desirable that a surface area of the temperature-control heat storage member be smaller than a surface area of the temperature-maintaining heat storage member.

Next, another example of a heat storage member according to the present embodiment will be described with reference to FIG. 59. The heat storage member according to the present example is characterized in that the heat storage member has a plurality of thicknesses, a portion of which is used as the temperature-maintaining heat storage member and the remaining portion of which is used as the temperature-control heat storage member. FIG. 59 is a cross-sectional view illustrating a schematic configuration of a heat storage member 337 according to the present example. The heat storage member 337 can be applied to the cooling equipment, the building or the hot water supply system according to the above-described embodiment. As illustrated in FIG. 59(a), the heat storage member 337 has a heat storage section (first heat storage section) 336 including at least a latent heat storage material (first latent heat storage material) 336a which is reversibly phase-transited between the solid phase and the liquid phase, a heat storage section (second heat storage section) 338 including at least a latent heat storage material (second latent heat storage material) 338a which is reversibly phase-transited between the solid phase and the liquid phase, and a temperature sensor 339 which detects a state of the heat storage section 338. When the states of the latent heat storage material 336a and the latent heat storage material 338a are changed, at least a portion of the latent heat storage material 338a is phase-transited earlier than at least a portion of the latent heat storage material 336a. The latent heat storage material 336a and the latent heat storage material 338a are formed of the same material. The latent heat storage material 336a and the latent heat storage material 338a are formed of the material which can be applied to the latent heat storage material 207a according to Example 1 for example. The latent heat storage material 336a and the latent heat storage material 338a are contained in a container body (not illustrated) provided in the heat storage member 337.

As illustrated in FIG. 59(a), the heat storage member 337 has a plurality of thicknesses. The heat storage member 337 has the heat storage section 336 in a region having a thickness a and a thickness b, and has the heat storage section 338 in a region having a thickness c. The thickness b is thinner than the thickness c and the thickness c is thinner than the thickness a. The thickness c of at least a portion of the heat storage section 338 is thinner than the thickness a of at least a portion of the heat storage section 336.

The latent heat quantity of the heat storage member 337 in the thickness direction is increased as the thickness is thicker. Therefore, in the heat storage member 337, the latent heat quantity is the largest in the region of the thickness a, the latent heat quantity is the second largest in the region of the thickness c, and the latent heat quantity is the smallest in the region of the thickness b. The temperature sensor 339 is disposed in the heat storage section 338 provided in the region of the thickness c. Therefore, the temperature sensor 339 is disposed in a section where the latent heat quantity of the heat storage section 338 in the thickness direction is small compared to the maximum value of the latent heat quantity of the heat storage section 336 in the thickness direction.

The heat storage member 337 uses the region of the thickness a of the heat storage section 336 in order to maintain a temperature of a temperature control target (for example, the inside of cooling equipment), and uses the heat storage section 338 in order to control the temperature of the temperature control target. The latent heat quantity of the heat storage section 338 in the thickness direction is smaller than the latent heat quantity of the region of the thickness a of the heat storage section 336 in the thickness direction. This causes the latent heat storage material 338a provided in the heat storage section 338 to be phase-transited earlier than the latent heat storage material 336a provided in the region of the thickness a of the heat storage section 336. Therefore, the heat storage member 337 can be used as the heat storage member for maintaining and controlling a temperature in the cooling equipment or the like according to the above-described embodiments.

FIG. 59(*b*) illustrates a modification example of a heat storage member having a plurality of thicknesses, a portion of which is used as the temperature-maintaining heat storage member and the remaining portion of which is used as the temperature-control heat storage member. The same reference numerals are given to the configuring elements having a function and an operation which is the same as those of the heat storage member 337 illustrated in FIG. 59(*a*), and the description thereof will be omitted.

As illustrated in FIG. 59(*b*), the heat storage member 337 according to the present modification example includes the heat storage section 336 having a substantially constant and uniform thickness a and the heat storage section 338 having a substantially constant and uniform thickness b which is thinner than the thickness a. The heat storage section 338 has a concave portion 338*b*. The heat storage member 337 has the temperature sensor 339 which detects the temperature of the latent heat storage material 338*a* provided in the concave portion 338*b*. The temperature sensor 339 is disposed in contact with the latent heat storage material 338*a* of the relatively thin heat storage section 338 of the heat storage member 337. This enables the heat storage member 337 according to the present modification example to have the effect the same as that of the heat storage member 337 illustrated in FIG. 59(*a*).

The heat storage member 337 illustrated in FIGS. 59(*a*) and 59(*b*) may use various sensors illustrated in FIGS. 53 to 55 instead of the temperature sensor 339. That is, in order to understand a state of the latent heat storage material 338*a*, the volume change, the mechanical strength or the optical characteristic may be detected.

In addition, the heat storage member 337 may have a plate-shaped member which is provided in the heat storage section 338 and has heat conductivity higher than heat conductivity of the heat storage section 338. The temperature sensor 339 may be arranged inside or in contact with the plate-shaped member. In addition, the heat storage member 337 may be formed such that the heat conductivity of the heat storage section 338 in the thickness direction is higher than the heat conductivity of the heat storage section 336 in the thickness direction. For example, the heat storage section 338 may have a heat conductive filler dispersed in the latent heat storage material 338*a*.

In addition, it is possible to configure a temperature control system by using the heat storage member 337. The temperature control system has the heat storage member 337 and a temperature control unit which controls a temperature of a temperature control target in response to a state (for example, a temperature) of the heat storage section 338 which is detected by the temperature sensor 339 provided in the heat storage member 337. For example, the temperature control target includes the temperature inside the cooling equipment according to the above-described embodiments, the temperature of the building to which the air conditioner is attached or the temperature of the storage tank provided in the hot water supply system. In the temperature control system, the latent heat quantity of at least a portion of the heat storage section 338 in the thickness direction is set to be decreased in a control temperature range of the temperature control target, as compared to the latent heat quantity of the heat storage section 336 in the thickness direction. The temperature control system can be applied to an air conditioning system or a hot water supply system.

The present invention can be modified in various ways without being limited to the above-described embodiments.

For example, in the above-described embodiments, the household cooling equipment has been mainly described as an example. However, without being limited thereto, the present invention can also be applied to business-purpose cooling equipment, a vending machine having a cooling function, heating equipment, or the like. The present invention is particularly effective when a precise temperature control is required.

In addition, in the above-described embodiments, an example has been described where tetradecane is used as the latent heat storage material. However, without being limited thereto, the present invention may use the other n-paraffin or inorganic slat water solution. In addition, these materials may be used in combination. In addition, those having the different configuration may be used as the above-described temperature-maintaining heat storage member and the above-described temperature-control heat storage member. The heat storage material to be used is determined by selecting a material whose phase change temperature is within a temperature range which can be obtained inside the cooling equipment or inside the working space. For example, if sodium chloride water solution of 20 wt % (melting point is approximately $-17°$ C.) or dodecane (melting point is approximately $-12°$ C.) is used as the latent heat storage material, the present invention can be applied to a freezer.

In addition, in the above-described embodiments, the latent heat storage material in gel which has no fluidity in a state of the liquid phase has been described as an example. However, without being limited thereto, the present invention can use a latent heat storage material which has fluidity in a state of the liquid phase.

In addition, in the above-described embodiments, the cooling equipment in which the compressor 241 is controlled to be turned on and off has been described as an example. However, without being limited thereto, the present invention can also be applied to inverter type cooling equipment in which a rotation speed of the compressor 241 or a discharge amount of the refrigerant is variably controlled.

In addition, the temperature-maintaining heat storage member according to the above-described embodiments can be applied in order to maintain a state where a large amount of latent heat or coldness is always stored. For example, in this case, the application is achieved in such a manner that the thickness of the temperature-maintaining heat storage member is allowed to be significantly thicker than the thickness of the temperature-control heat storage member. In this manner, even when the supply of coldness from the compressor is stopped due to a power failure for example, it is possible to maintain a proper temperature inside the cooling equipment by using the coldness stored in the temperature-maintaining heat storage member. In this case, the thickness of the temperature-maintaining heat storage member may be the thickness which can afford an amount required when the supply of the coldness is stopped, in addition to the thickness of the temperature-control heat storage member for example.

In addition, it is possible to perform each example of the above-described embodiment and the other embodiments in combination with each other.

INDUSTRIAL APPLICABILITY

The present invention can be widely applied to cooling equipment which cools storage goods.

REFERENCE SIGNS LIST 1 to 7 cooling equipment
10 cooling equipment main body
11, 21 insulator
20 door member
30 storage chamber
40 compressor
50 shelf
51 upper shelf
52, 53 lower shelf
60, 123 temperature sensor
70 cold air passage
80, 81 separator
91 to 95, 101 to 107, 120, 130, 140 heat storage member
100 control unit
110 temperature measurement sensor
201, 210, 220, 230, 240, 250, 260, 300, 310 cooling equipment
3, 303 cooling equipment main body
205, 305 storage chamber
207, 243, 245, 251, 253, 259, 273, 269, 282, 283, 284, 287, 291, 297, 309, 311, 313, 315, 317, 333 temperature-control heat storage member
207a, 209a, 211a, 213a, 215a, 217a, 243a, 245a, 251a, 253a, 259a, 269a, 273a, 282a, 283a, 284a, 287a, 291a, 297a, 307a, 309a, 311a, 313a, 315a, 317a, 331a, 333a, 336a, 338a latent heat storage material
207b, 209b, 211b, 213b, 215b, 217b, 243b, 245b, 251b, 253b, 259b, 269b, 273b, 282b, 283b, 284b, 287b, 291b, 297b, 307b, 309b, 311b, 313b, 315b, 317b container body
209, 211, 213, 215, 217, 331 temperature-maintaining heat storage member
219, 249, 272, 292, 319, 335, 339 temperature sensor
221 upper shelf
223 lower shelf
225, 227, 255 cold air port
229, 329 space unit
228 cold air passage
231 door member
233, 235, 286 insulator
237 separator
239, 276, 294 control unit
241, 296 compressor
243c, 338b recess
247, 271 plate-shaped member
253c heat conductive filler
257 suction port
258 storage tank
262, 264, 266 pipe
265, 267, 277a, 277b wire
268 heat exchanger
270 air conditioner
274a, 274b electrode
275 piezoelectric element
278 housing
280 hot water supply system
281a, 281b spring member
283c sensor arrangement portion
285 mechanical strength sensor
285a pressing needle
288 building
288a floor plate
288b ceiling plate
288c side wall
289 sensor
289a, 289b optical fiber
295 indoor unit
299 living space
301 cooling plate
303a front surface
331b, 333b concave-convex portion
336, 338 heat storage section
337 heat storage member

The invention claimed is:

1. Cooling equipment comprising:
a storage chamber that stores storage goods;
a first latent heat storage member that is inside the storage chamber and includes at least a first latent heat storage material that is reversibly phase-transited between a solid phase and a liquid phase;
a second latent heat storage member that is inside the storage chamber and includes at least a second latent heat storage material that is reversibly phase-transited between the solid phase and the liquid phase;
a sensor that is in contact with or included inside the second latent heat storage member and detects a state of the second latent heat storage member;
a cooling mechanism that cools the inside of the storage chamber; and
control circuitry that controls the cooling mechanism, based on a state of the second latent heat storage member, wherein
the second latent heat storage member is phase-transited earlier than the first latent heat storage member, and
a thickness of the second latent heat storage member is thinner than a thickness of the first latent heat storage member.

2. The cooling equipment according to claim 1, wherein during cooling of the storage chamber, at least a portion of the second latent heat storage member completes phase-transition and freezes earlier than the first latent heat storage member, and
while cold is radiating from the storage chamber, at least a portion of the second latent heat storage member completes the phase-transition and melts earlier than the first latent heat storage member.

3. The cooling equipment according to claim 1, wherein the state includes any one of a temperature, a volumetric change, a mechanical strength, and optical characteristics.

4. The cooling equipment according to claim 1, wherein the cooling mechanism includes any one of a compressor, an opening of a cold air port or a vent hole, and a cooling fan.

5. The cooling equipment according to claim 1, wherein a latent heat amount in a thickness direction of at least a portion of the second latent heat storage member is smaller than a latent heat amount in a thickness direction of at least a portion of the first latent heat storage member.

6. The cooling equipment according to claim 1, wherein the sensor is disposed in a section where the latent heat amount in the thickness direction of the second latent heat storage member is smaller than the maximum value of the latent heat amount in the thickness direction of the first latent heat storage member.

7. The cooling equipment according to claim 1, wherein the second latent heat storage member includes a recess, and
the sensor detects a state of the recess.

8. The cooling equipment according to claim 1, further comprising:
   a plate-shaped member that is included in the second latent heat storage member and has a thermal conductivity higher than a thermal conductivity of the second latent heat storage member, wherein the sensor is arranged in contact with the plate-shaped member.

9. The cooling equipment according to claim 1, wherein the second latent heat storage member has heat conductive filler or particulates having no latent heat in a control temperature range.

10. The cooling equipment according to claim 1, wherein the first latent heat storage member includes a container body that seals the first latent heat storage material, and
   the second latent heat storage member includes a container body that seals the second latent heat storage material.

11. The cooling equipment according to claim 1, wherein a material included in the first latent heat storage material is a same material included in the second latent heat storage material.

12. The cooling equipment according to claim 1, wherein the second latent heat storage material is arranged at a position where cold air blowing into the storage chamber is likely to hit relatively and near a corner inside the storage chamber.

* * * * *